US012696270B2

(12) United States Patent
Elazzouni et al.

(10) Patent No.: US 12,696,270 B2
(45) Date of Patent: Jul. 28, 2026

(54) ADAPTATIONS TO STATUS PROTOCOL DATA UNITS

(71) Applicant: QUALCOMM Incorporated, San Diego, CA (US)

(72) Inventors: Sherif Elazzouni, San Diego, CA (US); Ozcan Ozturk, San Diego, CA (US); Gavin Bernard Horn, La Jolla, CA (US); Lulu Wang, San Diego, CA (US); Vishal Dalmiya, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 18/493,759

(22) Filed: Oct. 24, 2023

(65) Prior Publication Data

US 2025/0133559 A1      Apr. 24, 2025

(51) Int. Cl.
*H04W 72/1268* (2023.01)
*H04L 1/16* (2023.01)

(52) U.S. Cl.
CPC ........... *H04W 72/1268* (2013.01); *H04L 1/16* (2013.01)

(58) Field of Classification Search
CPC .... H04W 72/1268; H04L 1/16; H04L 1/1642; H04L 1/1685
See application file for complete search history.

(56) References Cited

U.S. PATENT DOCUMENTS

| | | | |
|---|---|---|---|
| 9,781,630 B2 | 10/2017 | Yi et al. | |
| 2020/0077299 A1* | 3/2020 | Wu | H04L 1/1642 |
| 2023/0319627 A1 | 10/2023 | Kanamarlapudi et al. | |

FOREIGN PATENT DOCUMENTS

| | | | | |
|---|---|---|---|---|
| KR | 20090132469 A * | 12/2009 | | H04L 1/1685 |
| WO | WO-2025033731 A1 * | 2/2025 | | H04L 69/321 |

OTHER PUBLICATIONS

International Search Report and Written Opinion—PCT/US2024/047806—ISA/EPO—Mar. 3, 2025.
(Continued)

*Primary Examiner* — Yaotang Wang
(74) *Attorney, Agent, or Firm* — Holland & Hart LLP/Qualcomm Incorporated

(57) ABSTRACT
Methods, systems, and devices for wireless communication are described. A user equipment (UE) may receive radio link control (RLC) protocol data units (PDUs) within a receive window. Additionally, the UE may receive an uplink grant indicating a set of resources. Based on the set of resources, the UE may transmit a STATUS PDU including a single field that indicates a sequence number (SN) of a first PDU the UE received but unsuccessfully decoded within the receive window. Alternatively, the UE may transmit STATUS PDU segments based on which PDUs the UE receives and the quantity resources in the uplink grant. In some cases, the UE may transmit a STATUS PDU that includes a first field to indicate an SN of a first PDU the UE received but unsuccessfully decoded within the receive window, and one or more offset fields that indicate SNs of respective PDUs subsequent to the first PDU.

24 Claims, 25 Drawing Sheets

(56)     References Cited

OTHER PUBLICATIONS

3GPP: "3rd Generation Partnership Project, Technical Specification Group Radio Access Network, NR, Radio Link Control (RLC) Protocol Specification (Release 17)", 3GPP TS 38.322 V17.3.0, Technical Specification, 3GPP Organizational Partners, Sophia Antipolis Valbonne, France, 33 Pages, Jun. 2023, pp. 25-29.

3GPP2: "Data Service Options for Spread Systems: Radio Link Protocol Type 3", 3rd Generation Partnership Project 2, 3GPP2 C.S0017-010-A, Version 2.0, Sep. 2005, 56 pages, Section 4.2.2.

Partial International Search Report and Written Opinion—PCT/US2024/047806—ISA/EPO—Jan. 9, 2025.

* cited by examiner 505-a

Figures 5A, 5B:
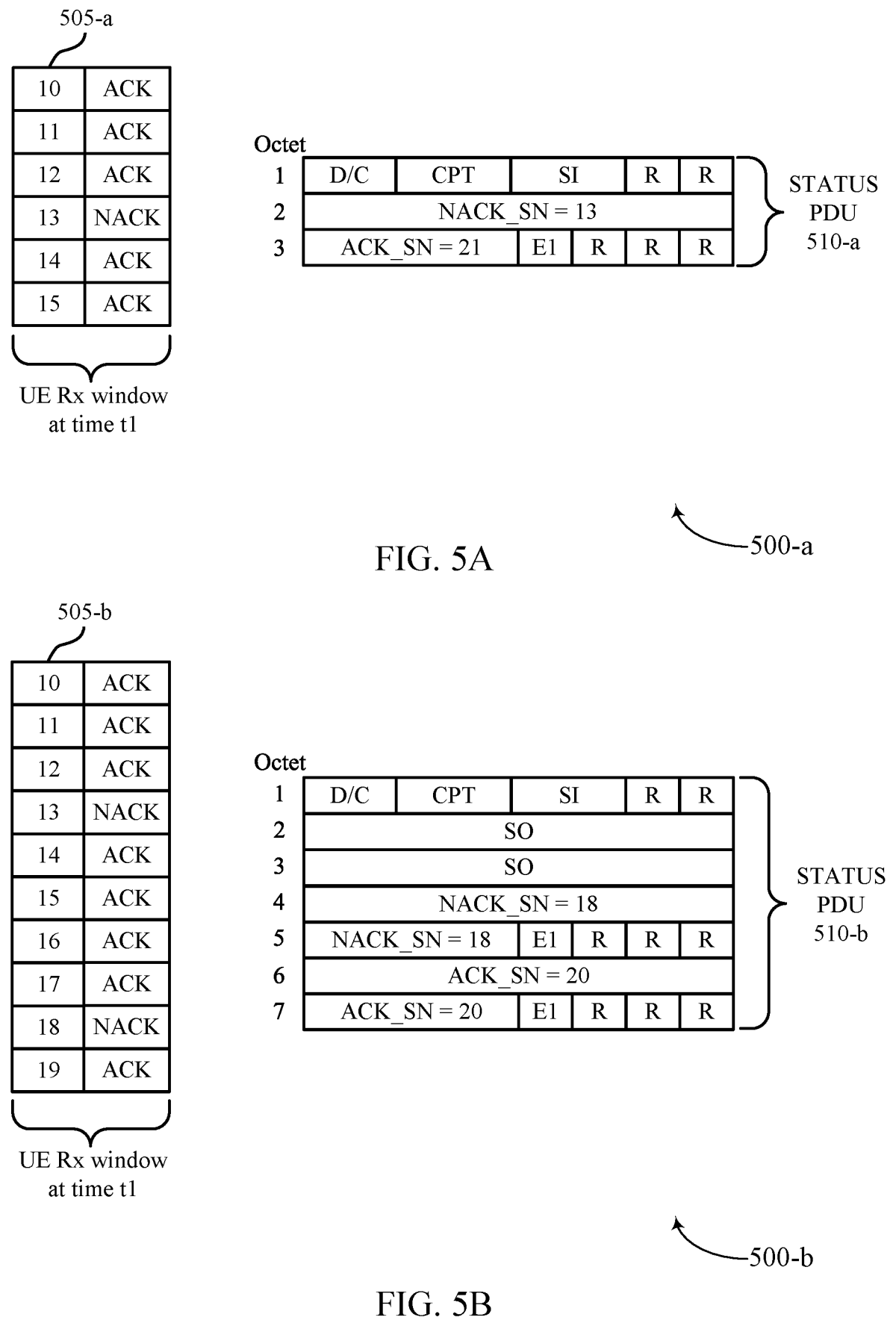

| 10 | ACK |
|----|------|
| 11 | ACK |
| 12 | ACK |
| 13 | NACK |
| 14 | ACK |
| 15 | ACK |

UE Rx window
at time t1

Octet

| 1 | D/C | CPT | SI | R | R |
|---|-----|-----|-----|---|---|
| 2 | NACK_SN = 13 | | | | |
| 3 | ACK_SN = 21 | | E1 | R | R | R |

STATUS PDU 510-a

FIG. 5A 500-a 505-b

| 10 | ACK |
|----|------|
| 11 | ACK |
| 12 | ACK |
| 13 | NACK |
| 14 | ACK |
| 15 | ACK |
| 16 | ACK |
| 17 | ACK |
| 18 | NACK |
| 19 | ACK |

UE Rx window
at time t1

Octet

| 1 | D/C | CPT | SI | R | R |
|---|-----|-----|-----|---|---|
| 2 | SO | | | | |
| 3 | SO | | | | |
| 4 | NACK_SN = 18 | | | | |
| 5 | NACK_SN = 18 | | E1 | R | R | R |
| 6 | ACK_SN = 20 | | | | |
| 7 | ACK_SN = 20 | | E1 | R | R | R |

STATUS PDU 510-b 500-b

FIG. 5B 805        810                    815

820 — | D/C = 1 | CPT = 011 | NACK_SN = 13 |

825 — | NACK_SN = 13 |
| Bitmap of ACK/NACK |

800

115-e 105-e

UE

Network
Entity

RLC PDUs

1005

Uplink grant

1010

1015

RLC STATUS PDU including first feedback

Additional RLC PDUs

1020

1025

RLC STATUS PDU including second feedback

1000

1610

1620

1615

1605

1600

130

105

115

Network
Entity

Transceiver

1910

Antenna

1915

Communications
Manager

1920

Memory

Code

1930

1925

1940

Processor

1935

1905

1900

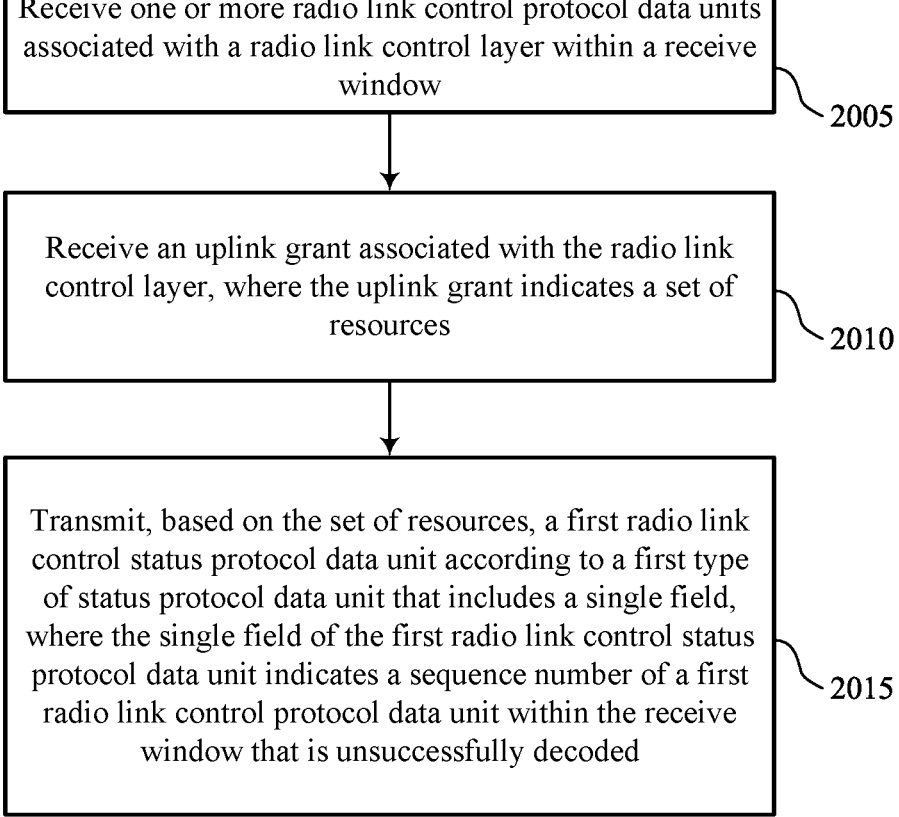

Receive one or more radio link control protocol data units associated with a radio link control layer within a receive window

2005

Receive an uplink grant associated with the radio link control layer, where the uplink grant indicates a set of resources

2010

Transmit, based on the set of resources, a first radio link control status protocol data unit according to a first type of status protocol data unit that includes a single field, where the single field of the first radio link control status protocol data unit indicates a sequence number of a first radio link control protocol data unit within the receive window that is unsuccessfully decoded

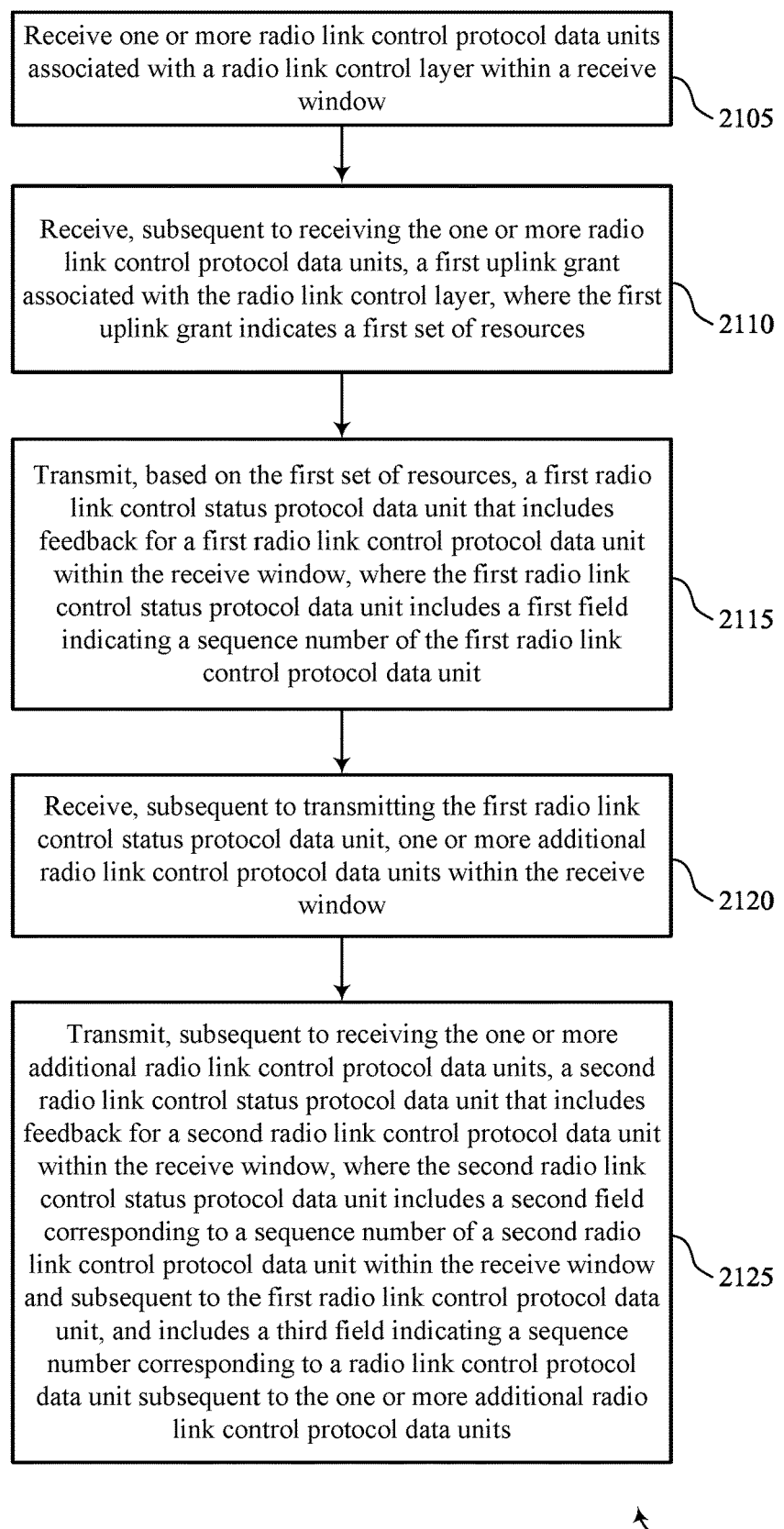

Receive one or more radio link control protocol data units associated with a radio link control layer within a receive window

2105

Receive, subsequent to receiving the one or more radio link control protocol data units, a first uplink grant associated with the radio link control layer, where the first uplink grant indicates a first set of resources

2110

Transmit, based on the first set of resources, a first radio link control status protocol data unit that includes feedback for a first radio link control protocol data unit within the receive window, where the first radio link control status protocol data unit includes a first field indicating a sequence number of the first radio link control protocol data unit

2115

Receive, subsequent to transmitting the first radio link control status protocol data unit, one or more additional radio link control protocol data units within the receive window

2120

Transmit, subsequent to receiving the one or more additional radio link control protocol data units, a second radio link control status protocol data unit that includes feedback for a second radio link control protocol data unit within the receive window, where the second radio link control status protocol data unit includes a second field corresponding to a sequence number of a second radio link control protocol data unit within the receive window and subsequent to the first radio link control protocol data unit, and includes a third field indicating a sequence number corresponding to a radio link control protocol data unit subsequent to the one or more additional radio link control protocol data units

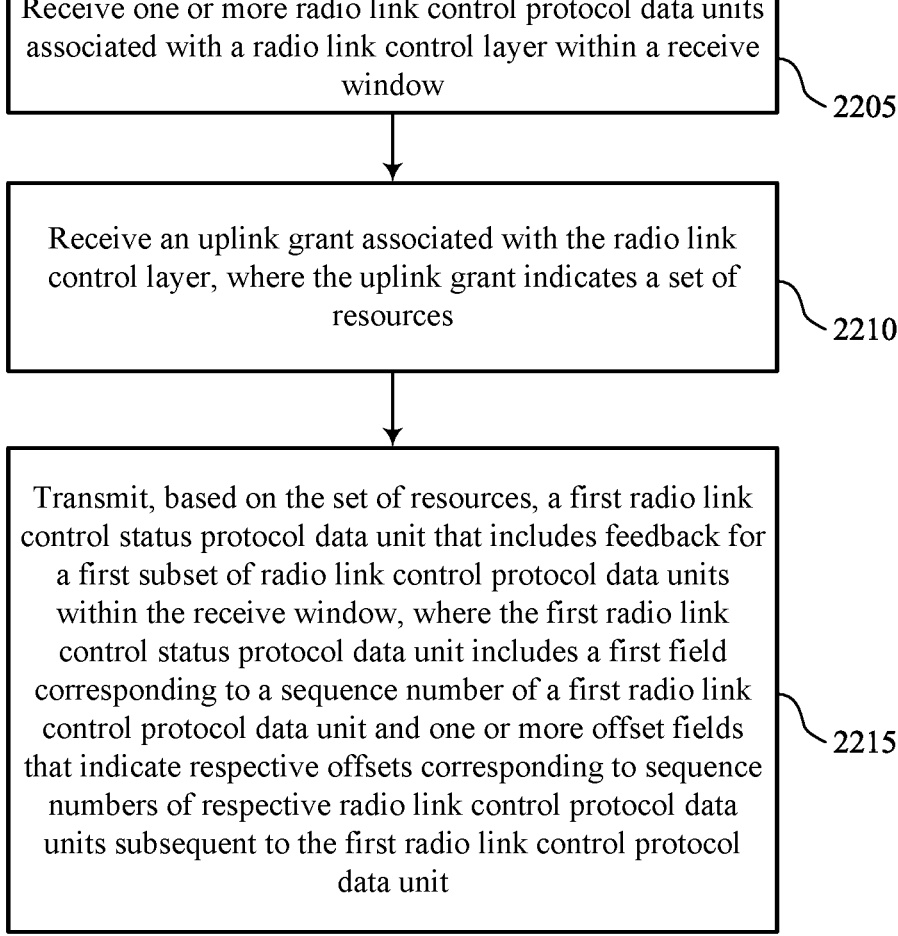

Receive one or more radio link control protocol data units associated with a radio link control layer within a receive window

2205

Receive an uplink grant associated with the radio link control layer, where the uplink grant indicates a set of resources

2210

Transmit, based on the set of resources, a first radio link control status protocol data unit that includes feedback for a first subset of radio link control protocol data units within the receive window, where the first radio link control status protocol data unit includes a first field corresponding to a sequence number of a first radio link control protocol data unit and one or more offset fields that indicate respective offsets corresponding to sequence numbers of respective radio link control protocol data units subsequent to the first radio link control protocol data unit

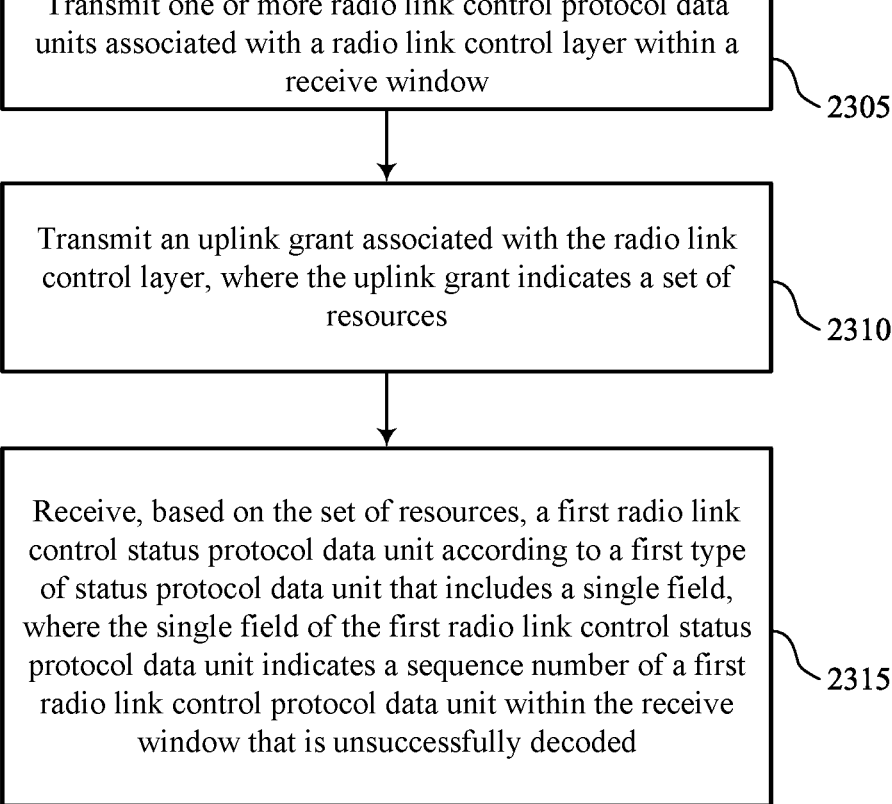

Transmit one or more radio link control protocol data units associated with a radio link control layer within a receive window
⌐2305

Transmit an uplink grant associated with the radio link control layer, where the uplink grant indicates a set of resources
⌐2310

Receive, based on the set of resources, a first radio link control status protocol data unit according to a first type of status protocol data unit that includes a single field, where the single field of the first radio link control status protocol data unit indicates a sequence number of a first radio link control protocol data unit within the receive window that is unsuccessfully decoded
⌐2315

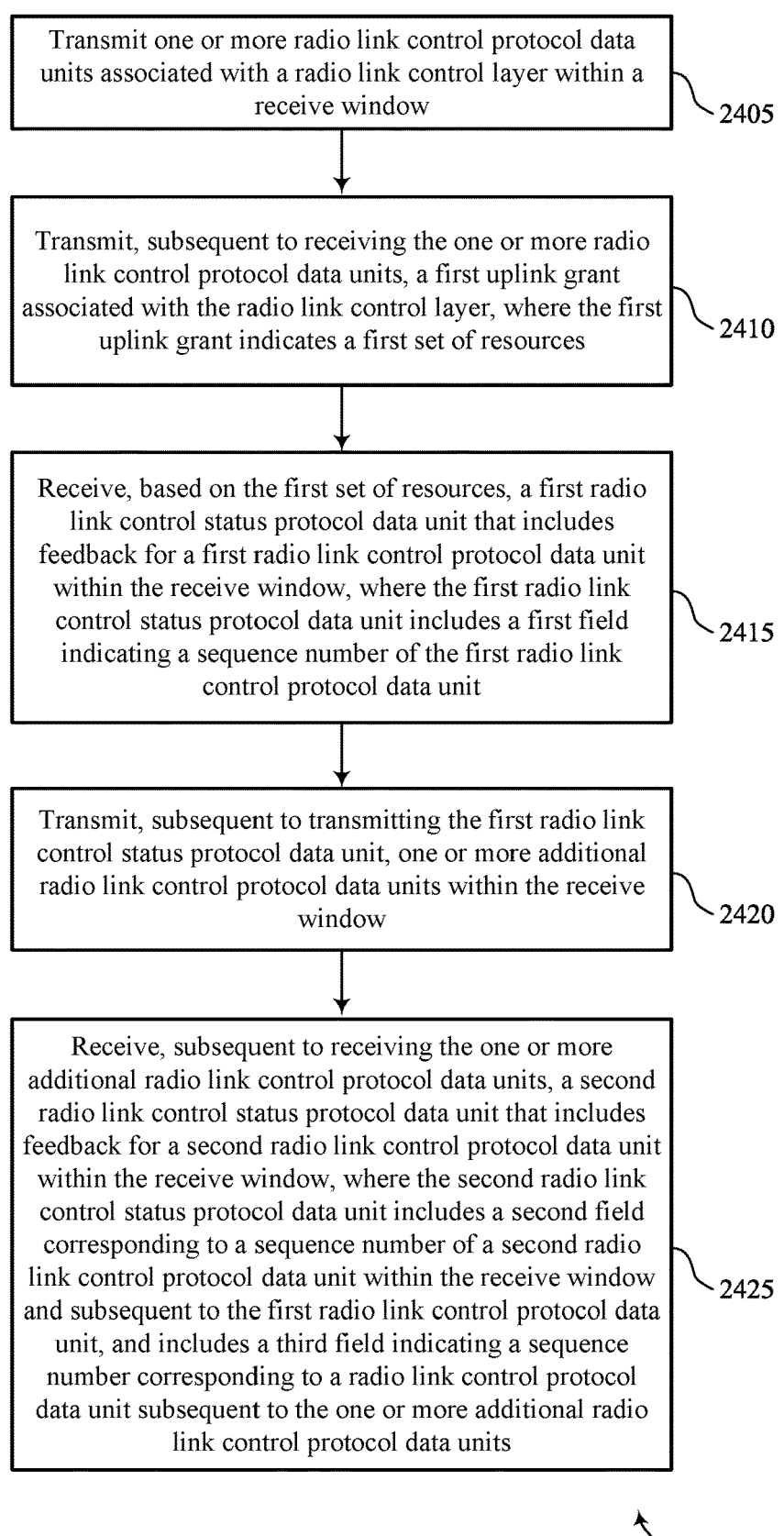

Transmit one or more radio link control protocol data units associated with a radio link control layer within a receive window
2405

Transmit, subsequent to receiving the one or more radio link control protocol data units, a first uplink grant associated with the radio link control layer, where the first uplink grant indicates a first set of resources
2410

Receive, based on the first set of resources, a first radio link control status protocol data unit that includes feedback for a first radio link control protocol data unit within the receive window, where the first radio link control status protocol data unit includes a first field indicating a sequence number of the first radio link control protocol data unit
2415

Transmit, subsequent to transmitting the first radio link control status protocol data unit, one or more additional radio link control protocol data units within the receive window
2420

Receive, subsequent to receiving the one or more additional radio link control protocol data units, a second radio link control status protocol data unit that includes feedback for a second radio link control protocol data unit within the receive window, where the second radio link control status protocol data unit includes a second field corresponding to a sequence number of a second radio link control protocol data unit within the receive window and subsequent to the first radio link control protocol data unit, and includes a third field indicating a sequence number corresponding to a radio link control protocol data unit subsequent to the one or more additional radio link control protocol data units
2425

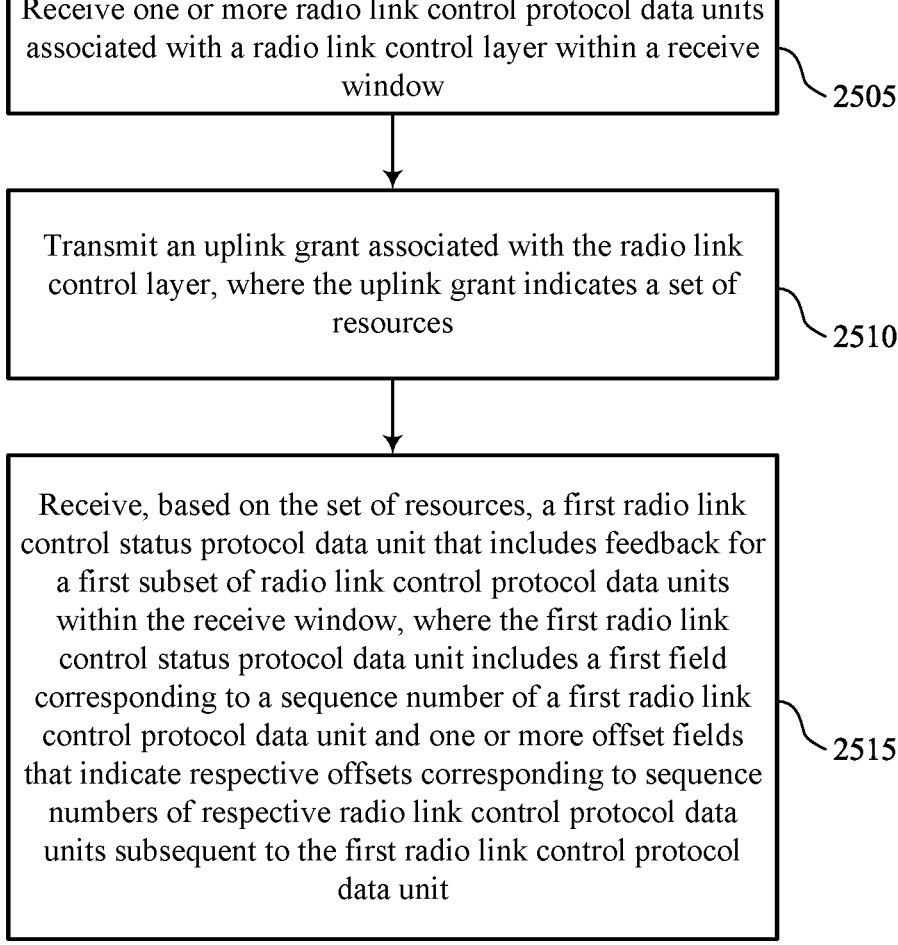

Receive one or more radio link control protocol data units associated with a radio link control layer within a receive window 2505

Transmit an uplink grant associated with the radio link control layer, where the uplink grant indicates a set of resources 2510

Receive, based on the set of resources, a first radio link control status protocol data unit that includes feedback for a first subset of radio link control protocol data units within the receive window, where the first radio link control status protocol data unit includes a first field corresponding to a sequence number of a first radio link control protocol data unit and one or more offset fields that indicate respective offsets corresponding to sequence numbers of respective radio link control protocol data units subsequent to the first radio link control protocol data unit 2515

ADAPTATIONS TO STATUS PROTOCOL DATA UNITS

INTRODUCTION

The following relates generally to wireless communication, and more specifically to adapting STATUS protocol data units (PDUs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support adaptations to STATUS PDUs.

A method for wireless communications by a user equipment (UE) is described. The method may include receiving one or more RLC PDUs associated with an RLC layer within a receive window, receiving an uplink grant associated with the RLC layer, where the uplink grant indicates a set of resources, and transmitting, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded.

An apparatus for wireless communication at a UE is described. The apparatus may include one or more memories, and one or more processors coupled with the one or more memories. The one or more processors may be configured to cause the UE to receive one or more RLC PDUs associated with an RLC layer within a receive window, receive an uplink grant associated with the RLC layer, where the uplink grant indicates a set of resources, and transmit, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded.

Another apparatus for wireless communications at a UE is described. The apparatus may include means for receiving one or more RLC PDUs associated with an RLC layer within a receive window, means for receiving an uplink grant associated with the RLC layer, where the uplink grant indicates a set of resources, and means for transmitting, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded.

A non-transitory computer-readable medium storing code for wireless communications at a UE is described. The code may include instructions executable by one or more processors to cause a UE to receive one or more RLC PDUs associated with an RLC layer within a receive window, receive an uplink grant associated with the RLC layer, where the uplink grant indicates a set of resources, and transmit, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded.

Some examples of the method, UEs, and non-transitory computer-readable medium described herein may further include operations, features, means, or instructions for transmitting the first RLC STATUS PDU according to the first type of STATUS PDU may be based on a size of the set of resources indicated in the uplink grant.

In some examples of the method, UEs, and non-transitory computer-readable medium described herein, the single field indicates a NACK for the first RLC STATUS PDU.

In some examples of the method, UEs, and non-transitory computer-readable medium described herein, a quantity of SNs between a start of the receive window and the SN of the first RLC PDU indicates that the UE successfully received one or more RLC PDUs prior to the first RLC PDU within the receive window.

In some examples of the method, UEs, and non-transitory computer-readable medium described herein, the first RLC STATUS PDU indicates a control PDU type field, the control PDU type field indicating the first type of STATUS PDU.

Some examples of the method, UEs, and non-transitory computer-readable medium described herein may further include operations, features, means, or instructions for receiving retransmissions of a subset of the one or more RLC PDUs within the receive window based on transmitting the first RLC STATUS PDU.

In some examples of the method, UEs, and non-transitory computer-readable medium described herein, receiving the uplink grant may include operations, features, means, or instructions for receiving, via the uplink grant, an indication of two or more polling bits, where a value of the two or more polling bits indicates the first type of STATUS PDU and transmitting the first RLC STATUS PDU based on the value of the two or more polling bits.

Some examples of the method, UEs, and non-transitory computer-readable medium described herein may further include operations, features, means, or instructions for transmitting, prior to transmitting the first RLC STATUS PDU, a second RLC STATUS PDU that includes feedback for the one or more RLC PDUs, where transmitting the first RLC STATUS PDU may be based on transmission of the second RLC STATUS PDU failing.

Some examples of the method, UEs, and non-transitory computer-readable medium described herein may further include operations, features, means, or instructions for initiating a timer after transmitting the first RLC STATUS PDU, where transmission of a subsequent RLC STATUS PDU may be based on expiration of the timer.

A method for wireless communications by a UE is described. The method may include receiving one or more RLC PDUs associated with an RLC layer within a receive window, receiving, subsequent to receiving the one or more RLC PDUs, a first uplink grant associated with the RLC layer, where the first uplink grant indicates a first set of resources, transmitting, based on the first set of resources, a first RLC STATUS PDU that includes feedback for a first RLC PDU within the receive window, where the first RLC STATUS PDU includes a first field indicating a SN of the first RLC PDU, receiving, subsequent to transmitting the first RLC STATUS PDU, one or more additional RLC PDUs within the receive window, and transmitting, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

An apparatus for wireless communication at a UE is described. The apparatus may include one or more memories, and one or more processors coupled with the one or more memories. The one or more processors may be configured to cause the UE to receive one or more RLC PDUs associated with an RLC layer within a receive window, receive, subsequent to receiving the one or more RLC PDUs, a first uplink grant associated with the RLC layer, where the first uplink grant indicates a first set of resources, transmit, based on the first set of resources, a first RLC STATUS PDU that includes feedback for a first RLC PDU within the receive window, where the first RLC STATUS PDU includes a first field indicating a SN of the first RLC PDU, receive, subsequent to transmitting the first RLC STATUS PDU, one or more additional RLC PDUs within the receive window, and transmit, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

Another apparatus for wireless communications at a UE is described. The apparatus may include means for receiving one or more RLC PDUs associated with an RLC layer within a receive window, means for receiving, subsequent to receiving the one or more RLC PDUs, a first uplink grant associated with the RLC layer, where the first uplink grant indicates a first set of resources, means for transmitting, based on the first set of resources, a first RLC STATUS PDU that includes feedback for a first RLC PDU within the receive window, where the first RLC STATUS PDU includes a first field indicating a SN of the first RLC PDU, means for receiving, subsequent to transmitting the first RLC STATUS PDU, one or more additional RLC PDUs within the receive window, and means for transmitting, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

A non-transitory computer-readable medium storing code for wireless communications at a UE is described. The code may include instructions executable by one or more processors to cause a UE to receive one or more RLC PDUs associated with an RLC layer within a receive window, receive, subsequent to receiving the one or more RLC PDUs, a first uplink grant associated with the RLC layer, where the first uplink grant indicates a first set of resources, transmit, based on the first set of resources, a first RLC STATUS PDU that includes feedback for a first RLC PDU within the receive window, where the first RLC STATUS PDU includes a first field indicating a SN of the first RLC PDU, receive, subsequent to transmitting the first RLC STATUS PDU, one or more additional RLC PDUs within the receive window, and transmit, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

Some examples of the method, UEs, and non-transitory computer-readable medium described herein may further include operations, features, means, or instructions for transmitting the first RLC STATUS PDU and the second RLC STATUS PDU may be based on a size of the first set of resources indicated in the first uplink grant.

In some examples of the method, UEs, and non-transitory computer-readable medium described herein, the first field indicates a NACK for the first RLC PDU and the second field indicates a NACK for the second RLC PDU.

In some examples of the method, UEs, and non-transitory computer-readable medium described herein, the third field indicates an ACK for a third radio link STATUS PDU corresponding to a highest PDU SN of the received one or more additional RLC PDUs.

Some examples of the method, UEs, and non-transitory computer-readable medium described herein may further include operations, features, means, or instructions for receiving, subsequent to receiving the one or more additional RLC PDUs, a second uplink grant that indicates a second set of resources and transmitting the second RLC STATUS PDU based on the second set of resources.

In some examples of the method, UEs, and non-transitory computer-readable medium described herein, the first RLC STATUS PDU includes one or more segmentation information fields and one or more segment offset fields to indicate a subset of the one or more RLC PDUs.

A method for wireless communications by a UE is described. The method may include receiving one or more RLC PDUs associated with an RLC layer within a receive window, receiving an uplink grant associated with the RLC layer, where the uplink grant indicates a set of resources, and transmitting, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU.

An apparatus for wireless communication at a UE is described. The apparatus may include one or more memories, and one or more processors coupled with the one or more memories. The one or more processors may be configured to cause the UE to receive one or more RLC PDUs associated with an RLC layer within a receive window, receive an uplink grant associated with the RLC layer, where the uplink grant indicates a set of resources, and transmit, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU.

Another apparatus for wireless communications at a UE is described. The apparatus may include means for receiving one or more RLC PDUs associated with an RLC layer within a receive window, means for receiving an uplink grant associated with the RLC layer, where the uplink grant indicates a set of resources, and means for transmitting, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU.

A non-transitory computer-readable medium storing code for wireless communications at a UE is described. The code may include instructions executable by one or more processors to cause a UE to receive one or more RLC PDUs associated with an RLC layer within a receive window, receive an uplink grant associated with the RLC layer, where the uplink grant indicates a set of resources, and transmit, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU.

Some examples of the method, UEs, and non-transitory computer-readable medium described herein may further include operations, features, means, or instructions for transmitting the first RLC STATUS PDU may be based on a size of the set of resources indicated in the uplink grant.

In some examples of the method, UEs, and non-transitory computer-readable medium described herein, the first field and the one or more offset fields indicate respective NACKs for the first RLC PDU and the respective RLC PDUs.

In some examples of the method, UEs, and non-transitory computer-readable medium described herein, the first RLC STATUS PDU includes a second field that indicates a quantity of bits of each of the one or more offset fields.

Some examples of the method, UEs, and non-transitory computer-readable medium described herein may further include operations, features, means, or instructions for determining the quantity of bits based on a size of the receive window and a type of the first RLC STATUS PDU.

In some examples of the method, UEs, and non-transitory computer-readable medium described herein, the first RLC STATUS PDU includes one or more segmentation information fields and one or more segment offset fields to indicate a subset of the one or more RLC PDUs.

In some examples of the method, UEs, and non-transitory computer-readable medium described herein, the first RLC STATUS PDU includes a control PDU type field, the control PDU type field indicating a type of the first RLC STATUS PDU.

A method for wireless communications by a network entity is described. The method may include transmitting one or more RLC PDUs associated with an RLC layer within a receive window, transmitting an uplink grant associated with the RLC layer, where the uplink grant indicates a set of resources, and receiving, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded.

A network entity for wireless communications at a network entity is described. The network entity may include one or more memories storing processor executable code, and one or more processors coupled with the one or more memories. The one or more processors may individually or collectively operable to execute the code to cause the network entity to transmit one or more RLC PDUs associated with an RLC layer within a receive window, transmit an uplink grant associated with the RLC layer, where the uplink grant indicates a set of resources, and receive, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded.

Another network entity for wireless communications at a network entity is described. The network entity may include means for transmitting one or more RLC PDUs associated with an RLC layer within a receive window, means for transmitting an uplink grant associated with the RLC layer, where the uplink grant indicates a set of resources, and means for receiving, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded.

A non-transitory computer-readable medium storing code for wireless communications at a network entity is described. The code may include instructions executable by one or more processors to transmit one or more RLC PDUs associated with an RLC layer within a receive window, transmit an uplink grant associated with the RLC layer, where the uplink grant indicates a set of resources, and receive, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded.

Some examples of the method, network entities, and non-transitory computer-readable medium described herein may further include operations, features, means, or instructions for receiving the first RLC STATUS PDU according to the first type of STATUS PDU may be based on a size of the set of resources indicated in the uplink grant.

In some examples of the method, network entities, and non-transitory computer-readable medium described herein, the single field indicates a NACK for the first RLC STATUS PDU.

In some examples of the method, network entities, and non-transitory computer-readable medium described herein, a quantity of SNs between a start of the receive window and the SN of the first RLC PDU indicates that a UE successfully received one or more RLC PDUs prior to the first RLC PDU within the receive window.

In some examples of the method, network entities, and non-transitory computer-readable medium described herein, the first RLC STATUS PDU indicates a control PDU type field, the control PDU type field indicating the first type of STATUS PDU.

Some examples of the method, network entities, and non-transitory computer-readable medium described herein may further include operations, features, means, or instructions for transmitting retransmissions of a subset of the one or more RLC PDUs within the receive window based on transmitting the first RLC STATUS PDU.

In some examples of the method, network entities, and non-transitory computer-readable medium described herein, transmitting the uplink grant may include operations, features, means, or instructions for transmitting, via the uplink grant, an indication of two or more polling bits, where a value of the two or more polling bits indicates the first type of STATUS PDU and receiving the first RLC STATUS PDU based on the value of the two or more polling bits.

Some examples of the method, network entities, and non-transitory computer-readable medium described herein may further include operations, features, means, or instructions for receiving, prior to transmitting the first RLC STATUS PDU, a second RLC STATUS PDU that includes feedback for the one or more RLC PDUs, where transmitting the first RLC STATUS PDU may be based on transmission of the second RLC STATUS PDU failing.

In some examples of the method, network entities, and non-transitory computer-readable medium described herein, reception of a subsequent RLC STATUS PDU may be based on expiration of a timer.

A method for wireless communications by a network entity is described. The method may include transmitting one or more RLC PDUs associated with an RLC layer within a receive window, transmitting, subsequent to receiving the one or more RLC PDUs, a first uplink grant associated with the RLC layer, where the first uplink grant indicates a first set of resources, receiving, based on the first set of resources, a first RLC STATUS PDU that includes feedback for a first RLC PDU within the receive window, where the first RLC STATUS PDU includes a first field indicating a SN of the first RLC PDU, transmitting, subsequent to transmitting the first RLC STATUS PDU, one or more additional RLC PDUs within the receive window, and receiving, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

A network entity for wireless communications at a network entity is described. The network entity may include one or more memories storing processor executable code, and one or more processors coupled with the one or more memories. The one or more processors may individually or collectively operable to execute the code to cause the network entity to transmit one or more RLC PDUs associated with an RLC layer within a receive window, transmit, subsequent to receiving the one or more RLC PDUs, a first uplink grant associated with the RLC layer, where the first uplink grant indicates a first set of resources, receive, based on the first set of resources, a first RLC STATUS PDU that includes feedback for a first RLC PDU within the receive window, where the first RLC STATUS PDU includes a first field indicating a SN of the first RLC PDU, transmit, subsequent to transmitting the first RLC STATUS PDU, one or more additional RLC PDUs within the receive window, and receive, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

Another network entity for wireless communications at a network entity is described. The network entity may include means for transmitting one or more RLC PDUs associated with an RLC layer within a receive window, means for transmitting, subsequent to receiving the one or more RLC PDUs, a first uplink grant associated with the RLC layer, where the first uplink grant indicates a first set of resources, means for receiving, based on the first set of resources, a first RLC STATUS PDU that includes feedback for a first RLC PDU within the receive window, where the first RLC STATUS PDU includes a first field indicating a SN of the first RLC PDU, means for transmitting, subsequent to transmitting the first RLC STATUS PDU, one or more additional RLC PDUs within the receive window, and means for receiving, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

A non-transitory computer-readable medium storing code for wireless communications at a network entity is described. The code may include instructions executable by one or more processors to transmit one or more RLC PDUs associated with an RLC layer within a receive window, transmit, subsequent to receiving the one or more RLC PDUs, a first uplink grant associated with the RLC layer, where the first uplink grant indicates a first set of resources, receive, based on the first set of resources, a first RLC STATUS PDU that includes feedback for a first RLC PDU within the receive window, where the first RLC STATUS PDU includes a first field indicating a SN of the first RLC PDU, transmit, subsequent to transmitting the first RLC STATUS PDU, one or more additional RLC PDUs within the receive window, and receive, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

Some examples of the method, network entities, and non-transitory computer-readable medium described herein may further include operations, features, means, or instructions for receiving the first RLC STATUS PDU and the second RLC STATUS PDU may be based on a size of the first set of resources indicated in the first uplink grant.

In some examples of the method, network entities, and non-transitory computer-readable medium described herein, the first field indicates a NACK for the first RLC PDU and the second field indicates a NACK for the second RLC PDU.

In some examples of the method, network entities, and non-transitory computer-readable medium described herein, the third field indicates an ACK for a third radio link STATUS PDU corresponding to a highest PDU SN of the received one or more additional RLC PDUs.

Some examples of the method, network entities, and non-transitory computer-readable medium described herein may further include operations, features, means, or instructions for transmitting, subsequent to receiving the one or more additional RLC PDUs, a second uplink grant that indicates a second set of resources and receiving the second RLC STATUS PDU based on the second set of resources.

In some examples of the method, network entities, and non-transitory computer-readable medium described herein, the first RLC STATUS PDU includes one or more segmentation information fields and one or more segment offset fields to indicate a subset of the one or more RLC PDUs.

A method for wireless communications by a network entity is described. The method may include transmitting one or more RLC PDUs associated with an RLC layer within a receive window, transmitting an uplink grant associated with the RLC layer, where the uplink grant indicates a set of resources, and receiving, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU.

A network entity for wireless communications at a network entity is described. The network entity may include one or more memories storing processor executable code, and one or more processors coupled with the one or more memories. The one or more processors may individually or collectively operable to execute the code to cause the network entity to transmit one or more RLC PDUs associated with an RLC layer within a receive window, transmit an uplink grant associated with the RLC layer, where the uplink grant indicates a set of resources, and receive, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU.

Another network entity for wireless communications at a network entity is described. The network entity may include means for transmitting one or more RLC PDUs associated with an RLC layer within a receive window, means for transmitting an uplink grant associated with the RLC layer, where the uplink grant indicates a set of resources, and means for receiving, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU.

A non-transitory computer-readable medium storing code for wireless communications at a network entity is described. The code may include instructions executable by one or more processors to transmit one or more RLC PDUs associated with an RLC layer within a receive window, transmit an uplink grant associated with the RLC layer, where the uplink grant indicates a set of resources, and receive, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU.

Some examples of the method, network entities, and non-transitory computer-readable medium described herein may further include operations, features, means, or instructions for receiving the first RLC STATUS PDU may be based on a size of the set of resources indicated in the uplink grant.

In some examples of the method, network entities, and non-transitory computer-readable medium described herein, the first field and the one or more offset fields indicate respective NACKs for the first RLC PDU and the respective RLC PDUs.

In some examples of the method, network entities, and non-transitory computer-readable medium described herein, the first RLC STATUS PDU includes a second field that indicates a quantity of bits of each of the one or more offset fields.

In some examples of the method, network entities, and non-transitory computer-readable medium described herein, the quantity of bits may be based on a size of the receive window and a type of the first RLC STATUS PDU.

In some examples of the method, network entities, and non-transitory computer-readable medium described herein, the first RLC STATUS PDU includes one or more segmentation information fields and one or more segment offset fields to indicate a subset of the one or more RLC PDUs.

In some examples of the method, network entities, and non-transitory computer-readable medium described herein, the first RLC STATUS PDU includes a control PDU type field, the control PDU type field indicating a type of the first RLC STATUS PDU.

BRIEF DESCRIPTION OF THE DRAWINGS

FIGS. 5A and 5B show examples of STATUS PDU segmentation that supports adaptations to an RLC STATUS PDU in accordance with one or more aspects of the present disclosure.

FIGS. 20 through 25 show flowcharts illustrating methods that support adaptations to an RLC STATUS PDU in accordance with one or more aspects of the present disclosure.

DETAILED DESCRIPTION

Figure 1:
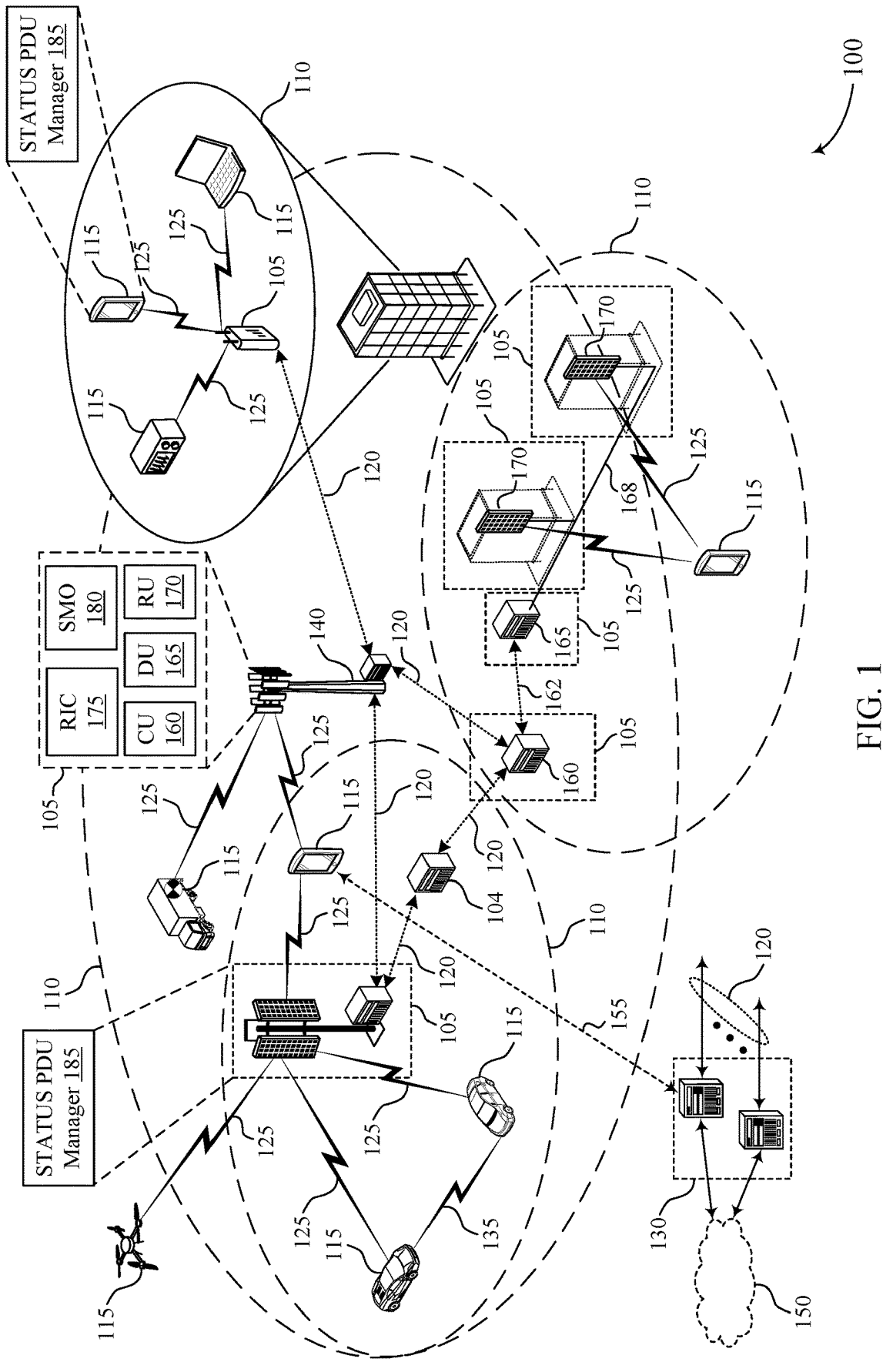
FIG. 1 shows an example of a wireless communications system that supports adaptations to an RLC STATUS PDU in accordance with one or more aspects of the present disclosure.

Some wireless communications systems may support communications between a network entity (e.g., a base station) and a UE. In some implementations, the network entity may transmit PDUs to a UE via an RLC layer and the UE may prepare a STATUS PDU to transmit back to the network entity. The network entity may transmit an uplink grant to the UE for transmitting the status PDU, and the UE may then transmit the STATUS PDU via the resources indicated in the uplink grant. In some examples, subsequent to transmitting the STATUS PDU, the UE may transmit other uplink messages such as data or uplink shared channel messages. This signaling procedure may repeat if the network entity has additional PDUs to transmit in a subsequent burst.

In some examples, PDUs transmitted via the RLC layer may be referred to as RLC PDUs and may include an RLC header and data. In addition, the network entity may transmit uplink grants to the UE, the uplink grants indicating uplink resources via which the UE may transmit a STATUS PDU back to the network entity. A STATUS PDU may be an example of a control PDU and may indicate feedback corresponding to each of the RLC PDUs. In some instances, however, the network entity may not have knowledge of how many uplink resources the UE may use for the STATUS PDU, or without a large enough quantity of uplink resources available for the uplink grant for transmission of the STATUS PDU, the network entity may allocate insufficient resources for the UE. In some examples, there may be other mechanisms at a medium access control (MAC) layer which may provide indications to the network entity of how much data the UE is to send, such as a buffer status report (BSR), however these mechanisms may not account for RLC-layer PDUs. If the uplink grant includes too few uplink resources for the UE to transmit the entire STATUS PDU (e.g., if the uplink grant is too small), the UE may be unable to transmit the STATUS PDU. In such an example, the UE may refrain from transmitting any portion of the STATUS PDU and wait until the network entity transmits an uplink grant that is large enough (e.g., has enough resources) to support the entire STATUS PDU. That is, the UE may transmit the full STATUS PDU or none of the STATUS PDU. As the STATUS PDU may be a prioritized message, this may result in reduced uplink throughput as the UE may refrain from transmitting other messages (e.g., uplink shared channels and other data) over the RLC layer until it transmits the STATUS PDU. In addition, this may result in stress on UE memory, decreased memory efficiency, and increased latency, among other limitations.

The techniques described herein support the adaptation of a STATUS PDU to the size of an uplink grant from a network entity. For example, according to one aspect that is in contrast to the UE transmitting a complete STATUS PDU (and refraining from transmitting any of the STATUS PDU if the uplink grant is too small), the UE may transmit portions of the STATUS PDU to accommodate smaller uplink grants. The UE may receive, from the network entity, one or more RLC PDUs associated with an RLC layer within a receive window. The receive window may indicate a period of time during which the UE may receive transmissions from the network entity. In addition, associated with the RLC layer, the UE may receive an uplink grant from the network entity indicating a set of one or more resources (e.g., uplink resources).

The UE may transmit different STATUS PDUs in response to receiving the PDUs in different circumstances. In one aspect, the UE may transmit a smaller STATUS PDU that indicates feedback corresponding to a sequence number (SN) of a first PDU the UE unsuccessfully decoded instead of indicating feedback for all of the PDUs received within the receive window. In another aspect, the UE may transmit one or more segments or portions of a STATUS PDU at a time instead of transmitting a full STATUS PDU. This may enable the UE to transmit subsequent STATUS PDU segments that are updated at a later time with respect to the first segment. In another aspect, the UE may include one or more offset fields in a STATUS PDU (which may be a full or smaller size) to indicate feedback for multiple PDUs using fewer fields and fewer bits than a regular STATUS PDU (in which each PDU would correspond to its own field).

The UE may support different types of STATUS PDUs, including a first type (e.g., a small STATUS PDU) and a second type (e.g., a regular format STATUS PDU), among other types. In some aspects, the set of resources may be too small to accommodate feedback for each of the PDUs transmitted by the network entity and to be included in the STATUS PDU (e.g., PDUs with NACK feedback). In such cases, the UE may configure and transmit a STATUS PDU of the first type (e.g., a small STATUS PDU). The STATUS PDU may include a single field indicating an SN of a first PDU within the receive window that the UE unsuccessfully decoded. That is, the STATUS PDU of the first type may be smaller than a regular STATUS PDU because it includes a single field (for a first PDU the UE unsuccessfully decoded) rather than multiple fields (for each PDU the UE unsuccessfully decoded). Because the UE failed to successfully decode the first PDU, the field may implicitly indicate a negative acknowledgment (NACK) corresponding to the first PDU. In response to receiving the smaller STATUS PDU, the network entity may begin to retransmit the PDUs within the receive window, which may improve throughput and latency. That is, the network entity may no longer wait to transmit or retransmit PDUs until receiving a full STATUS PDU because the UE is intentionally transmitting a STATUS PDU having a reduced amount of information. This may further support improved uplink throughput, decreased latency, and improved memory.

Alternatively, in response to receiving the set of PDUs and the uplink grant, the UE may transmit segments of the STATUS PDU based on the quantity of resources indicated in the uplink grant. For example, the UE may transmit a first STATUS PDU including a single field that indicates an SN of a first PDU that the UE unsuccessfully decoded. After transmitting the first STATUS PDU, the UE may receive additional PDUs within the receive window and in response, may transmit a second STATUS PDU. The second STATUS PDU may include a second field that indicates an SN of a second PDU that the UE unsuccessfully decoded and a third field that indicates a highest SN of the received additional PDUs. In this way, the UE may transmit segments of a full STATUS PDU to the network entity based on the size of the uplink grant. In addition, such techniques may enable the UE to update the information carried in the STATUS PDU between each segment transmission such that the network entity is receiving the most up-to-date information possible. This may further support improved uplink throughput, decreased latency, and improved memory.

Alternatively, in response to receiving the set of PDUs and the uplink grant, the UE may include one or more offset fields in a STATUS PDU to indicate feedback for multiple PDUs using fewer bits than a full STATUS PDU. For example, based on the quantity of resources indicated in the uplink grant, the UE may transmit a first STATUS PDU that includes a first field indicating an SN of a first PDU that the UE unsuccessfully decoded and one or more offset fields that indicate respective offsets corresponding to SNs of respective PDUs subsequent to the first PDU that the UE unsuccessfully decoded. That is, the first field may correspond to a first PDU and each offset field may indicate an additional PDU using an offset that is with respect to the first field. A value of the bits in each offset field may correspond to the respective PDUs. For example, an offset field corresponding to a value of five may indicate an SN corresponding to a fifth PDU that the UE received after the first PDU. Such techniques may enable the UE to quickly adapt the size of the STATUS PDU based on the size of the uplink grant. In addition, the use of the offset fields may further support increased uplink throughput, decreased latency, and improved memory as the UE no longer is required to support a large reordering window or buffer of feedback information for different PDUs.

Aspects of the disclosure are initially described in the context of wireless communications systems. Aspects of the disclosure are then described in the context of STATUS PDU segmentation, STATUS PDUs, block diagrams, and process flows. Aspects of the disclosure are further illustrated by and described with reference to apparatus diagrams, system diagrams, and flowcharts that relate to adaptations to STATUS PDUs.

FIG. 1 shows an example of a wireless communications system 100 that supports adaptations to STATUS PDUs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node, which may be referred to as a node, a network node, a network entity, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs regarding FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., RLC (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support adaptations to STATUS PDUs as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The UEs 115 and the network entities 105 may support multiple layers of error control (e., error detection, FEC, and retransmission) and feedback communications. In some implementations, a device may support acknowledgment (ACK) and negative acknowledgment (NACK) feedback communicate via the RLC layer, for example, in high throughput systems. A network entity 105 may transmit a large quantity of PDUs to a UE 115 in a burst (e.g., via an RLC layer). In addition, the network entity 105 may transmit an uplink grant to the UE 115 indicating a set of one or more uplink resources via which the UE 115 is to transmit a STATUS PDU to the network entity 105. The STATUS PDU may indicate feedback corresponding to each of the received PDUs. In this way, if the UE 115 receives a large quantity of PDUs, the STATUS PDU may be relatively large (e.g., require a relatively large quantity of uplink resources). However, it may be difficult for the network entity 105 to identify how much information is stored in the UE buffer (which, for particular PDUs, the corresponding SNs may be included in the STATUS PDU) and a sufficient quantity of uplink resources for a large uplink grant. That is, if the size of the uplink grant is insufficient (e.g., too small) for the full STATUS PDU, then the UE 115 may refrain from transmitting the STATUS PDU and the uplink grant may be unused. Subsequently, the network entity 105 may transmit additional PDUs in other bursts and additional uplink grants. The UE 115 may rebuild the STATUS PDU each time it receives a new uplink grant and delay transmission of the STATUS PDU until the UE 115 receives a large enough uplink grant.

The UE 115 being unable to transmit the STATUS PDU until it receives a large enough uplink grant may result in decreased uplink throughput, increased latency, and may stress UE memory. For instance, in high throughput scenarios in which a downlink rate may be much larger than an uplink rate, it may be difficult for the UE 115 to transmit a full STATUS PDU. In addition, the UE 115 may have a large buffer of unacknowledged PDUs (e.g., a PDCP layer may hold too many PDUs for reordering), which may overwhelm and stress the UE's memory and in effect, may reduce the downlink rate of the wireless communications system. In addition, the UE 115 may be unable to segment the STATUS PDU in such systems (e.g., transmit a portion of the STATUS PDU based on the size of the uplink grant), and as such may continuously rebuild the STATUS PDU until a large enough grant arrives. If the STATUS PDU has a higher priority than other transmissions, the UE 115 may refrain from transmitting other messages before the STATUS PDU which may further reduce uplink throughput and increase latency.

The wireless communications system 100 may support techniques for adapting a STATUS PDU based on the size of the uplink grant. For example, the wireless communications system 100 may include UEs 115 and network entities 105 that support STATUS PDU managers 185, which may utilize the techniques described herein to improve uplink throughput, decrease latency, and reduce memory usage. In some aspects, the STATUS PDU manager 185 associated with a UE 115 may receive one or more PDUs within a receive window and via an RLC layer. In addition, the UE 115 may receive an uplink grant that may indicate a set of one or more uplink resources. Based on the set of resources (e.g., a quantity of resources in the set of resources), the UE 115 may configure and transmit a modified STATUS PDU to indicate feedback for each of the received PDUs.

In some examples, if the uplink grant is small (includes too few uplink resources than what may be sufficient for the entire STATUS PDU), the UE 115 may transmit a first type of STATUS PDU (e.g., a small STATUS PDU). The STATUS PDU may include a single field that indicates an SN of a first PDU the UE 115 received but unsuccessfully decoded within the receive window. The first type of STATUS PDU is described herein with reference to FIG. 3. Alternatively, the UE 115 may transmit segments of the STATUS PDU (e.g., a segmented STATUS PDU) based on which PDUs the UE 115 receives and the size of the set of resources. Segmented STATUS PDUs are described herein with reference to FIGS. 4 and 5. In some other cases, the UE 115 may transmit a STATUS PDU (e.g., a compressed STATUS PDU) that includes a first field to indicate an SN of a first PDU the UE 115 received but unsuccessfully decoded within the receive window and one or more offset fields that indicate SNs of respective PDUs the UE 115 received but unsuccessfully decoded subsequent to the first PDU. STATUS PDUs including offset fields are described herein with reference to FIG. 6. The described techniques may reduce latency, improve uplink throughput, and decrease memory consumption at the UE 115.

Figure 2:
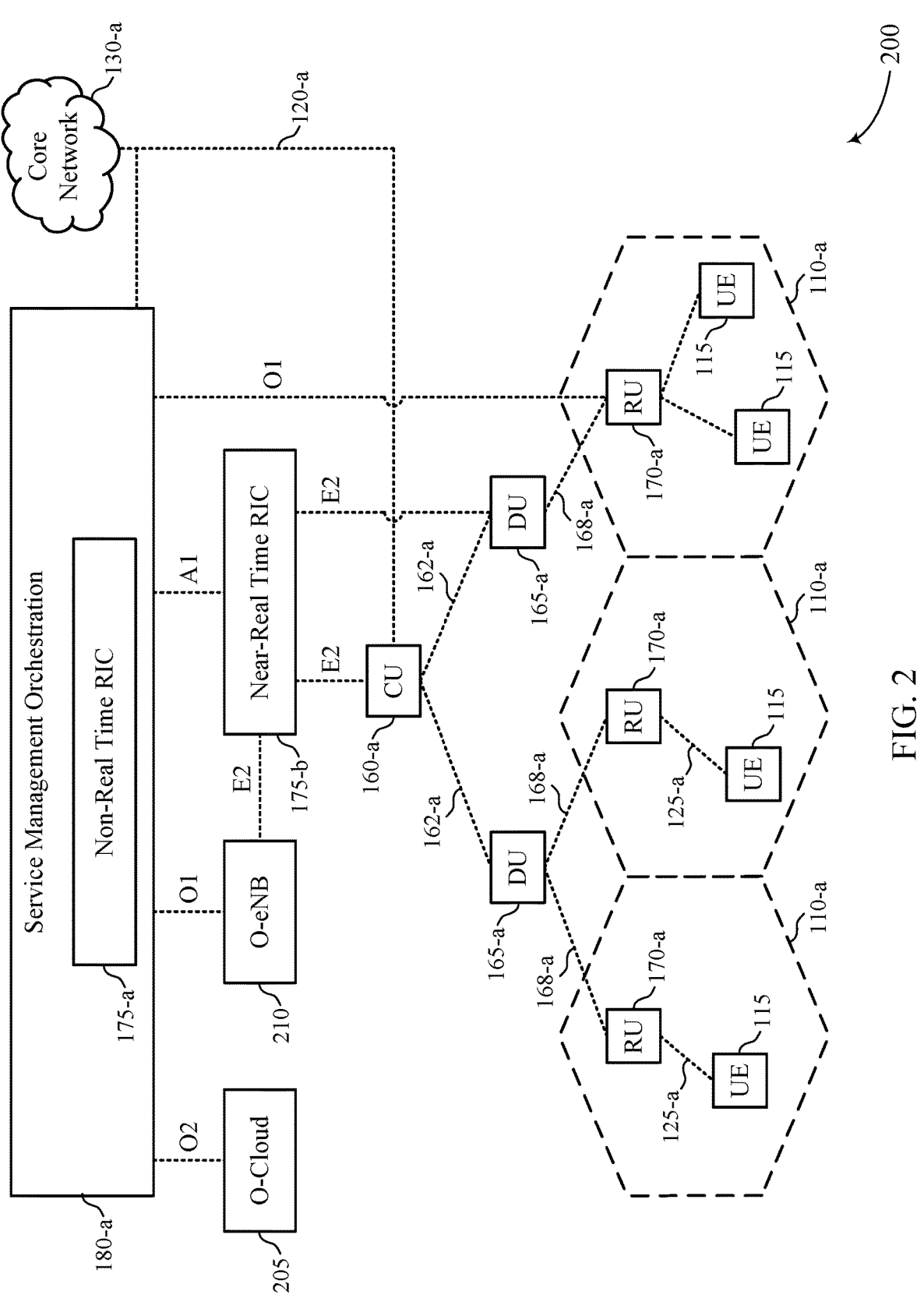
FIG. 2 shows an example of a network architecture that supports adaptations to an RLC STATUS PDU in accordance with one or more aspects of the present disclosure.

FIG. 2 shows an example of a network architecture 200 (e.g., a disaggregated base station architecture, a disaggregated RAN architecture) that supports adaptations to STATUS PDUs in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115 via one or more communication links 125-*a*. In some implementations, a UE 115 may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
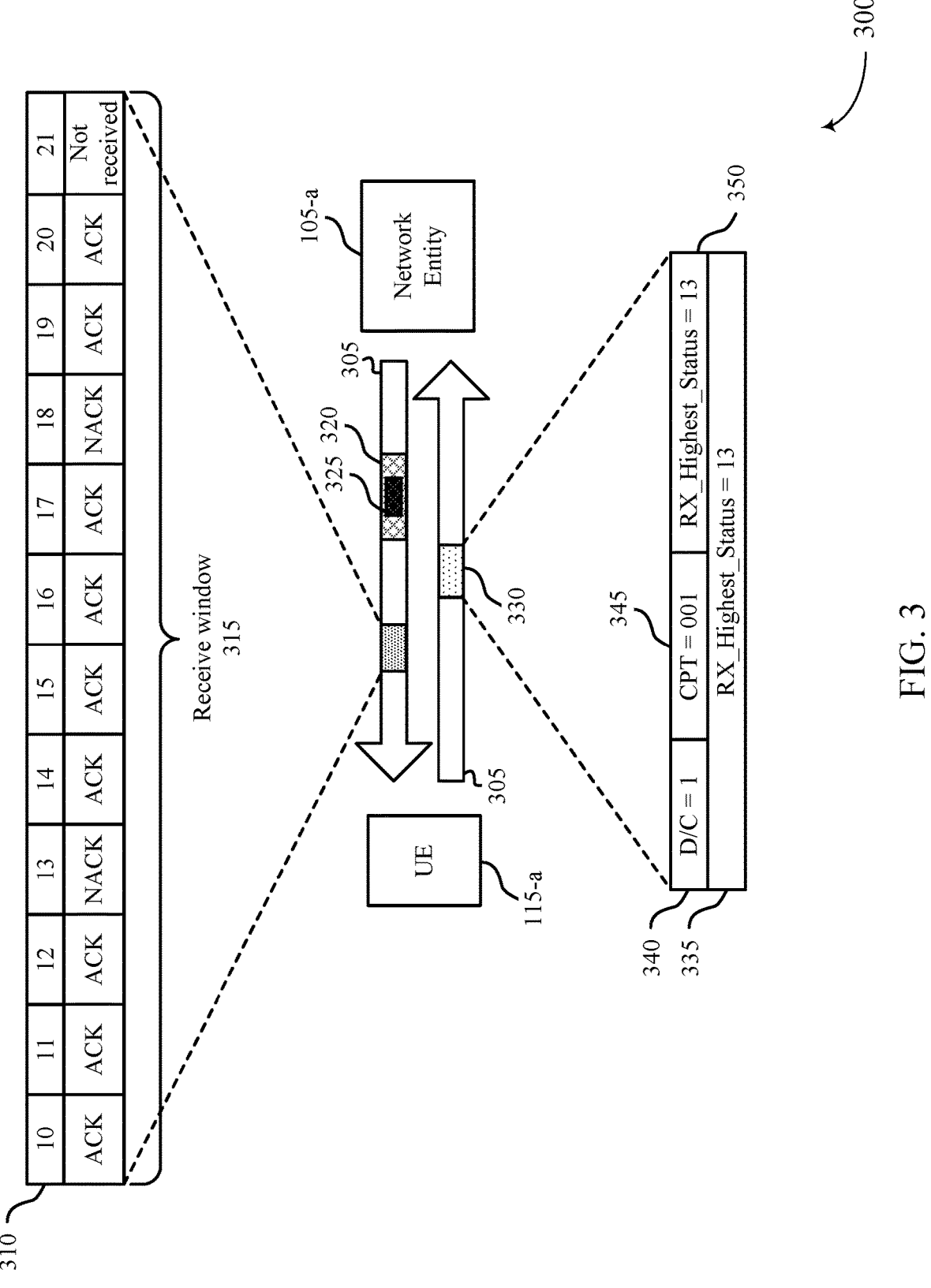
FIGS. 3 and 4 show examples of wireless communications systems that support adaptations to an RLC STATUS PDU in accordance with one or more aspects of the present disclosure.

FIG. 3 shows an example of a wireless communications system 300 that supports adaptations to STATUS PDUs in accordance with one or more aspects of the present disclosure. In some examples, the wireless communications system 300 may implement aspects of the wireless communications system 100 or may be implemented by aspects of the wireless communications system 100. For example, the wireless communications system 300 may include a UE 115-*a* and a network entity 105-*a*, which may be examples of UEs 115 and network entities 105 described herein. In some examples, the UE 115-*a* and the network entity 105-*a* may support STATUS PDU managers 185 as described herein with reference to FIG. 1. The wireless communications system 300 may support high throughput communications, which may include a high downlink rate.

The UE 115-*a* and the network entity 105-*a* may communicate via communication links 305 (e.g., uplinks and downlinks), which may be examples of communication links 125 described herein with reference to FIG. 1. The UE 115-*a* may receive one or more PDUs 310 (e.g., RLC PDUs) from the network entity 105-*a* within a receive window 315. For example, the UE 115-*a* may receive PDUs corresponding to SNs 10 through 20 within the receive window operating in an RLC layer associated with the PDUs 310, the UE 115-*a* may receive an uplink grant 320 from the network entity 105-*a*. The uplink grant 320 may indicate a set of one or more resources (uplink resources) in which the UE 115-*a* may transmit a STATUS PDU 330.

In some examples, the UE 115-*a* may generate the STATUS PDU 330 to indicate feedback (e.g., ACK or NACK) for each PDU 310 received within the receive window 315. In the example of FIG. 3, the UE 115-*a* may receive the PDUs corresponding to the SNs 10 through 20. The UE 115-*a* may successfully decode PDUs corresponding to SNs 10, 11, 12, 14, 15, 16, 17, 19, and 20 (corresponding to ACK feedback) and unsuccessfully decode PDUs corresponding to SNs 13 and 18 (corresponding to NACK feedback). A traditional STATUS PDU may include NACK SN fields (e.g., NACK_SN) to indicate PDUs the UE 115-*a* unsuccessfully received and an ACK SN field (e.g., ACK_SN) to implicitly acknowledge the PDUs received before the corresponding SN. For example, a traditional STATUS PDU based on the receive window 315 may include an ACK_SN=21 field to indicate the last PDU in the receive window 315 and implicitly indicate the SNs 10 through 20 preceding this last PDU, and the STATUS PDU may include NACK SN fields NACK_SN=13 and NACK_SN=18 indicating that the UE 115-*a* unsuccessfully decoded the PDUs corresponding to SNs 13 and 18. Each NACK SN field may utilize an entire octet (e.g., eight bits) of the STATUS PDU. In addition, the traditional STATUS PDU may include other optional fields and reserved bits to indicate additional information about the PDUs 310. However, because each NACK SN field requires an octet, the STATUS PDU may increase in size by 16 to 64 bits for every NACK PDU.

The wireless communications system 300 may support techniques that enable the UE 115-*a* to adapt the size of a STATUS PDU 330 based on the set of resources 325 indicated in the uplink grant 320. In some examples, the UE 115-*a* may transmit the STATUS PDU 330 based on a first type of STATUS PDU (e.g., a small STATUS PDU). The STATUS PDU 330 may include a field 335 (e.g., a single field) that indicates an SN of a first PDU within the receive window 315 that the UE 115-*a* unsuccessfully decoded. In this way, the field 335 may indicate a NACK for the SN 13. In addition, the field 335 may implicitly indicate that all SNs before the first SN correspond to PDUs that the UE 115-*a* successfully decoded. That is, a quantity of SNs between a start of the receive window 315 and the SN of the first PDU (e.g., SN 13) indicates that the UE 115-*a* successfully received one or more PDUs prior to the first PDU within the receive window 315. For example, the field 335 may indicate that SN 13 corresponds to the first unsuccessfully decoded PDU within the receive window 315 (e.g., RX_Highest_Status=13), which may also indicate that the UE 115-*a* successfully received PDUs with SNs 10, 11, and 12 (preceding SN 13).

In addition to the field 335, the STATUS PDU 330 may include an RLC header including a field 340 (e.g., D/C=1) indicating whether the STATUS PDU 330 is for data (D) or control (C). A value of 0 in the field 340 may indicate a control PDU and a value of 1 may indicate a data PDU. In addition, the STATUS PDU 330 may include a field 345 (e.g., CPT=001) indicating a control PDU type (CPT). For example, a value of 0 (e.g., 000) in the field 345 may indicate a traditional STATUS PDU and a value of 1 (e.g., 001) in the field 345 may indicate a first type of STATUS PDU (e.g., a small STATUS PDU). In some examples, a field 350 in the STATUS PDU 330 may be an ACK SN field (e.g., ACK_SN). In the example of FIG. 3, as the SN 13 is the highest SN included in the STATUS PDU 330, the field 350 also indicates the SN 13 (e.g., RX_Highest_Status=13).

In some examples, if a downlink rate is much larger than an uplink rate in the wireless communications system 300, the network entity 105-*a* may begin retransmitting at least a subset of the PDUs 310 within the receive window 315 based on receiving the STATUS PDU 330 (and before receiving the full STATUS PDU for all of the PDUs 310). This may enable the network entity 105-*a* to manage transmitter-size flow control (e.g., data rate control) as the network entity 105-*a* may prefer to retransmit some PDUs 310 before receiving a full STATUS PDU. In addition, the STATUS PDU 330 may enable the network entity 105-*a* to continuously transmit PDUs 310 as long as the field 335 (e.g., RX_Highest_Status) closely tracks a transmitter window.

If the UE 115-*a* has acknowledged (via ACK or NACK) some subset of the PDUs 310 received within the receive window 315 (e.g., the SNs 10 through 13), and if the UE 115-*a* has limited memory, then the UE 115-*a* may drop PDUs after those indicated in the STATUS PDU 330 (e.g., SNs 14 through 20). In some examples, the UE 115-*a* ma drop the PDUs if it knows the network entity 105-*a* is to retransmit them. This may prevent a receive buffer (e.g., queue) from overflowing or beginning to overflow at the UE 115-*a*.

The UE 115-*a* may be triggered to transmit the STATUS PDU 330 (e.g., a first type of STATUS PDU) in numerous ways. For example, the uplink grant 320 may include two polling bits, where a value of the polling bits indicates a type of STATUS report (e.g., STATUS PDU) the UE 115-*a* is to transmit. For example, a value 00 of the polling bits may indicate that no STATUS report is requested, a value 01 may indicate that a full STATUS PDU is requested, a value of 10 may indicate that a first type of STATUS PDU (e.g., a small STATUS PDU) is requested, and a value of 11 may indicate that the polling bits are reserved. As such, the UE 115-*a* may transmit the STATUS PDU 330 when the polling bits indicate a value of 10 (e.g., referred to as soft polling).

Alternatively, the UE 115-*a* may select between transmitting a full STATUS PDU and the first type of STATUS PDU (e.g., the small STATUS PDU) based on a size of the set of resources 325 indicated in the uplink grant 320. For example, if the set of resources 325 is too small to accommodate a full STATUS PDU, the UE 115-*a* may determine to transmit the smaller STATUS PDU 330 such that it fits within the set of resources 325 provided. In this way, the STATUS PDU 330 may include less information than a full STATUS PDU, but nonetheless may include essential information based on the one or more PDUs 310 received within the receive window 315. If the uplink grant is large enough to accommodate the full STATUS PDU, the UE 115-*a* may transmit a full STATUS PDU instead of the STATUS PDU 330.

Alternatively, if an initial STATUS report fails due to a segmentation or HARQ error, the UE 115-*a* may instead transmit a first type of STATUS PDU in a subsequent STATUS report transmission. For example, the UE 115-*a* may transmit a full STATUS PDU prior to transmitting the STATUS PDU 330. If the full STATUS PDU fails, then the UE 115-*a* may transmit the STATUS PDU 330 in a subsequent STATUS report transmission.

In some examples, the UE 115-*a* may use a timer to determine when to transmit a small STATUS PDU or a full STATUS PDU. For example, the UE 115-*a* may initiate a timer (e.g., t-StatusProhibit) after transmitting the STATUS PDU 330. The UE 115-*a* may transmit a subsequent STATUS PDU (e.g., which may be a small or full STATUS PDU) based on expiration of the timer. In this way, the UE 115-*a* may refrain from transmitting STATUS PDUs too soon after each other.

Figure 4:
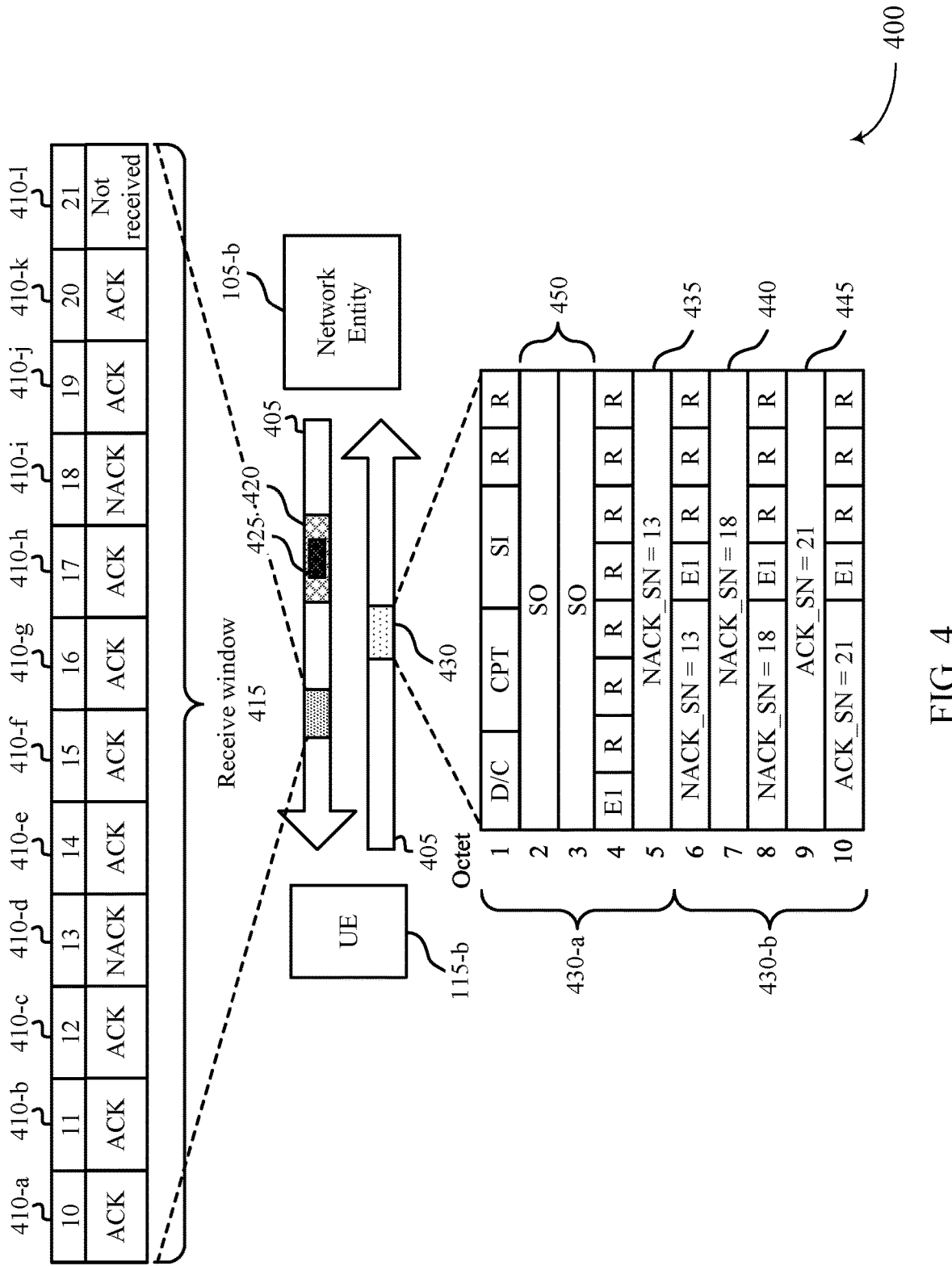

FIG. 4 shows an example of a wireless communications system 400 that supports adaptations to STATUS PDUs in accordance with one or more aspects of the present disclosure. In some examples, the wireless communications system 400 may implement aspects of the wireless communications system 100 or may be implemented by aspects of the wireless communications system 100. For example, the wireless communications system 400 may include a UE 115-*b* and a network entity 105-*b*, which may be examples of UEs 115 and network entities 105 described herein.

The UE 115-*b* and the network entity 105-*b* may communicate via communication links 405 (e.g., uplinks and downlinks), which may be examples of communication links 125 described herein with reference to FIG. 1. The UE 115-*b* may receive one or more PDUs 410 (e.g., RLC PDUs) from the network entity 105-*b* within a receive window 415. For example, the UE 115-*b* may receive PDUs 410-*a*, 410-*b*, 410-*c*, 410-*e*, 410-*f*, 410-*g*, 410-*h*, 410-*i*, 410-*j*, and 410-*k* corresponding to SNs 10 through 20 and associated with an RLC layer within the receive window 415 (the UE 115-*b* may not receive a PDU 410-1 corresponding to the SN 21). In addition, the UE 115-*b* may receive an uplink grant 420 from the network entity 105-*b* associated with the RLC layer. The uplink grant 420 may indicate a set of one or more resources (uplink resources) in which the UE 115-*b* may transmit a STATUS PDU 430.

In some examples, the UE 115-*b* may generate the STATUS PDU 430 to indicate feedback (e.g., ACK or NACK) for each PDU 410 received within the receive window 415. In addition, the UE 115-*b* may divide the STATUS PDU 430 into segments including the STATUS PDU segment 430-*a* and the STATUS PDU segment 430-*b*. In the example of FIG. 4, the UE 115-*b* may receive the PDUs 410-*a*, 410-*b*, 410-*c*, 410-*d*, and 410-*e* corresponding to the SNs 10 through 14 prior to transmitting the STATUS PDU segment 430-*a*. The UE 115-*b* may receive and unsuccessfully decode the PDU 410-*d* corresponding to the SN 13. As such, the UE 115-*b* may segment the STATUS PDU based on the PDU 410-*d*.

The wireless communications system 400 may support techniques that enable the UE 115-*b* to transmit segments of a full STATUS PDU based on the set of resources 425 indicated in the uplink grant 420. In some examples, the UE 115-*b* may transmit a STATUS PDU segment 430-*a* based on the set of resources 425. For example, a quantity of fields of the STATUS PDU segment 430-*a* (e.g., a quantity of PDUs for which the STATUS PDU segment 430-*a* includes NACK information) may depend on a quantity of resources of the set of resources 425. The STATUS PDU segment 430-*a* may include feedback (e.g., a NACK) for the PDU 410-*d* within the receive window 415 that the UE 115-*b* unsuccessfully decoded (e.g., corresponding to SN 13). For example, the STATUS PDU segment 430-*a* may include a field 435 that indicates SN 13 corresponding to the first unsuccessfully decoded PDU (e.g., the PDU 410-*d*) within the receive window 415. The field 435 may be a NACK SN field (e.g., NACK_SN=13). In such cases, the STATUS PDU segment 430-*a* may exclude feedback for the PDUs received prior to the SN 13 (e.g., the PDUs 410-*a*, 410-*b*, and 410-*c* corresponding to the SNs 10 through 12). That is, the STATUS PDU segment 430-*a* may lack any fields corresponding to the PDUs 410-*a*, 410-*b*, and 410-*c*. In the example of FIG. 4, the STATUS PDU segment 430-*a* may exclude information (related to the SNs prior to the PDU referred to by the NACK SN field (e.g., SNs 10 through 12), and exclude information related to the SNs subsequent to the SN referred to in the NACK SN field (e.g., may exclude an ACK SN field).

Subsequent to transmitting the STATUS PDU segment 430-*a*, the UE 115-*b* may receive one or more additional PDUs 410 within the receive window 415. For example, the UE 115-*b* may receive the PDUs 410-*f*, 410-*g*, 410-*h*, 410-I, 410-*j*, and 410-*k* corresponding to the SNs 15 through 20. The UE 115-*b* may successfully decode some of these PDUs 410 (e.g., SNs 15, 16, 17, 19, and 20, which correspond to ACKs) and not successfully decode some other PDUs 410 (e.g., SN 18, which corresponds to a NACK). In some examples, the UE 115-*b* may then receive a second uplink grant that indicates a second set of one or more resources. Based on receiving the additional PDUs 410 (and the second uplink grant), the UE 115-*b* may transmit a STATUS PDU segment 430-*b* that includes feedback (e.g., a NACK) for a second PDU within the receive window 415 that the UE 115-*b* unsuccessfully decoded. The STATUS PDU segment 430-*b* may include a field 440 that indicates SN 18 corresponding to the second unsuccessfully decoded PDU 410-*i* (subsequent to the first PDU) within the receive window 415. The field 440 may be a NACK SN field (e.g., NACK_SN=18). In addition, the STATUS PDU segment 430-*b* may include a field 445 that indicates an SN corresponding to a PDU subsequent to the second PDU 410. For example, the field 445 may be an ACK SN field (e.g., ACK_SN=21) indicating the last PDU in the receive window 415 (e.g., the PDU corresponding to SN 21). That is, the field 445 may indicate a third PDU corresponding to a highest SN of the PDUs 410 within the receive window 415 (e.g., the SN 21). The STATUS PDU segments 430-*a* and 430-*b* are described herein with reference to FIG. 6.

By including the field 445 (e.g., ACK_SN=21) at the end of the STATUS PDU 430 instead of at the beginning may enable the UE 115-*b* to update the field 445 on the fly between segment transmission, such that the STATUS PDU segments 430-*a* and 430-*b* may convey the latest available information at the UE 115-*b* to the network entity 105-*b*. The UE 115-*b* may update the STATUS PDU segments 430-*a* and 430-*b* between transmissions. For example, the STATUS PDU segment 430-*b* may include updated feedback information with respect to the STATUS PDU segment 430-*a*.

In some examples, the STATUS PDU 430 may include an RLC header including a D/C field indicating whether the STATUS PDU 430 is associated with data or control and a CPT field indicating a type of the STATUS PDU 430 (e.g., a first type or small STATUS PDU). In addition, the STATUS PDU 430 may include one or more segment information (SI) fields and one or more segment offset (SO) fields 450. An SO field 450 may indicate how each of the STATUS PDU segments 430-*a*, 430-*b*, and any other STATUS PDU segments may be connected to form the STATUS PDU 430. For example, the SO fields 450 may indicate that the STATUS PDU segment 430-*a* includes information the UE 115-*b* processed prior to the information included in the STATUS PDU segment 430-*b*. Additionally, or alternatively, the STATUS PDU 430 may include one or more reserve bits (e.g., R) and one or more extension fields (e.g., E1) which may indicate the existence a specific optional field (such as an SI or an SO field 450).

The UE 115-*b* may generate and transmit more than two STATUS PDU segments based on how many PDUs 410 it receives and the length of the receive window 415, among other factors. In such cases, the UE 115-*b* may update feedback information for each subsequent STATUS PDU segment it may transmit. The STATUS PDU segment 430-*a* (e.g., a first segment) and any intermediate segments may include fields such as the SO fields 450 and the NACK SN fields (e.g., the field 435) corresponding to unsuccessfully decoded PDUs 410, and may exclude fields such as a field 445 (e.g., an ACK SN field) which may indicate the ending of a STATUS PDU. The STATUS PDU segment 430-*b* (e.g., a last segment) may include NACK SN fields and the field 445 to indicate that this is the last segment of the STATUS PDU.

In some examples, the UE 115-*b* may select the STATUS PDU 430 (e.g., a segmented STATUS PDU instead of a full STATUS PDU) based on a size of the set of resources 425 indicated in the uplink grant 420. For example, if the set of resources 425 is too small to accommodate a full STATUS PDU, the UE 115-*b* may determine to transmit the STATUS PDU segments 430-*a* and 430-*b* which may fit within the set of resources 425 provided.

FIG. 5A shows an example of STATUS PDU segmentation 500-*a* 500-*b* that supports adaptations to STATUS PDUs in accordance with one or more aspects of the present disclosure. In some examples, the STATUS PDU segmentation 500-*b* 500-*a* may implement aspects of the wireless communications systems 100 and 400 or may be implemented by aspects of the wireless communications systems 100 and 400. For example, a UE 115 may transmit STATUS PDU segments (in accordance with the STATUS PDU segmentation 500-*a* 500-*b*) instead of a full STATUS PDU based on a set of resources allocated by a network entity 105. The STATUS PDU segmentation 500-*a* may be associated with a time t1 500-*b*

The UE 115 may receive one or more PDUs 505-*a* (e.g., RLC PDUs) within a receive window at a first time t1. For example, the UE 115 may receive PDUs corresponding to SNs 10 through 15 within the receive window at t1. Of these PDUs, the UE 115 may successfully decode the PDUs corresponding to SNs 10, 11, 12, 14, and 15, as indicated by ACKs, and unsuccessfully decode the PDU corresponding to SN 13, as indicated by a NACK. In addition, the UE 115 may receive an uplink grant that indicates a first set of resources.

As described herein with reference to FIG. 4, the UE 115 may transmit a STATUS PDU 510-*a* (e.g., a first segment) based on the set of resources. The STATUS PDU 510-*a* may include feedback (e.g., a NACK) for a first PDU within the receive window that the UE unsuccessfully decoded. For example, the STATUS PDU 510-*a* may include a field (e.g., NACK_SN=13) that indicates the SN 13 corresponding to the first unsuccessfully decoded PDU within the receive window at t1. The STATUS PDU 510-*a* may additionally include a D/C field, a CPT field, one or more extension fields, one or more reserved bit fields, and an SI field indicating that segmentation is enabled for the STATUS PDU 510-*a*. As the STATUS PDU 510-*a* is a STATUS PDU segment, the STATUS PDU 510-*a* may exclude feedback information corresponding to SNs the UE 115 received prior to the SN 13 or information that is included in prior STATUS PDU segments. In this way, the STATUS PDU 510-*a* may, when complete, include the most up-to-date information available.

FIG. 5B shows an example of STATUS PDU segmentation 500-*b* that supports adaptations to STATUS PDUs in accordance with one or more aspects of the present disclosure. In some examples, the STATUS PDU segmentation 500-*b* may implement aspects of the wireless communications systems 100 and 400 or may be implemented by aspects of the wireless communications systems 100 and 400. For example, a UE 115 may transmit STATUS PDU segments (in accordance with the STATUS PDU segmentation 500-*b*) instead of a full STATUS PDU based on a set of resources allocated by a network entity 105. The STATUS PDU segmentation 500-*b* may be associated with a time t2.

Following the STATUS PDU segmentation 500-*a* as described herein with reference to FIG. 5A, the UE 115 may implement the STATUS PDU segmentation 500-*b* at a time t2. The UE 115 may receive additional PDUs corresponding to SNs 16 through 19 within the receive window at t2. The UE 115 may successfully decode the PDUs corresponding to SNs 16, 17, and 19, as indicated by ACKs, and unsuccessfully decode the PDU corresponding to SN 19, as indicated by a NACK. In addition, the UE 115 may receive a second uplink grant that indicates a second set of resources.

The UE 115 may transmit a STATUS PDU 510-*b* (e.g., a second segment) based on the second set of resources. The STATUS PDU 510-*b* may include feedback (e.g., a NACK) for a second one or more PDUs 505-*b* within the receive window that the UE unsuccessfully decoded. For example, the STATUS PDU 510-*b* may include a field (e.g., NACK_SN=18) that indicates the SN 18 corresponding to the second unsuccessfully decoded PDU within the receive window at t2 (subsequent to the first PDU). In addition, the STATUS PDU 510-*b* may include ACK SN fields (e.g., ACK_SN=20) indicating the last PDU in the receive window at the time t2 (e.g., SN 20). The STATUS PDU 510-*b* may additionally include a D/C field, a CPT field, one or more extension fields, one or more reserved bit fields, and one or more SO fields and an SI field indicating that segmentation is enabled for the STATUS PDU 510-*b*.

The UE 115 may generate and transmit more than two STATUS PDU segments based on how many PDUs it receives and the length of the receive window, among other factors. In such cases, the UE 115 may update feedback information for each subsequent STATUS PDU segment it may transmit. A first segment and any intermediate segments may include fields such as SO fields and NACK SN fields (e.g., the NACK SN field) corresponding to unsuccessfully decoded PDUs, and may exclude fields such as an ACK SN field which may indicate the ending of a STATUS PDU. A last STATUS PDU segment may include an ACK SN field (e.g., and may include one or more NACK SN fields) to indicate that this is the last segment of the STATUS PDU.

As the UE 115 may update a STATUS PDU between segment transmissions, the STATUS PDU 510-*b* may include the newest (e.g., latest, most-recently updated) information. By including the ACK SN field at the end of the STATUS PDU 510-*b*, the UE 115 may update a STATUS PDU segment in real-time (to include different or additional PDU feedback). In addition, segmentation of the STATUS PDU ensures that the UE 115 uses each uplink grant it receives from the network entity 105 rather than leaving uplink grants unused if they are too small for the full STATUS PDU.

Figure 6:
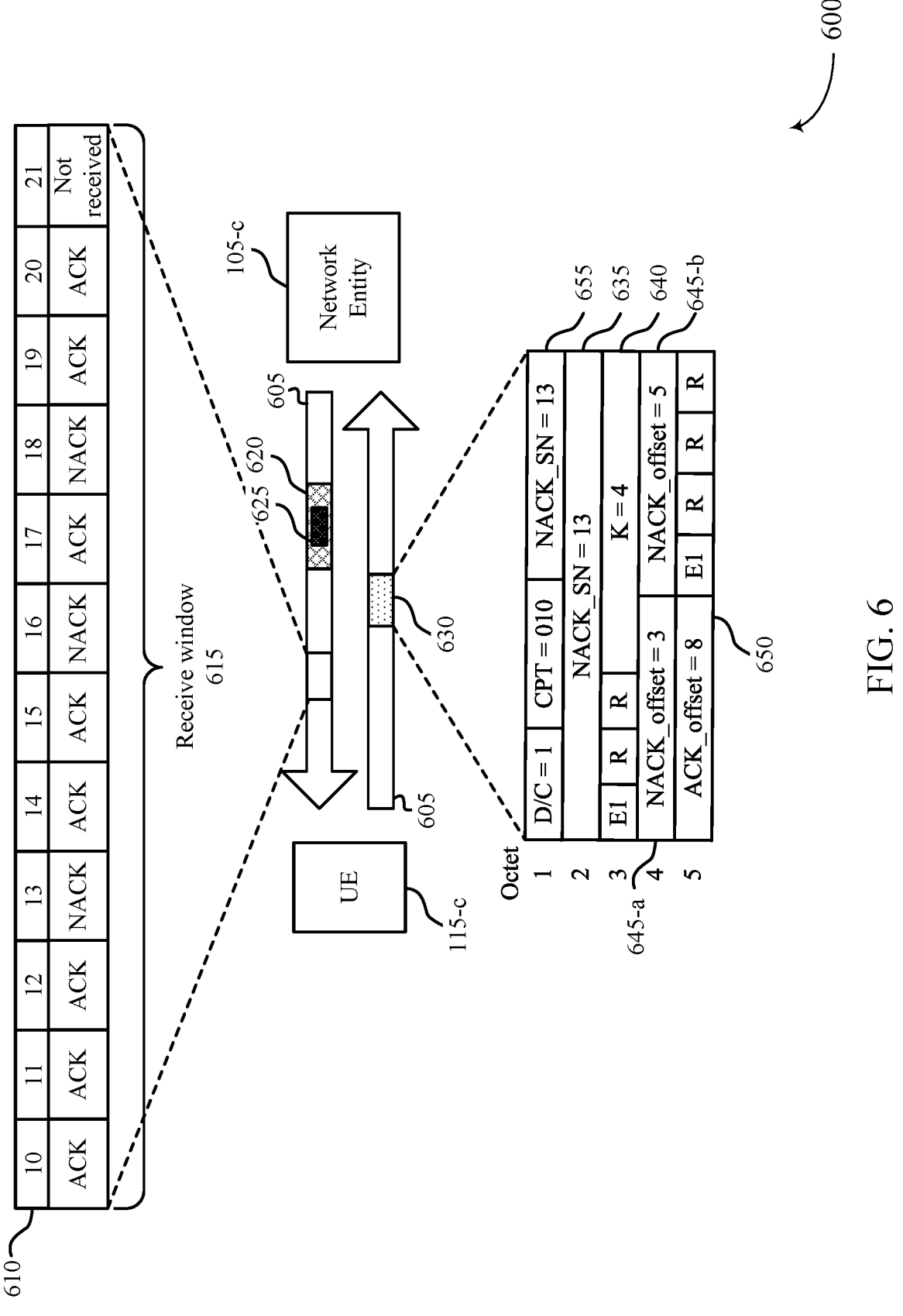
FIG. 6 shows an example of a wireless communications system that supports adaptations to an RLC STATUS PDU in accordance with one or more aspects of the present disclosure.

FIG. 6 shows an example of a wireless communications system 600 that supports adaptations to STATUS PDUs in accordance with one or more aspects of the present disclosure. In some examples, the wireless communications system 600 may implement aspects of the wireless communications system 100 or may be implemented by aspects of the wireless communications system 100. For example, the wireless communications system 600 may include a UE 115-*c* and a network entity 105-*c*, which may be examples of UEs 115 and network entities 105 described herein.

The UE 115-*c* and the network entity 105-*c* may communicate via communication links 605 (e.g., uplinks and downlinks), which may be examples of communication links 125 described herein with reference to FIG. 1. The UE 115-*c* may receive one or more PDUs 610 (e.g., RLC PDUs) from the network entity 105-*c* within a receive window 615. For example, the UE 115-*c* may receive PDUs corresponding to SNs 10 through 20 and associated with an RLC layer within the receive window 615 (the UE 115-*c* may not receive a PDU corresponding to the SN 21). In addition, the UE 115-*c* may receive an uplink grant 620 associated with the RLC layer from the network entity 105-*c*. The uplink grant 620 may indicate a set of resources (uplink resources) in which the UE 115-*c* may transmit a STATUS PDU 630.

In some examples, the UE 115-*c* may generate the STATUS PDU 630 to indicate feedback (e.g., ACK or NACK) for each PDU 610 received within the receive window 615. In the example of FIG. 6, the UE 115-*c* may receive the PDUs corresponding to the SNs 10 through 20. The UE 115-*a* may successfully decode the PDUs corresponding to the SNs 10, 11, 12, 14, 15, 17, 19, and 20 (corresponding to ACK feedback) and unsuccessfully decode the PDUs corresponding to the SNs 13, 16, and 18 (corresponding to NACK feedback). Effectively, the STATUS PDU 630 may encode a bit string "11101111011" beginning at SN 10, where a total length (in bits) of the STATUS PDU 630 may include 16 to 24 bits for encoding every NACK SN field, 16 bits to indicate offsets, 8 bits to encode run values, and 16 to 24 bits for overhead to include a single ACK SN field. As such, the total length of the STATUS PDU 630 may quickly increase based on how many PDUs the UE 115-*c* unsuccessfully decodes.

To reduce the size of the STATUS PDU 630, the wireless communications system 600 may support techniques that may enable the UE 115-*c* to indicate additional NACK SNs via variable length offset fields in the STATUS PDU 630. Based on the set of resources 625, the UE 115-*c* may transmit the STATUS PDU 630 that includes feedback for a first PDU received within the receive window 615 that the UE 115-*c* unsuccessfully decoded. The STATUS PDU 630 may include a field 635 corresponding to the first PDU and one or more offset fields 645 that indicate respective offsets corresponding to SNs of respective PDUs subsequent to the first PDU that the UE 115-*c* unsuccessfully decoded. In such cases, the UE 115-*c* may include only the first NACK SN field in the STATUS PDU 630 and indicate all subsequent NACK SNs in the STATUS PDU 630 as offsets in the respective fields 635 using K bits (e.g., least significant bits (LSBs)).

In the example of FIG. 6, the field 635 may indicate a NACK for the SN 13 (e.g., NACK_SN=13). In addition, each offset field 645 may include a quantity of K bits which indicate a difference (in SN) between the SN 13 corresponding to the first PDU and the SN corresponding to the next PDU that the UE 115-*c* unsuccessfully decoded within the receive window. For example, an offset field 645-*a* may include an offset of 3 SNs (e.g., NACK_offset=3), which indicates the SN 16 (3 PDUs later than the first PDU corresponding to the SN 13). In addition, an offset field 645-*b* may include an offset of 5 SNs (e.g., NACK_offset=5), which indicates the SN 18 (5 PDUs later than the first PDU corresponding to the SN 13). The offset fields 645 may indicate a NACK for the respective SNs and PDUs using fewer bits than a full NACK SN field (which may include up to 8 bits). Each offset field 645 may include a quantity of K bits as indicated in a field 640. For example, as the field 640 indicates K=4, each offset field 645 in the STATUS PDU 630 may include 4 bits. Additional details describing how the UE 115 determines K and generates the STATUS PDU 630 are described herein with reference to FIG. 7. In addition, the STATUS PDU 630 may include an ACK offset field 650 (e.g., ACK_offset=8) indicating an offset between the SN 13 and the last PDU in the receive window 615 (e.g., the PDU corresponding to SN 21). The ACK offset field 650 may also include 4 bits according to the field 640.

In some examples, the UE 115-*a* may transmit the STATUS PDU 630 based on a size of the set of resources 625 indicated in the uplink grant 620. For example, if the set of resources 625 is too small to accommodate a full STATUS PDU, the UE 115-*c* may determine to transmit the smaller STATUS PDU 630 such that it fits within the set of resources 625 provided. The STATUS PDU 630 may additionally include a D/C field (e.g., D/C=1 indicating a data PDU), a CPT field (e.g., CPT=010 indicating that the STATUS PDU 630 is a compressed STATUS PDU format), one or more extension fields, one or more reserved bit fields, and an SO field 655 (e.g., a four-bit field) indicating that the SN 13 is the NACK SN from which the UE 115-*c* may measure each offset (e.g., NACK_SN=13).

Figure 7:
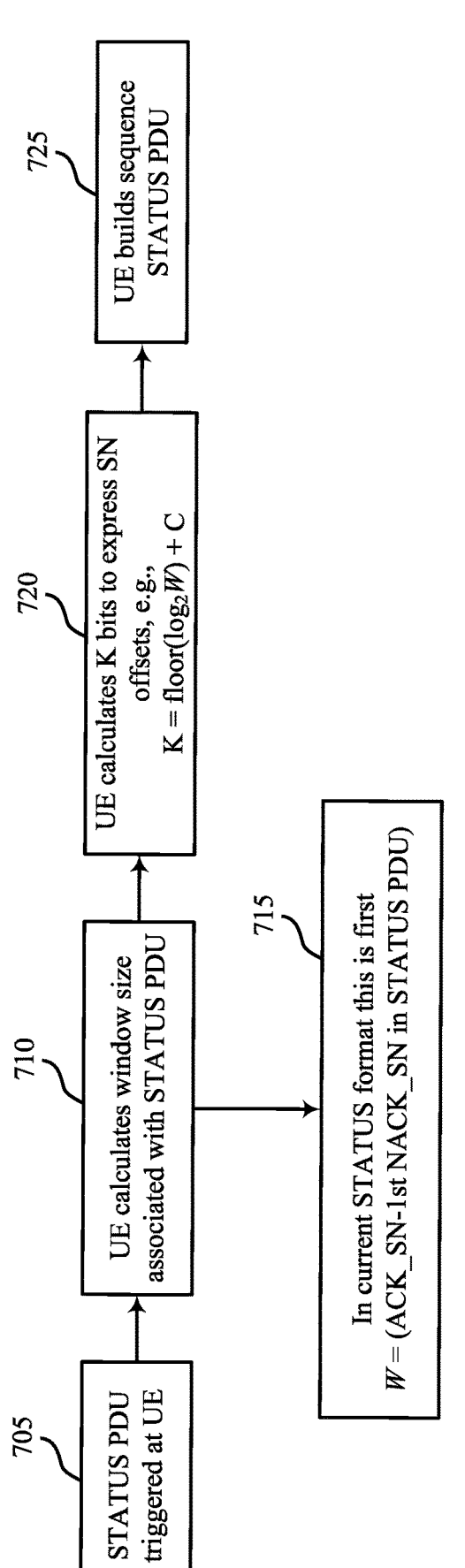
FIG. 7 shows an example of a block diagram that supports adaptations to an RLC STATUS PDU in accordance with one or more aspects of the present disclosure.
Figure 7:

FIG. 7 shows an example of a block diagram 700 that supports adaptations to STATUS PDUs in accordance with one or more aspects of the present disclosure. In some examples, the block diagram 700 may implement aspects of the wireless communications systems 100 and 600 or may be implemented by aspects of the wireless communications systems 100 and 600. For example, a UE 115 may utilize the process depicted in the block diagram 700 to determine a quantity of bits, K, of each offset field included in a compressed STATUS PDU (e.g., the STATUS PDU 630 as described herein with reference to FIG. 6.) the wireless communications system 600 may include a UE 115-*c* and a network entity 105-*c*, which may be examples of UEs 115 and network entities 105 described herein.

At 705, the UE 115 may be triggered to generate and transmit a STATUS PDU. For example, as described herein, the UE 115 may receive one or more RLC PDUs associated with an RLC layer within a receive window. Additionally, the UE 115 may receive an uplink grant that indicates a set of one or more resources (e.g., uplink resources) via which the UE 115 may transmit the STATUS PDU. In some examples, the UE 115 may be triggered to transmit a modified STATUS PDU, such as a compressed STATUS PDU 630, based on a size of the set of resources. For example, if the quantity of resources in the set is too small to accommodate a full STATUS PDU, the UE 115 may determine to generate a compressed STATUS PDU which may include fewer bits.

At 710, the UE 115 may calculate a window size W (measured in SNs) associated with the STATUS PDU, which may indicate how many SNs the UE 115 is to include information for in the STATUS PDU. To determine or calculate W, the UE 115 may identify the last SN the UE 115 may receive within the receive window (e.g., SN 21) and the first SN the UE 115 received but unsuccessfully decoded within the receive window (e.g., SN 13). As such, the window size may include SN 13 through SN 21 (e.g., based on the receive window 615 described herein with reference to FIG. 6). For example, at 715, the UE 115 may calculate W as W=(ACK_SN-1st NACK_SN in STATUS PDU) (e.g., W=(21-13)=8).

At 720, the UE 115 may calculate a quantity of K bits that the UE 115 may include in the STATUS PDU to indicate SN offsets. For example, the UE 115 may calculate K as K=floor $(\log_2 W)$+C, where C may be an integer constant representing the type of STATUS PDU being generated (e.g., C=1 may indicate a static or full STATUS PDU, C>1 may indicate a small, segmented, or compressed STATUS PDU as described herein with reference to FIGS. 3, 4, and 6). For example, if C>1, the STATUS PDU may include one or more reserved bits that may allow for any updates to the receive window between STATUS PDU segment transmissions.

At 725, the UE 115 may build or generate the STATUS PDU based on the calculated K bits. In some examples, the STATUS PDU may include a CPT field (e.g., CPT=010) indicating that the STATUS PDU is a compressed STATUS PDU. The RLC header may also include a D/C field (e.g., D/C=1) and an SO field (e.g., NACK_SN=13) indicating that SN 13 is the SN from which the UE 115 is to calculate the offsets. After the RLC header, the UE 115 may include a first full NACK SN field (e.g., NACK_SN=13), which may include 12 to 18 bits. In addition, the STATUS PDU may include a field indicating the quantity of bits K used for the offset indications. Then, for every NACK_SN after the first NACK SN (e.g., for each PDU the UE 115 unsuccessfully decoded after the PDU corresponding to the SN 13), the STATUS PDU may include an offset field. Each offset field may include K bits to indicate the offset (e.g., NACK_offset) from the first NACK SN to a subsequent NACK SN. For example, NACK_offset=3 may indicate an SN that is offset from SN 13 by 3 SNs (e.g., SN 16). Additionally, or alternatively, the UE 115 may append an ACK SN to the STATUS PDU as a K-bit offset (e.g., ACK_offset=8 representing SN 21). In some examples, the UE 115 may pad and complete the STATUS PDU using one or more extension fields (e.g., E1) and one or more reserved bit fields (e.g., R). In this way, the UE 115 may use K=5 bits to indicate up to 18 bits for each offset, thus compressing the STATUS PDU (with respect to a traditional full STATUS PDU).

In some examples, instead of a field indicating K bits, the STATUS PDU may include a field indicating the window size (W bits). Such a field may include 12 to 18 bits depending on the receive window, which may be larger than K bits, however, may indicate ACK_SN implicitly, thus including bits that may otherwise be appended to the end of the STATUS PDU. Additionally, or alternatively, the compressed STATUS PDU described herein with reference to FIGS. 6 and 7 may be adapted to include SO and SI fields to support STATUS PDU segmentation. In such cases, STATUS PDU compression may enable the UE 115 to NACK an entire PDU even if it received a segment of it. This may effectively compress an uplink message and preserve uplink resources for other transmissions, thus increasing uplink efficiency and throughput.

Figure 8:
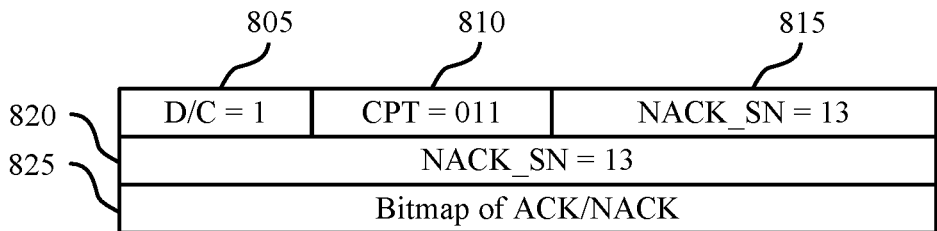
FIG. 8 shows an example of a STATUS PDU that supports adaptations to an RLC STATUS PDU in accordance with one or more aspects of the present disclosure.

FIG. 8 shows an example of a STATUS PDU 800 that supports adaptations to STATUS PDUs in accordance with one or more aspects of the present disclosure. In some examples, the STATUS PDU 800 may implement aspects of the wireless communications systems 100, 300, and 600, or may be implemented by aspects of the wireless communications systems 100, 300, and 600. For example, the STATUS PDU 800 may be an example of a modified (e.g., small or compressed) STATUS PDU that a UE 115 may generate based on a quantity of uplink resources indicated in an uplink grant by a network entity.

In some examples, instead of indicating additional NACK SNs using offset fields in a compressed STATUS PDU (as described herein with reference to FIGS. 6 and 7), the UE 115 may include a bitmap in the modified STATUS PDU to indicate which PDUs received within the receive window the UE 115 successfully or unsuccessfully decoded. For example, the STATUS PDU 800 may include a bitmap field 825 indicating a bitmap corresponding to all received PDUs within the receive window. Each "1" in the bitmap may represent an ACK and each "0" in the bitmap may indicate a NACK. For example, the bitmap corresponding to the PDUs 610 within the receive window 615, as described with reference to FIG. 6, may be represented by a bitmap 11101101011. The bitmap may be included in the STATUS PDU 80 in a control PDCP message format.

The UE 115 may choose the most efficient format (e.g., offset fields or a bitmap field) to indicate the ACK/NACK feedback based on the set of resources included in the uplink grant. The UE 115 may select and indicate the format each time it receives an uplink grant and transmits a subsequent STATUS PDU. The UE 115 may indicate the format using a CPT field 810. For example, CPT=011 may indicate that the STATUS PDU 800 indicates the ACK/NACK SNs using a bitmap. In addition, the STATUS PDU 800 may include a field 820 indicating the first NACK SN (e.g., NACK_SN=13), a field 805 indicating D/C=1 (e.g., data PDU) and an SO field 815 that indicates the first SN within the receive window that is a NACK SN (e.g., NACK_SN=13).

In some examples, the UE 115 may transmit different types of STATUS PDUs based on receiving different uplink grants (which include different quantities of uplink resources). For example, the UE 115 may transmit a first STATUS PDU that is uncompressed (e.g., CPT=000), a second STATUS PDU that is compressed using offset fields (e.g., CPT=010), and a third STATUS PDU that is compressed using a bitmap field 825 (e.g., CPT 011). The UE 115 may use different combinations of STATUS PDUs at different times based on changing channel conditions and uplink and downlink data rates, among other factors.

Figure 9:
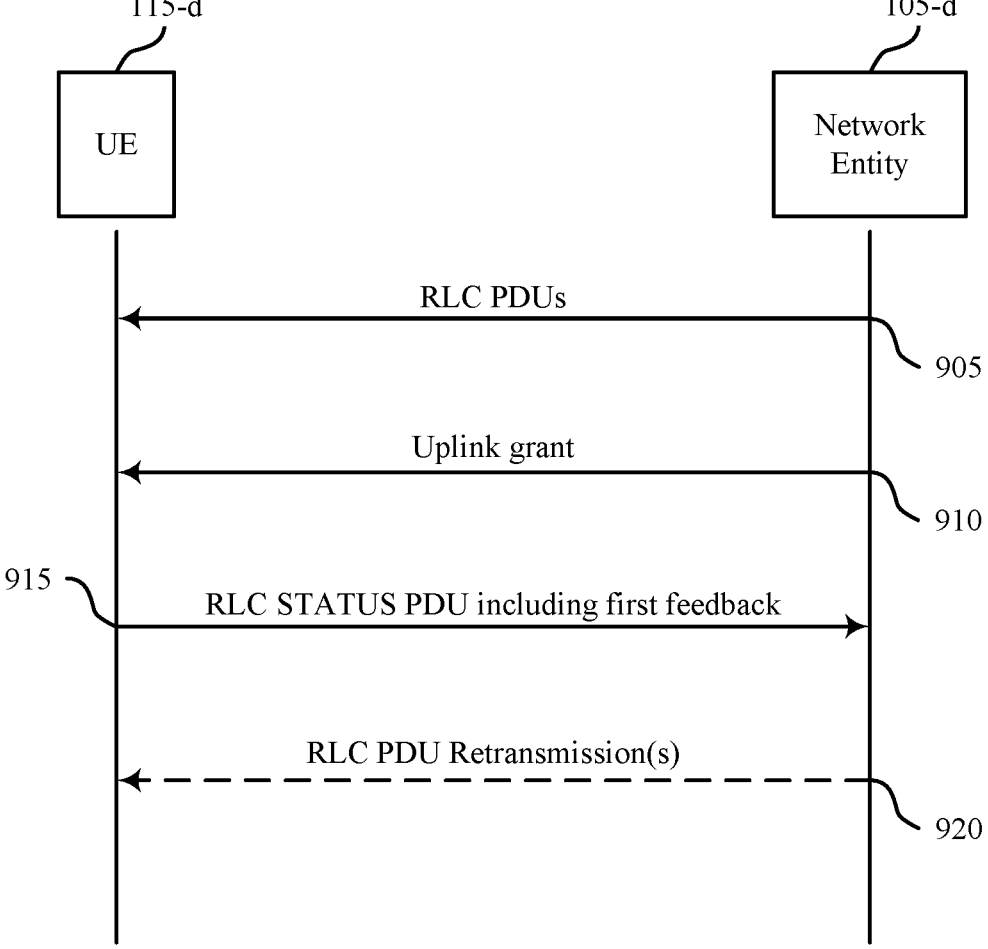
FIGS. 9 through 11 show examples of process flows that support adaptations to an RLC STATUS PDU in accordance with one or more aspects of the present disclosure.

FIG. 9 shows an example of a process flow 900 that supports adaptations to STATUS PDUs in accordance with one or more aspects of the present disclosure. The process flow 900 may implement aspects of wireless communications systems 100 and 300, or may be implemented by aspects of the wireless communications systems 100 and 300. For example, the process flow 900 may illustrate operations between a UE 115-*d* and a network entity 105-*d*, which may be examples of corresponding devices described herein. In the following description of the process flow 900, the operations between the UE 115-*d* and the network entity 105-*d* may be transmitted in a different order than the example order shown, or the operations performed by the UE 115-*d* and the network entity 105-*d* may be performed in different orders or at different times. Some operations may also be omitted from the process flow 900, and other operations may be added to the process flow 900.

At 905, the UE 115-*d* may receive, from the network entity 105-*d*, one or more RLC PDUs associated with an RLC layer within a receive window. The UE 115-*d* may successfully decode one or more of the PDUs and unsuccessfully decode the remaining PDUs.

At 910, the UE 115-*d* may receive, from the network entity 105-*d*, an uplink grant associated with the RLC layer and the one or more RLC PDUs, where the uplink grant indicates a set of resources (e.g., one or more uplink resources). In some examples, the set of resources may be too small (e.g., include too few resources) to accommodate a full STATUS PDU.

At 915, the UE 115-*d* may transmit, to the network entity 105-*d* and based on the set of resources (e.g., a quantity of resources in the set), a first RLC STATUS PDU according to a first type of STATUS PDU that includes a single field, the single field indicating an SN of a first PDU within the receive window that is unsuccessfully decoded. The first field (e.g., RX_Highest_Status) may implicitly indicate that the UE 115-*d* successfully decoded any PDUs preceding the first PDU. As such, if the set of resources is relatively small, the UE 115-*d* may transmit a relatively small STATUS PDU including ACK and NACK information for several SNs using the single field.

At 920, the UE 115-*d* may receive, from the network entity 105-*d*, retransmissions of a subset of the one or more RLC PDUs within the receive window based on transmitting the first RLC STATUS PDU. That is, the network entity 105-*d* may retransmit PDUs before it receives a full or complete STATUS PDU from the UE 115-*d*, which may improve signaling throughput.

Figure 10:
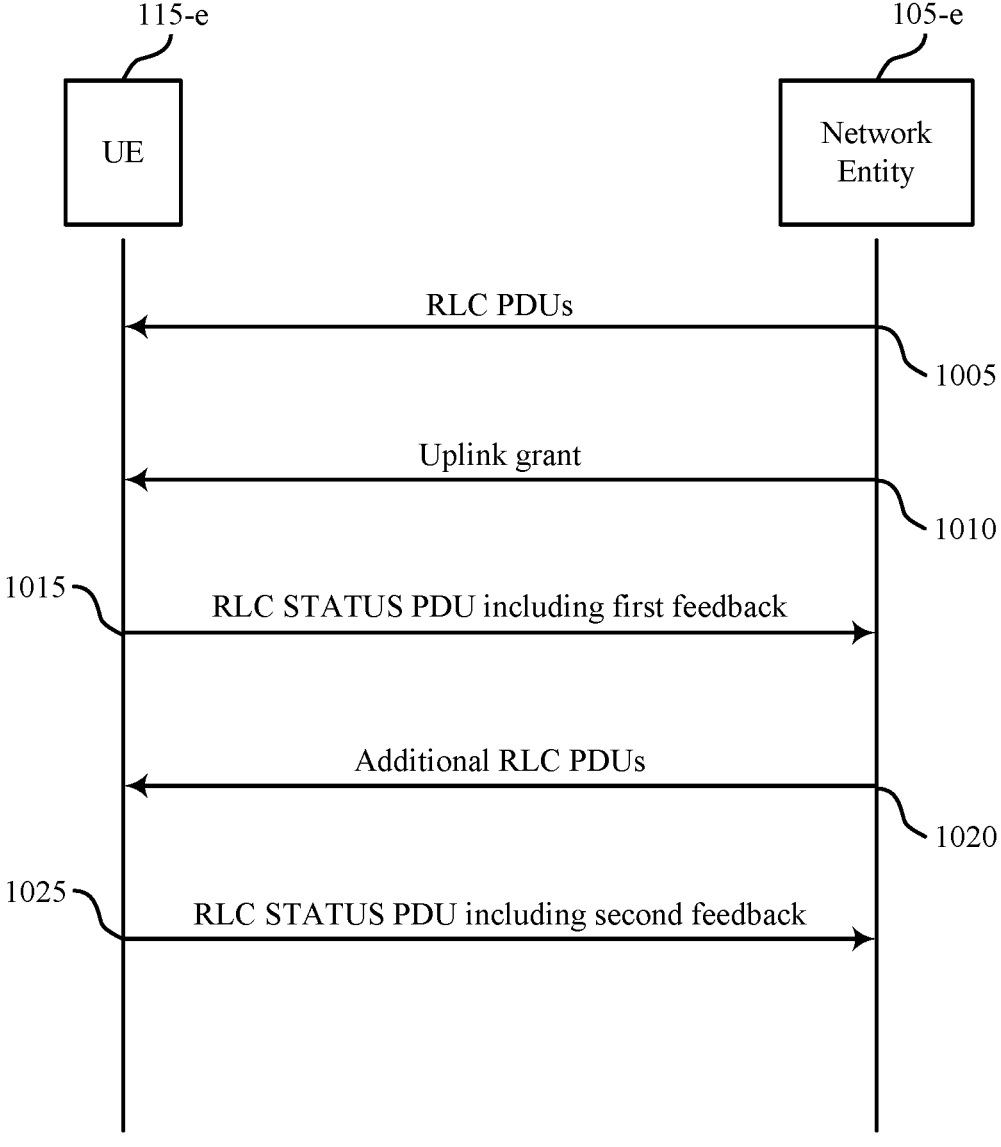

FIG. 10 shows an example of a process flow 1000 that supports adaptations to STATUS PDUs in accordance with one or more aspects of the present disclosure. The process flow 1000 may implement aspects of wireless communications systems 100 and 400, or may be implemented by aspects of the wireless communications systems 100 and 400. For example, the process flow 1000 may illustrate operations between a UE 115-*e* and a network entity 105-*e*, which may be examples of corresponding devices described herein. In the following description of the process flow 1000, the operations between the UE 115-*e* and the network entity 105-*e* may be transmitted in a different order than the example order shown, or the operations performed by the UE 115-*e* and the network entity 105-*e* may be performed in different orders or at different times. Some operations may also be omitted from the process flow 1000, and other operations may be added to the process flow 1000.

At 1005, the UE 115-*e* may receive, from the network entity 105-*e*, one or more RLC PDUs associated with an RLC layer within a receive window. The UE 115-*e* may successfully decode one or more of the PDUs and unsuccessfully decode the remaining PDUs.

At 1010, the UE 115-*e* may receive, from the network entity 105-*e*, an uplink grant associated with the RLC layer and with the one or more RLC PDUs, where the uplink grant indicates a set of resources (e.g., one or more uplink resources). In some examples, the set of resources may be too small (e.g., include too few resources) to accommodate a full STATUS PDU.

At 1015, the UE 115-*e* may transmit, to the network entity 105-*e* and based on the set of resources (e.g., a quantity of resources in the set), a first RLC STATUS PDU that includes feedback for a first RLC PDU within the receive window, where the first RLC PDU includes a first field indicating an SN of the first RLC PDU (e.g., a first SN within the receive window that is unsuccessfully decoded). For example, the first field may be a NACK SN field (e.g., NACK_SN=13).

At 1020, the UE 115-*e* may receive, from the network entity 105-*e* and subsequent to transmitting the first RLC STATUS PDU, one or more additional RLC PDUs within the receive window. The UE 115-*e* may successfully decode one or more of the additionally PDUs and unsuccessfully decode the remaining PDUs. In some examples, the UE 115-*e* may receive, from the network entity 105-*e*, a second uplink grant indicating a second set of resources.

At 1025, the UE 115-*e* may transmit, to the network entity 105-*e* and subsequent to receiving the one or more additional RLC PDUs, a second RLC STATUS PDU that includes feedback for a second RLC PDU within the receive window (subsequent to the first RLC PDU). The second RLC STATUS PDU may include a second field corresponding to an SN of the second RLC PDU and a third field indicating an SN corresponding to an RLC PDU subsequent to the second RLC PDU (e.g., a highest SN). The second field may be a NACK SN field and the third field may be an ACK SN field that indicates a highest SN the UE 115-*e* may receive within the receive window. In this way, the first and second RLC STATUS PDUs may represent segments of a complete STATUS PDU.

Figure 11:
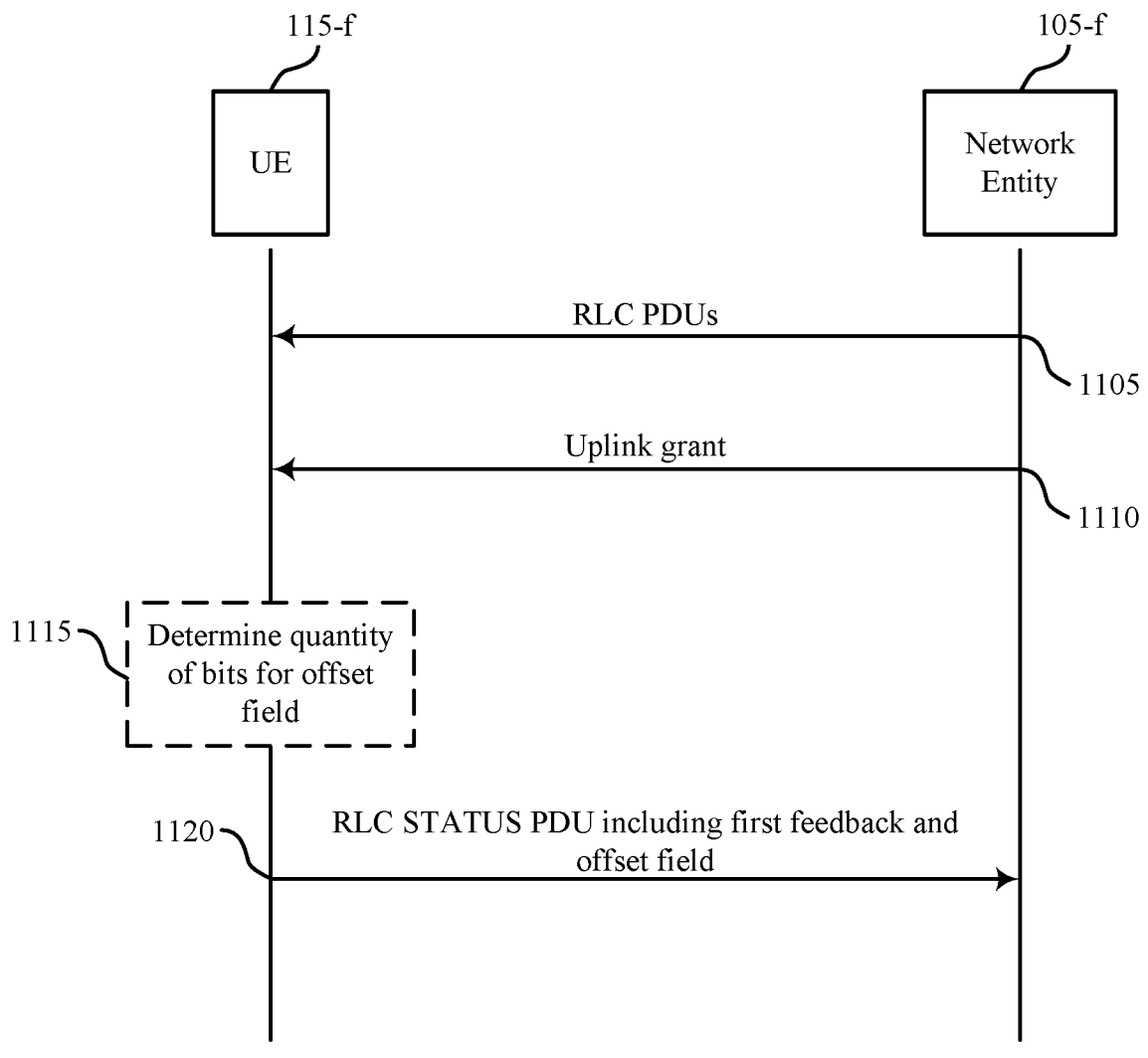

FIG. 11 shows an example of a process flow 1100 that supports adaptations to STATUS PDUs in accordance with one or more aspects of the present disclosure. The process flow 1100 may implement aspects of wireless communications systems 100 and 600, or may be implemented by aspects of the wireless communications systems 100 and 600. For example, the process flow 1100 may illustrate operations between a UE 115-*f* and a network entity 105-*f*, which may be examples of corresponding devices described herein. In the following description of the process flow 1100, the operations between the UE 115-*f* and the network entity 105-*f* may be transmitted in a different order than the example order shown, or the operations performed by the UE 115-*f* and the network entity 105-*f* may be performed in different orders or at different times. Some operations may also be omitted from the process flow 1100, and other operations may be added to the process flow 1100.

At 1105, the UE 115-*f* may receive, from the network entity 105-*f*, one or more RLC PDUs associated with an RLC layer within a receive window. The UE 115-*f* may successfully decode one or more of the PDUs and unsuccessfully decode the remaining PDUs.

At 1110, the UE 115-*f* may receive, from the network entity 105-*f*, an uplink grant associated with the RLC layer and the one or more RLC PDUs, where the uplink grant indicates a set of resources (e.g., one or more uplink resources). In some examples, the set of resources may be too small (e.g., include too few resources) to accommodate a full STATUS PDU.

At 1115 the UE 115-*f* may determine a quantity of bits (e.g., K bits) based on a size of the receive window (in units of SN) and a type RLC STATUS PDU. For example, if the UE 115-f fails to decode three PDUs within the receive window, the UE 115-f may generate an RLC STATUS PDU that indicates three NACK SNs in as few bits as possible.

At 1120, the UE 115-f may transmit, to the network entity 105-f and based on the set of resources (e.g., a quantity of resources in the set), a first RLC STATUS PDU that includes feedback for a first subset of RLC PDUs within the receive window. The first RLC STATUS PDU may include a first field corresponding to an SN of a first RLC PDU within the receive window that is unsuccessfully decoded (e.g., NACK_SN). In addition, the RLC STATUS PDU may include one or more offset fields that indicate respective offsets corresponding to SNs of respective RLC PDUs subsequent to the first RLC PDU. Each offset field may include K bits, and the offset may be measured from the first RLC PDU.

Figure 12:
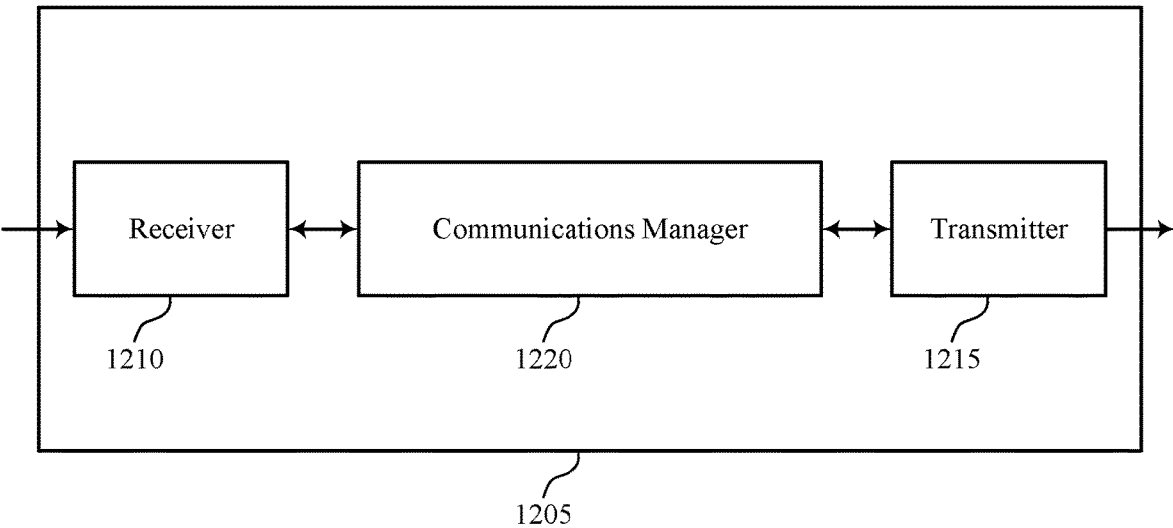
FIGS. 12 and 13 show block diagrams of devices that support adaptations to an RLC STATUS PDU in accordance with one or more aspects of the present disclosure.

FIG. 12 shows a block diagram 1200 of a device 1205 that supports adaptations to STATUS PDUs in accordance with one or more aspects of the present disclosure. The device 1205 may be an example of aspects of a UE 115 as described herein. The device 1205 may include a receiver 1210, a transmitter 1215, and a communications manager 1220. The device 1205, or one or more components of the device 1205 (e.g., the receiver 1210, the transmitter 1215, and the communications manager 1220), may include at least one processor, which may be coupled with at least one memory, to, individually or collectively, support or enable the described techniques. Each of these components may be in communication with one another (e.g., via one or more buses).

The receiver 1210 may provide a means for receiving information such as packets, user data, control information, or any combination thereof associated with various information channels (e.g., control channels, data channels, information channels related to adaptations to STATUS PDUs. Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to adaptations to STATUS PDUs. In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of adaptations to STATUS PDUs as described herein. For example, the communications manager 1220, the receiver 1210, the transmitter 1215, or various combinations or components thereof may be capable of performing one or more of the functions described herein.

The communications manager 1220 may be an example of means for performing various aspects of RLC STATUS PDU adaptations as described herein. In some examples, the communications manager 1220, the receiver 1210, the transmitter 1215, or various combinations or components thereof may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 1220, or its sub-components, may be implemented in code (e.g., as communications management software or firmware) executed by a processor, or any combination thereof. If implemented in code executed by a processor, the functions of the communications manager 1220, or its sub-components may be executed by a general-purpose processor, a DSP, an ASIC, an FPGA, or other programmable logic device.

In some examples, the communications manager 1220 may be configured to perform various operations (e.g., receiving, transmitting) using or otherwise in cooperation with the receiver 1210, the transmitter 1215, or both.

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications in accordance with examples as disclosed herein. For example, the communications manager 1220 is capable of, configured to, or operable to support a means for receiving one or more RLC PDUs associated with an RLC layer within a receive window. The communications manager 1220 is capable of, configured to, or operable to support a means for receiving an uplink grant associated with the RLC layer, where the uplink grant indicates a set of resources. The communications manager 1220 is capable of, configured to, or operable to support a means for transmitting, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded.

Additionally, or alternatively, the communications manager 1220 may support wireless communications in accordance with examples as disclosed herein. For example, the communications manager 1220 is capable of, configured to, or operable to support a means for receiving one or more RLC PDUs associated with an RLC layer within a receive window. The communications manager 1220 is capable of, configured to, or operable to support a means for receiving, subsequent to receiving the one or more RLC PDUs, a first uplink grant associated with the RLC layer, where the first uplink grant indicates a first set of resources. The communications manager 1220 is capable of, configured to, or operable to support a means for transmitting, based on the first set of resources, a first RLC STATUS PDU that includes feedback for a first RLC PDU within the receive window, where the first RLC STATUS PDU includes a first field indicating a SN of the first RLC PDU. The communications manager 1220 is capable of, configured to, or operable to support a means for receiving, subsequent to transmitting the first RLC STATUS PDU, one or more additional RLC PDUs within the receive window. The communications manager 1220 is capable of, configured to, or operable to support a means for transmitting, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

Additionally, or alternatively, the communications manager 1220 may support wireless communications in accordance with examples as disclosed herein. For example, the communications manager 1220 is capable of, configured to, or operable to support a means for receiving one or more RLC PDUs associated with an RLC layer within a receive window. The communications manager 1220 is capable of, configured to, or operable to support a means for receiving an uplink grant associated with the RLC layer, where the uplink grant indicates a set of resources. The communications manager 1220 is capable of, configured to, or operable to support a means for transmitting, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU.

By including or configuring the communications manager 1220 in accordance with examples as described herein, the device 1205 (e.g., at least one processor controlling or otherwise coupled with the receiver 1210, the transmitter 1215, the communications manager 1220, or a combination thereof) may support techniques for adapting STATUS PDUs based on an uplink grant size, which may decrease latency, improve throughput and data rate, and decrease memory consumption.

Figure 13:
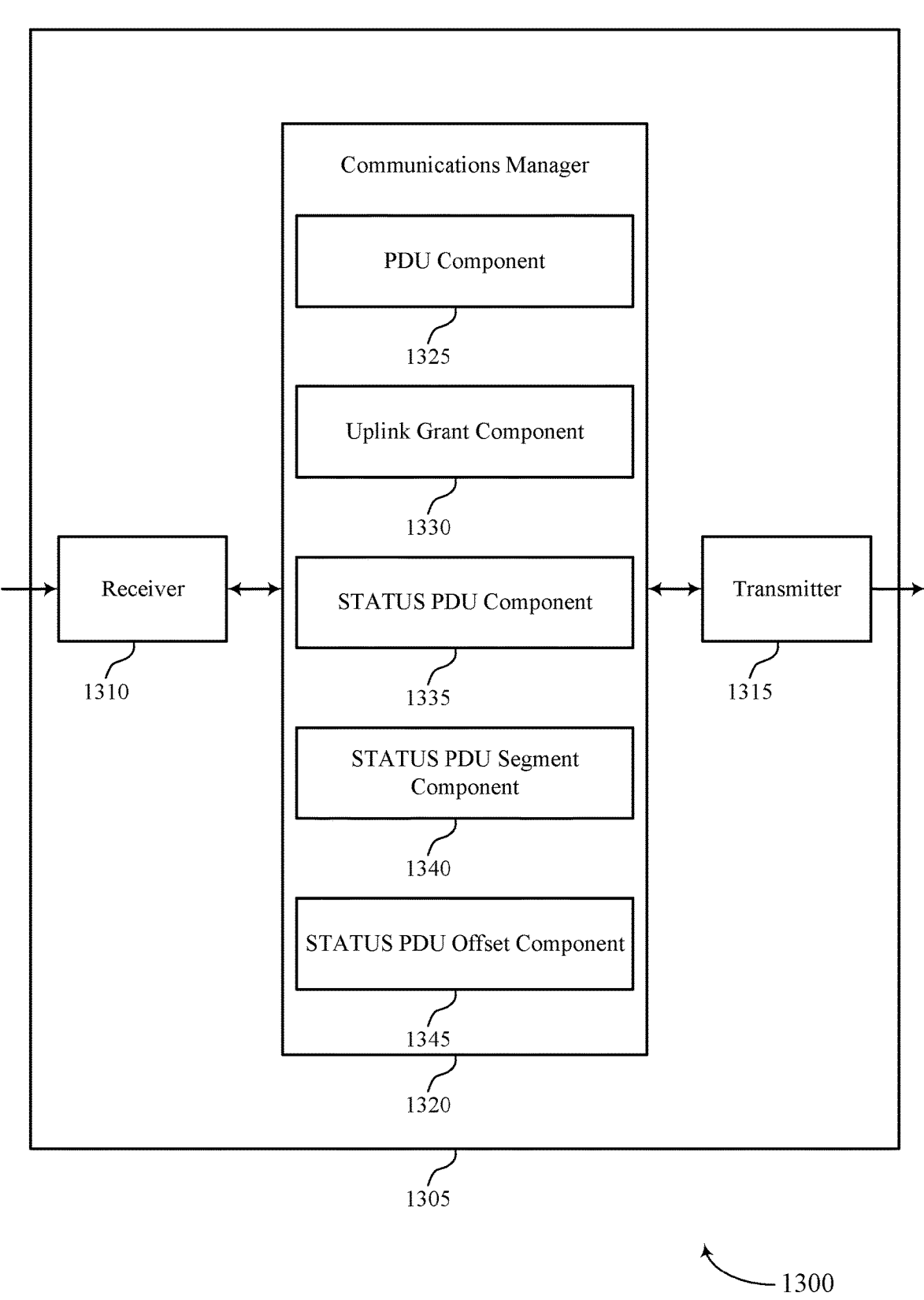

FIG. 13 shows a block diagram 1300 of a device 1305 that supports adaptations to STATUS PDUs in accordance with one or more aspects of the present disclosure. The device 1305 may be an example of aspects of a device 1205 or a UE 115 as described herein. The device 1305 may include a receiver 1310, a transmitter 1315, and a communications manager 1320. The device 1305, or one or more components of the device 1305 (e.g., the receiver 1310, the transmitter 1315, and the communications manager 1320), may include at least one processor, which may be coupled with at least one memory, to support the described techniques. Each of these components may be in communication with one another (e.g., via one or more buses).

The receiver 1310 may provide a means for receiving information such as packets, user data, control information, or any combination thereof associated with various information channels (e.g., control channels, data channels, information channels related to adaptations to STATUS PDUs. Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to adaptations to STATUS PDUs. In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of adaptations to STATUS PDUs as described herein. For example, the communications manager 1320 may include a PDU component 1325, an uplink grant component 1330, an STATUS PDU component 1335, an STATUS PDU segment component 1340, an STATUS PDU offset component 1345, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communications in accordance with examples as disclosed herein. The PDU component 1325 is capable of, configured to, or operable to support a means for receiving one or more RLC PDUs associated with an RLC layer within a receive window. The uplink grant component 1330 is capable of, configured to, or operable to support a means for receiving an uplink grant associated with the RLC layer, where the uplink grant indicates a set of resources. The STATUS PDU component 1335 is capable of, configured to, or operable to support a means for transmitting, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded.

Additionally, or alternatively, the communications manager 1320 may support wireless communications in accordance with examples as disclosed herein. The PDU component 1325 is capable of, configured to, or operable to support a means for receiving one or more RLC PDUs associated with an RLC layer within a receive window. The uplink grant component 1330 is capable of, configured to, or operable to support a means for receiving, subsequent to receiving the one or more RLC PDUs, a first uplink grant associated with the RLC layer, where the first uplink grant indicates a first set of resources. The STATUS PDU segment component 1340 is capable of, configured to, or operable to support a means for transmitting, based on the first set of resources, a first RLC STATUS PDU that includes feedback for a first RLC PDU within the receive window, where the first RLC STATUS PDU includes a first field indicating a SN of the first RLC PDU. The PDU component 1325 is capable of, configured to, or operable to support a means for receiving, subsequent to transmitting the first RLC STATUS PDU, one or more additional RLC PDUs within the receive window. The STATUS PDU segment component 1340 is capable of, configured to, or operable to support a means for transmitting, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

Additionally, or alternatively, the communications manager 1320 may support wireless communications in accordance with examples as disclosed herein. The PDU component 1325 is capable of, configured to, or operable to support a means for receiving one or more RLC PDUs associated with an RLC layer within a receive window. The uplink grant component 1330 is capable of, configured to, or operable to support a means for receiving an uplink grant associated with the RLC layer, where the uplink grant indicates a set of resources. The STATUS PDU offset component 1345 is capable of, configured to, or operable to support a means for transmitting, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU.

Figure 14:
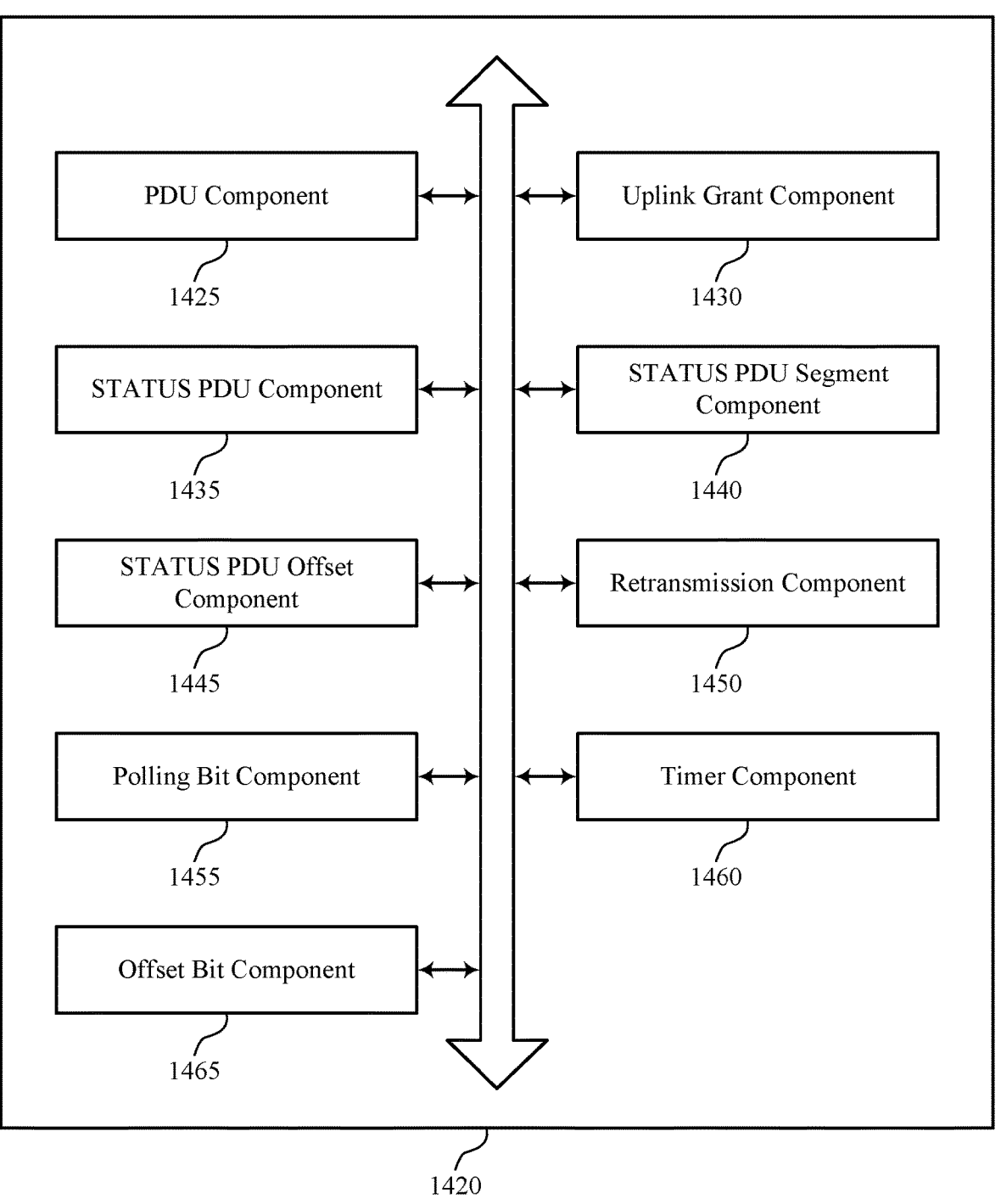
FIG. 14 shows a block diagram of a communications manager that supports adaptations to an RLC STATUS PDU in accordance with one or more aspects of the present disclosure.

FIG. 14 shows a block diagram 1400 of a communications manager 1420 that supports adaptations to STATUS PDUs in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of adaptations to STATUS PDUs as described herein. For example, the communications manager 1420 may include a PDU component 1425, an uplink grant component 1430, an STATUS PDU component 1435, an STATUS PDU segment component 1440, an STATUS PDU offset component 1445, a retransmission component 1450, a polling bit component 1455, a timer component 1460, an offset bit component 1465, or any combination thereof. Each of these components, or components or subcomponents thereof (e.g., one or more processors, one or more memories), may communicate, directly or indirectly, with one another (e.g., via one or more buses).

The communications manager 1420 may support wireless communications in accordance with examples as disclosed herein. The PDU component 1425 is capable of, configured to, or operable to support a means for receiving one or more RLC PDUs associated with an RLC layer within a receive window. The uplink grant component 1430 is capable of, configured to, or operable to support a means for receiving an uplink grant associated with the RLC layer, where the uplink grant indicates a set of resources. The STATUS PDU component 1435 is capable of, configured to, or operable to support a means for transmitting, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded.

In some examples, transmitting the first RLC STATUS PDU according to the first type of STATUS PDU is based on a size of the set of resources indicated in the uplink grant. In some examples, the single field indicates a NACK for the first RLC STATUS PDU.

In some examples, a quantity of SNs between a start of the receive window and the SN of the first RLC PDU indicates that the UE successfully received one or more RLC PDUs prior to the first RLC PDU within the receive window. In some examples, the first RLC STATUS PDU indicates a control PDU type field, the control PDU type field indicating the first type of STATUS PDU.

In some examples, the retransmission component 1450 is capable of, configured to, or operable to support a means for receiving retransmissions of a subset of the one or more RLC PDUs within the receive window based on transmitting the first RLC STATUS PDU.

In some examples, to support receiving the uplink grant, the polling bit component 1455 is capable of, configured to, or operable to support a means for receiving, via the uplink grant, an indication of two or more polling bits, where a value of the two or more polling bits indicates the first type of STATUS PDU. In some examples, to support receiving the uplink grant, the STATUS PDU component 1435 is capable of, configured to, or operable to support a means for transmitting the first RLC STATUS PDU based on the value of the two or more polling bits.

In some examples, the STATUS PDU component 1435 is capable of, configured to, or operable to support a means for transmitting, prior to transmitting the first RLC STATUS PDU, a second RLC STATUS PDU that includes feedback for the one or more RLC PDUs, where transmitting the first RLC STATUS PDU is based on transmission of the second RLC STATUS PDU failing.

In some examples, the timer component 1460 is capable of, configured to, or operable to support a means for initiating a timer after transmitting the first RLC STATUS PDU, where transmission of a subsequent RLC STATUS PDU is based on expiration of the timer.

Additionally, or alternatively, the communications manager 1420 may support wireless communications in accordance with examples as disclosed herein. In some examples, the PDU component 1425 is capable of, configured to, or operable to support a means for receiving one or more RLC PDUs associated with an RLC layer within a receive window. In some examples, the uplink grant component 1430 is capable of, configured to, or operable to support a means for receiving, subsequent to receiving the one or more RLC PDUs, a first uplink grant associated with the RLC layer, where the first uplink grant indicates a first set of resources. The STATUS PDU segment component 1440 is capable of, configured to, or operable to support a means for transmitting, based on the first set of resources, a first RLC STATUS PDU that includes feedback for a first RLC PDU within the receive window, where the first RLC STATUS PDU includes a first field indicating a SN of the first RLC PDU. In some examples, the PDU component 1425 is capable of, configured to, or operable to support a means for receiving, subsequent to transmitting the first RLC STATUS PDU, one or more additional RLC PDUs within the receive window. In some examples, the STATUS PDU segment component 1440 is capable of, configured to, or operable to support a means for transmitting, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

In some examples, transmitting the first RLC STATUS PDU and the second RLC STATUS PDU is based on a size of the first set of resources indicated in the first uplink grant. In some examples, the first field indicates a NACK for the first RLC PDU. In some examples, the second field indicates a NACK for the second RLC PDU.

In some examples, the third field indicates an ACK for a third radio link STATUS PDU corresponding to a highest PDU SN of the received one or more additional RLC PDUs.

In some examples, the uplink grant component 1430 is capable of, configured to, or operable to support a means for receiving, subsequent to receiving the one or more additional RLC PDUs, a second uplink grant that indicates a second set of resources. In some examples, the STATUS PDU segment component 1440 is capable of, configured to, or operable to support a means for transmitting the second RLC STATUS PDU based on the second set of resources. In some examples, the first RLC STATUS PDU includes one or more SI fields and one or more SO fields to indicate a subset of the one or more RLC PDUs.

Additionally, or alternatively, the communications manager 1420 may support wireless communications in accordance with examples as disclosed herein. In some examples, the PDU component 1425 is capable of, configured to, or operable to support a means for receiving one or more RLC PDUs associated with an RLC layer within a receive window. In some examples, the uplink grant component 1430 is capable of, configured to, or operable to support a means for receiving an uplink grant associated with the RLC layer, where the uplink grant indicates a set of resources. The STATUS PDU offset component 1445 is capable of, configured to, or operable to support a means for transmitting, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU.

In some examples, transmitting the first RLC STATUS PDU is based on a size of the set of resources indicated in the uplink grant. In some examples, the first field and the one or more offset fields indicate respective NACKs for the first RLC PDU and the respective RLC PDUs. In some examples, the first RLC STATUS PDU includes a second field that indicates a quantity of bits of each of the one or more offset fields.

In some examples, the offset bit component 1465 is capable of, configured to, or operable to support a means for determining the quantity of bits based on a size of the receive window and a type of the first RLC STATUS PDU.

In some examples, the first RLC STATUS PDU includes one or more SI fields and one or more SO fields to indicate a subset of the one or more RLC PDUs. In some examples, the first RLC STATUS PDU includes a control PDU type field, the control PDU type field indicating a type of the first RLC STATUS PDU.

Figure 15:
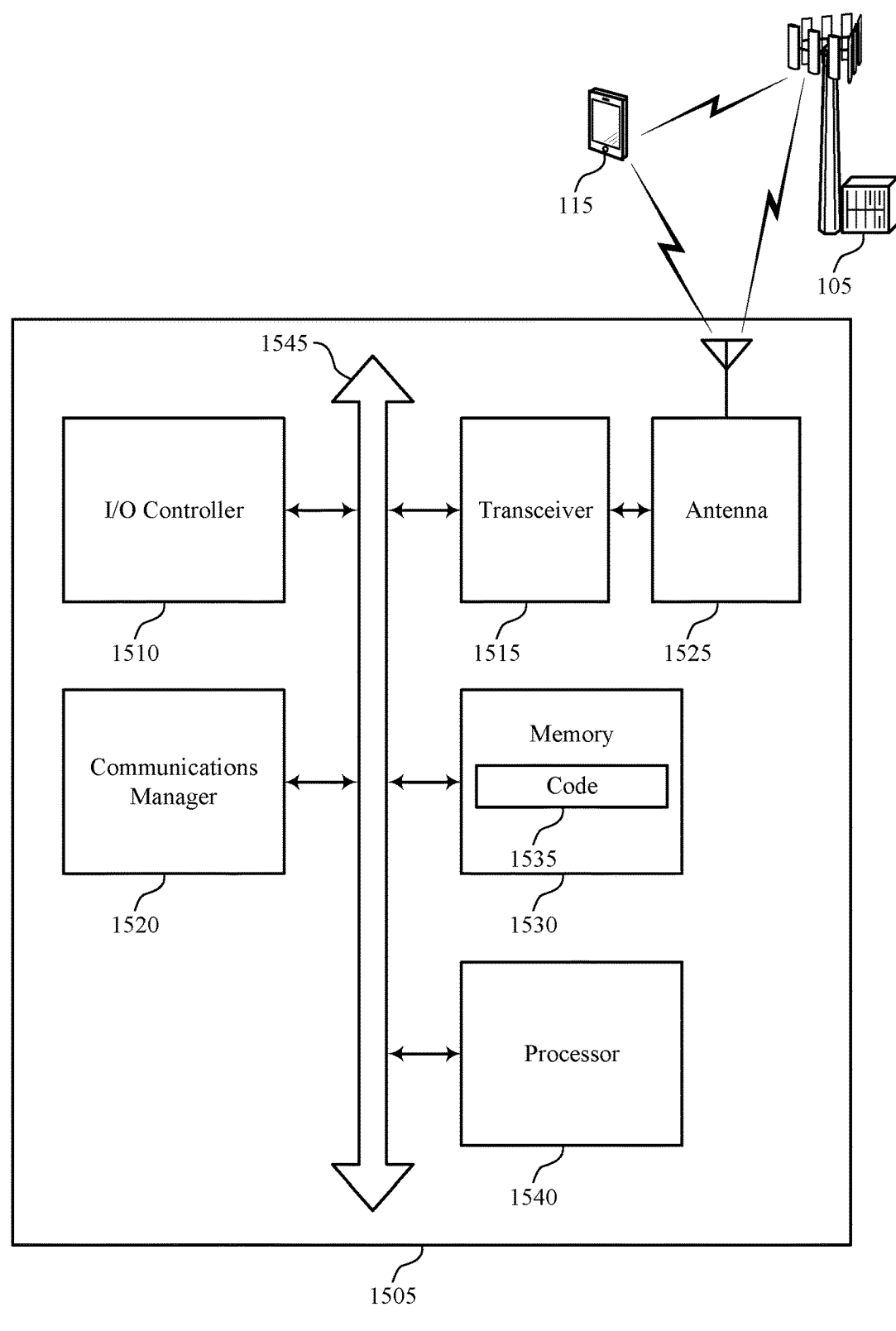
FIG. 15 shows a diagram of a system including a device that supports adaptations to an RLC STATUS PDU in accordance with one or more aspects of the present disclosure.

FIG. 15 shows a diagram of a system 1500 including a device 1505 that supports adaptations to STATUS PDUs in accordance with one or more aspects of the present disclosure. The device 1505 may be an example of or include the components of a device 1205, a device 1305, or a UE 115 as described herein. The device 1505 may communicate (e.g., wirelessly) with one or more network entities 105, one or more UEs 115, or any combination thereof. The device 1505 may include components for bi-directional voice and data communications including components for transmitting and receiving communications, such as a communications manager 1520, an input/output (I/O) controller 1510, a transceiver 1515, an antenna 1525, at least one memory 1530, code 1535, and at least one processor 1540. These components may be in electronic communication or otherwise coupled (e.g., operatively, communicatively, functionally, electronically, electrically) via one or more buses (e.g., a bus 1545).

The I/O controller 1510 may manage input and output signals for the device 1505. The I/O controller 1510 may also manage peripherals not integrated into the device 1505. In some cases, the I/O controller 1510 may represent a physical connection or port to an external peripheral. In some cases, the I/O controller 1510 may utilize an operating system such as iOS®, ANDROID®, MS-DOS®, MS-WINDOWS®, OS/2®, UNIX®, LINUX®, or another known operating system. Additionally, or alternatively, the I/O controller 1510 may represent or interact with a modem, a keyboard, a mouse, a touchscreen, or a similar device. In some cases, the I/O controller 1510 may be implemented as part of one or more processors, such as the at least one processor 1540. In some cases, a user may interact with the device 1505 via the I/O controller 1510 or via hardware components controlled by the I/O controller 1510.

In some cases, the device 1505 may include a single antenna 1525. However, in some other cases, the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The at least one memory 1530 may include random access memory (RAM) and read-only memory (ROM). The at least one memory 1530 may store computer-readable, computer-executable code 1535 including instructions that, when executed by the at least one processor 1540, cause the device 1505 to perform various functions described herein. The code 1535 may be stored in a non-transitory computer-readable medium such as system memory or another type of memory. In some cases, the code 1535 may not be directly executable by the at least one processor 1540 but may cause a computer (e.g., when compiled and executed) to perform functions described herein. In some cases, the at least one memory 1530 may contain, among other things, a basic I/O system (BIOS) which may control basic hardware or software operation such as the interaction with peripheral components or devices.

The at least one processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1540 may be configured to operate a memory array using a memory controller. In some other cases, a memory controller may be integrated into the at least one processor 1540. The at least one processor 1540 may be configured to execute computer-readable instructions stored in a memory (e.g., the at least one memory 1530) to cause the device 1505 to perform various functions (e.g., functions or tasks supporting adaptations to STATUS PDUs. For example, the device 1505 or a component of the device 1505 may include at least one processor 1540 and at least one memory 1530 coupled with or to the at least one processor 1540, the at least one processor 1540 and at least one memory 1530 configured to perform various functions described herein. In some examples, the at least one processor 1540 may include multiple processors and the at least one memory 1530 may include multiple memories. One or more of the multiple processors may be coupled with one or more of the multiple memories, which may, individually or collectively, be configured to perform various functions herein. In some examples, the at least one processor 1540 may be a component of a processing system, which may refer to a system (such as a series) of machines, circuitry (including, for example, one or both of processor circuitry (which may include the at least one processor 1540) and memory circuitry (which may include the at least one memory 1530)), or components, that receives or obtains inputs and processes the inputs to produce, generate, or obtain a set of outputs. The processing system may be configured to perform one or more of the functions described herein. As such, the at least one processor 1540 or a processing system including the at least one processor 1540 may be configured to, configurable to, or operable to cause the device 1505 to perform one or more of the functions described herein. Further, as described herein, being "configured to," being "configurable to," and being "operable to" may be used interchangeably and may be associated with a capability, when executing code stored in the at least one memory 1530 or otherwise, to perform one or more of the functions described herein.

The communications manager 1520 may support wireless communications in accordance with examples as disclosed herein. For example, the communications manager 1520 is capable of, configured to, or operable to support a means for receiving one or more RLC PDUs associated with an RLC layer within a receive window. The communications manager 1520 is capable of, configured to, or operable to support a means for receiving an uplink grant associated with the RLC layer, where the uplink grant indicates a set of resources. The communications manager 1520 is capable of, configured to, or operable to support a means for transmitting, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded.

Additionally, or alternatively, the communications manager 1520 may support wireless communications in accordance with examples as disclosed herein. For example, the communications manager 1520 is capable of, configured to, or operable to support a means for receiving one or more RLC PDUs associated with an RLC layer within a receive window. The communications manager 1520 is capable of, configured to, or operable to support a means for receiving, subsequent to receiving the one or more RLC PDUs, a first uplink grant associated with the RLC layer, where the first uplink grant indicates a first set of resources. The communications manager 1520 is capable of, configured to, or operable to support a means for transmitting, based on the first set of resources, a first RLC STATUS PDU that includes feedback for a first RLC PDU within the receive window, where the first RLC STATUS PDU includes a first field indicating a SN of the first RLC PDU. The communications manager 1520 is capable of, configured to, or operable to support a means for receiving, subsequent to transmitting the first RLC STATUS PDU, one or more additional RLC PDUs within the receive window. The communications manager 1520 is capable of, configured to, or operable to support a means for transmitting, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

Additionally, or alternatively, the communications manager 1520 may support wireless communications in accordance with examples as disclosed herein. For example, the communications manager 1520 is capable of, configured to, or operable to support a means for receiving one or more RLC PDUs associated with an RLC layer within a receive window. The communications manager 1520 is capable of, configured to, or operable to support a means for receiving an uplink grant associated with the RLC layer, where the uplink grant indicates a set of resources. The communications manager 1520 is capable of, configured to, or operable to support a means for transmitting, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU.

By including or configuring the communications manager 1520 in accordance with examples as described herein, the device 1505 may support techniques for adapting STATUS PDUs based on an uplink grant size, which may decrease latency, improve throughput and data rate, and decrease memory consumption.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the at least one processor 1540, the at least one memory 1530, the code 1535, or any combination thereof. For example, the code 1535 may include instructions executable by the at least one processor 1540 to cause the device 1505 to perform various aspects of adaptations to STATUS PDUs as described herein, or the at least one processor 1540 and the at least one memory 1530 may be otherwise configured to, individually or collectively, perform or support such operations.

Figure 16:
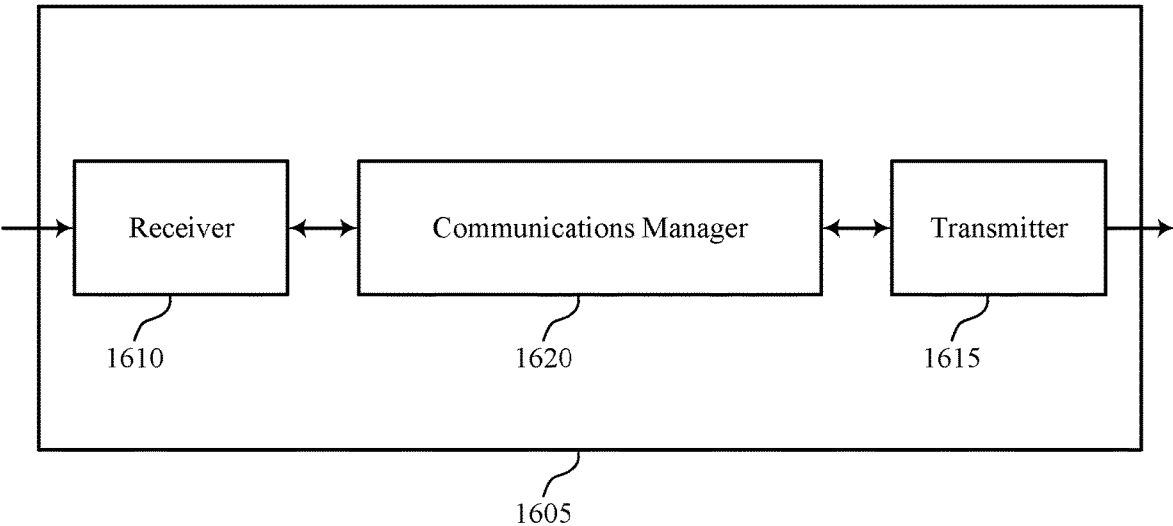
FIGS. 16 and 17 show block diagrams of devices that support adaptations to an RLC STATUS PDU in accordance with one or more aspects of the present disclosure.

FIG. 16 shows a block diagram 1600 of a device 1605 that supports adaptations to STATUS PDUs in accordance with one or more aspects of the present disclosure. The device 1605 may be an example of aspects of a network entity 105 as described herein. The device 1605 may include a receiver 1610, a transmitter 1615, and a communications manager 1620. The device 1605, or one or more components of the device 1605 (e.g., the receiver 1610, the transmitter 1615, and the communications manager 1620), may include at least one processor, which may be coupled with at least one memory, to, individually or collectively, support or enable the described techniques. Each of these components may be in communication with one another (e.g., via one or more buses).

The receiver 1610 may provide a means for obtaining (e.g., receiving, determining, identifying) information such as user data, control information, or any combination thereof (e.g., I/Q samples, symbols, packets, PDUs, service data units) associated with various channels (e.g., control channels, data channels, information channels, channels associated with a protocol stack). Information may be passed on to other components of the device 1605. In some examples, the receiver 1610 may support obtaining information by receiving signals via one or more antennas. Additionally, or alternatively, the receiver 1610 may support obtaining information by receiving signals via one or more wired (e.g., electrical, fiber optic) interfaces, wireless interfaces, or any combination thereof.

The transmitter 1615 may provide a means for outputting (e.g., transmitting, providing, conveying, sending) information generated by other components of the device 1605. For example, the transmitter 1615 may output information such as user data, control information, or any combination thereof (e.g., I/Q samples, symbols, packets, PDUs, service data units) associated with various channels (e.g., control channels, data channels, information channels, channels associated with a protocol stack). In some examples, the transmitter 1615 may support outputting information by transmitting signals via one or more antennas. Additionally, or alternatively, the transmitter 1615 may support outputting information by transmitting signals via one or more wired (e.g., electrical, fiber optic) interfaces, wireless interfaces, or any combination thereof. In some examples, the transmitter 1615 and the receiver 1610 may be co-located in a transceiver, which may include or be coupled with a modem.

The communications manager 1620, the receiver 1610, the transmitter 1615, or various combinations thereof or various components thereof may be examples of means for performing various aspects of adaptations to STATUS PDUs as described herein. For example, the communications manager 1620, the receiver 1610, the transmitter 1615, or various combinations or components thereof may be capable of performing one or more of the functions described herein.

The communications manager 1620 may be an example of means for performing various aspects of RLC STATUS PDU adaptations as described herein. In some examples, the communications manager 1620, the receiver 1610, the transmitter 1615, or various combinations or components thereof may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the communications manager 1620, or its sub-components, may be implemented in code (e.g., as communications management software or firmware) executed by a processor, or any combination thereof. If implemented in code executed by a processor, the functions of the communications manager 1620 or its sub-components may be executed by a general-purpose processor, a DSP, an ASIC, an FPGA, or other programmable logic device.

In some examples, the communications manager 1620 may be configured to perform various operations (e.g., receiving, transmitting) using or otherwise in cooperation with the receiver 1610, the transmitter 1615, or both.

In some examples, the communications manager 1620 may be configured to perform various operations (e.g., receiving, obtaining, monitoring, outputting, transmitting)

using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to obtain information, output information, or perform various other operations as described herein.

The communications manager 1620 may support wireless communications in accordance with examples as disclosed herein. For example, the communications manager 1620 is capable of, configured to, or operable to support a means for transmitting one or more RLC PDUs associated with an RLC layer within a receive window. The communications manager 1620 is capable of, configured to, or operable to support a means for transmitting an uplink grant associated with the RLC layer, where the uplink grant indicates a set of resources. The communications manager 1620 is capable of, configured to, or operable to support a means for receiving, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded.

Additionally, or alternatively, the communications manager 1620 may support wireless communications in accordance with examples as disclosed herein. For example, the communications manager 1620 is capable of, configured to, or operable to support a means for transmitting one or more RLC PDUs associated with an RLC layer within a receive window. The communications manager 1620 is capable of, configured to, or operable to support a means for transmitting, subsequent to receiving the one or more RLC PDUs, a first uplink grant associated with the RLC layer, where the first uplink grant indicates a first set of resources. The communications manager 1620 is capable of, configured to, or operable to support a means for receiving, based on the first set of resources, a first RLC STATUS PDU that includes feedback for a first RLC PDU within the receive window, where the first RLC STATUS PDU includes a first field indicating a SN of the first RLC PDU. The communications manager 1620 is capable of, configured to, or operable to support a means for transmitting, subsequent to transmitting the first RLC STATUS PDU, one or more additional RLC PDUs within the receive window. The communications manager 1620 is capable of, configured to, or operable to support a means for receiving, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

Additionally, or alternatively, the communications manager 1620 may support wireless communications in accordance with examples as disclosed herein. For example, the communications manager 1620 is capable of, configured to, or operable to support a means for transmitting one or more RLC PDUs associated with an RLC layer within a receive window. The communications manager 1620 is capable of, configured to, or operable to support a means for transmitting an uplink grant associated with the RLC layer, where the uplink grant indicates a set of resources. The communications manager 1620 is capable of, configured to, or operable to support a means for receiving, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU.

By including or configuring the communications manager 1620 in accordance with examples as described herein, the device 1605 (e.g., at least one processor controlling or otherwise coupled with the receiver 1610, the transmitter 1615, the communications manager 1620, or a combination thereof) may support techniques for adapting STATUS PDUs based on an uplink grant size, which may decrease latency, improve throughput and data rate, and decrease memory consumption.

Figure 17:
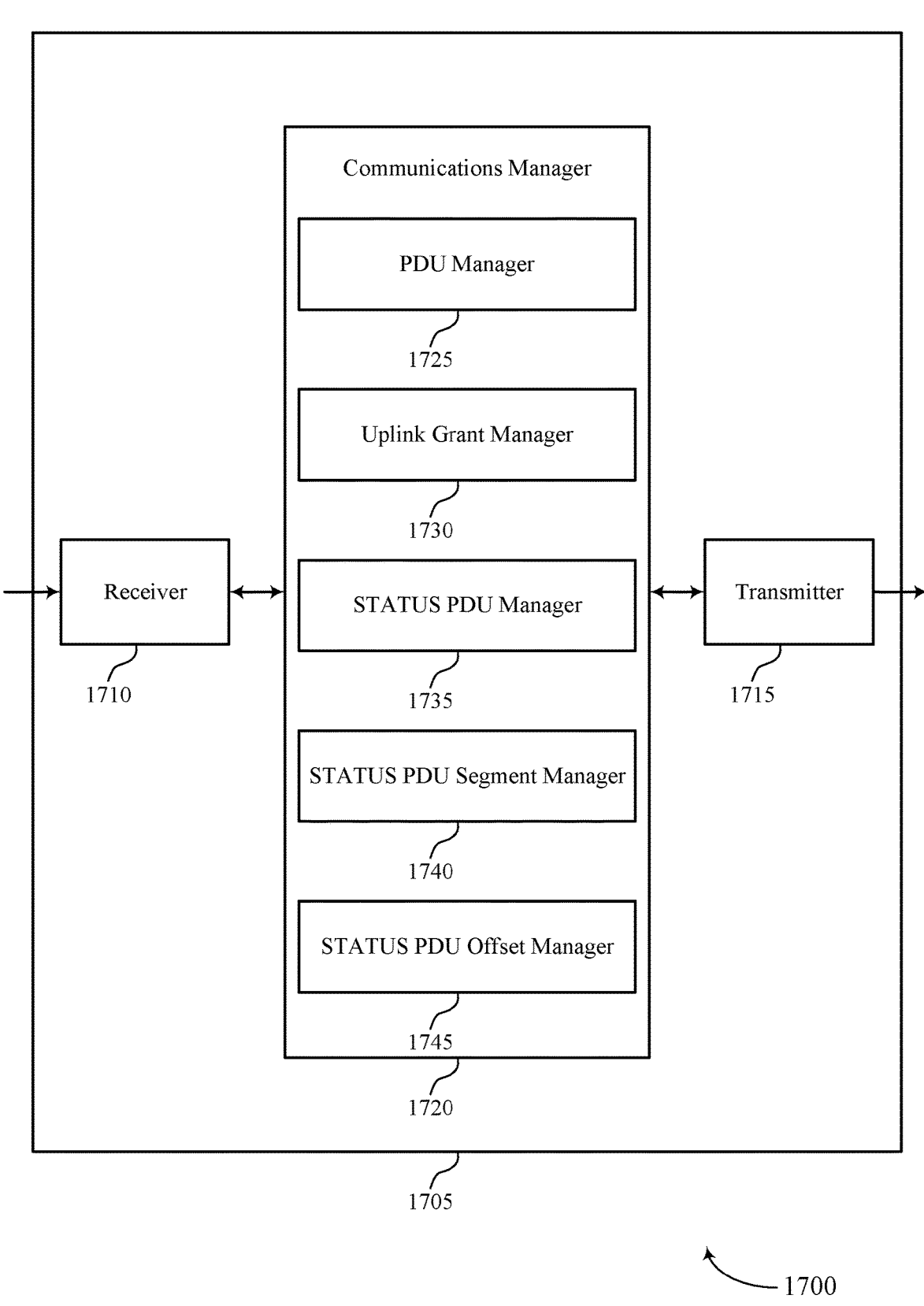

FIG. 17 shows a block diagram 1700 of a device 1705 that supports adaptations to STATUS PDUs in accordance with one or more aspects of the present disclosure. The device 1705 may be an example of aspects of a device 1605 or a network entity 105 as described herein. The device 1705 may include a receiver 1710, a transmitter 1715, and a communications manager 1720. The device 1705, or one or more components of the device 1705 (e.g., the receiver 1710, the transmitter 1715, and the communications manager 1720), may include at least one processor, which may be coupled with at least one memory, to support the described techniques. Each of these components may be in communication with one another (e.g., via one or more buses).

The receiver 1710 may provide a means for obtaining (e.g., receiving, determining, identifying) information such as user data, control information, or any combination thereof (e.g., I/Q samples, symbols, packets, PDUs, service data units) associated with various channels (e.g., control channels, data channels, information channels, channels associated with a protocol stack). Information may be passed on to other components of the device 1705. In some examples, the receiver 1710 may support obtaining information by receiving signals via one or more antennas. Additionally, or alternatively, the receiver 1710 may support obtaining information by receiving signals via one or more wired (e.g., electrical, fiber optic) interfaces, wireless interfaces, or any combination thereof.

The transmitter 1715 may provide a means for outputting (e.g., transmitting, providing, conveying, sending) information generated by other components of the device 1705. For example, the transmitter 1715 may output information such as user data, control information, or any combination thereof (e.g., I/Q samples, symbols, packets, PDUs, service data units) associated with various channels (e.g., control channels, data channels, information channels, channels associated with a protocol stack). In some examples, the transmitter 1715 may support outputting information by transmitting signals via one or more antennas. Additionally, or alternatively, the transmitter 1715 may support outputting information by transmitting signals via one or more wired (e.g., electrical, fiber optic) interfaces, wireless interfaces, or any combination thereof. In some examples, the transmitter 1715 and the receiver 1710 may be co-located in a transceiver, which may include or be coupled with a modem.

The device 1705, or various components thereof, may be an example of means for performing various aspects of adaptations to STATUS PDUs as described herein. For example, the communications manager 1720 may include a PDU manager 1725, an uplink grant manager 1730, an STATUS PDU manager 1735, an STATUS PDU segment manager 1740, an STATUS PDU offset manager 1745, or any combination thereof. The communications manager 1720 may be an example of aspects of a communications manager 1620 as described herein. In some examples, the communications manager 1720, or various components thereof, may be configured to perform various operations (e.g., receiving, obtaining, monitoring, outputting, transmitting) using or otherwise in cooperation with the receiver 1710, the transmitter 1715, or both. For example, the communications manager 1720 may receive information from the receiver 1710, send information to the transmitter 1715, or be integrated in combination with the receiver 1710, the transmitter 1715, or both to obtain information, output information, or perform various other operations as described herein.

The communications manager 1720 may support wireless communications in accordance with examples as disclosed herein. The PDU manager 1725 is capable of, configured to, or operable to support a means for transmitting one or more RLC PDUs associated with an RLC layer within a receive window. The uplink grant manager 1730 is capable of, configured to, or operable to support a means for transmitting an uplink grant associated with the RLC layer, where the uplink grant indicates a set of resources. The STATUS PDU manager 1735 is capable of, configured to, or operable to support a means for receiving, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded.

Additionally, or alternatively, the communications manager 1720 may support wireless communications in accordance with examples as disclosed herein. The PDU manager 1725 is capable of, configured to, or operable to support a means for transmitting one or more RLC PDUs associated with an RLC layer within a receive window. The uplink grant manager 1730 is capable of, configured to, or operable to support a means for transmitting, subsequent to receiving the one or more RLC PDUs, a first uplink grant associated with the RLC layer, where the first uplink grant indicates a first set of resources. The STATUS PDU segment manager 1740 is capable of, configured to, or operable to support a means for receiving, based on the first set of resources, a first RLC STATUS PDU that includes feedback for a first RLC PDU within the receive window, where the first RLC STATUS PDU includes a first field indicating a SN of the first RLC PDU. The PDU manager 1725 is capable of, configured to, or operable to support a means for transmitting, subsequent to transmitting the first RLC STATUS PDU, one or more additional RLC PDUs within the receive window. The STATUS PDU segment manager 1740 is capable of, configured to, or operable to support a means for receiving, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

Additionally, or alternatively, the communications manager 1720 may support wireless communications in accordance with examples as disclosed herein. The PDU manager 1725 is capable of, configured to, or operable to support a means for transmitting one or more RLC PDUs associated with an RLC layer within a receive window. The uplink grant manager 1730 is capable of, configured to, or operable to support a means for transmitting an uplink grant associated with the RLC layer, where the uplink grant indicates a set of resources. The STATUS PDU offset manager 1745 is capable of, configured to, or operable to support a means for receiving, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU.

Figure 18:
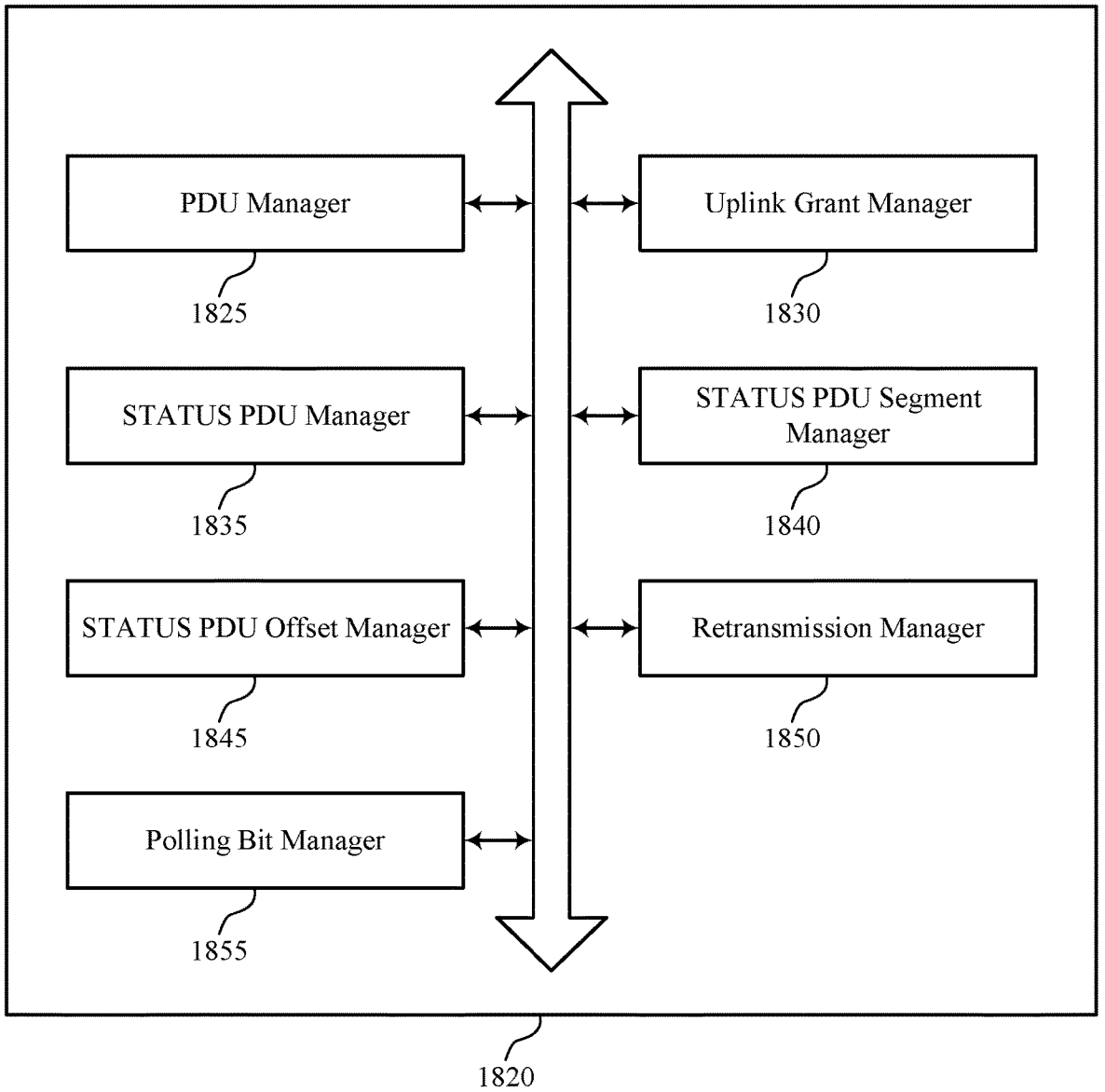
FIG. 18 shows a block diagram of a communications manager that supports adaptations to an RLC STATUS PDU in accordance with one or more aspects of the present disclosure.

FIG. 18 shows a block diagram 1800 of a communications manager 1820 that supports adaptations to STATUS PDUs in accordance with one or more aspects of the present disclosure. The communications manager 1820 may be an example of aspects of a communications manager 1620, a communications manager 1720, or both, as described herein. The communications manager 1820, or various components thereof, may be an example of means for performing various aspects of adaptations to STATUS PDUs as described herein. For example, the communications manager 1820 may include a PDU manager 1825, an uplink grant manager 1830, an STATUS PDU manager 1835, an STATUS PDU segment manager 1840, an STATUS PDU offset manager 1845, a retransmission manager 1850, a polling bit manager 1855, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1820 may support wireless communications in accordance with examples as disclosed herein. The PDU manager 1825 is capable of, configured to, or operable to support a means for transmitting one or more RLC PDUs associated with an RLC layer within a receive window. The uplink grant manager 1830 is capable of, configured to, or operable to support a means for transmitting an uplink grant associated with the RLC layer, where the uplink grant indicates a set of resources. The STATUS PDU manager 1835 is capable of, configured to, or operable to support a means for receiving, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded.

In some examples, receiving the first RLC STATUS PDU according to the first type of STATUS PDU is based on a size of the set of resources indicated in the uplink grant. In some examples, the single field indicates a NACK for the first RLC STATUS PDU.

In some examples, a quantity of SNs between a start of the receive window and the SN of the first RLC PDU indicates that a UE successfully received one or more RLC PDUs prior to the first RLC PDU within the receive window. In some examples, the first RLC STATUS PDU indicates a control PDU type field, the control PDU type field indicating the first type of STATUS PDU.

In some examples, the retransmission manager 1850 is capable of, configured to, or operable to support a means for transmitting retransmissions of a subset of the one or more RLC PDUs within the receive window based on transmitting the first RLC STATUS PDU.

In some examples, to support transmitting the uplink grant, the polling bit manager 1855 is capable of, configured to, or operable to support a means for transmitting, via the uplink grant, an indication of two or more polling bits, where a value of the two or more polling bits indicates the first type of STATUS PDU. In some examples, to support transmitting the uplink grant, the STATUS PDU manager 1835 is capable of, configured to, or operable to support a means for receiving the first RLC STATUS PDU based on the value of the two or more polling bits.

In some examples, the STATUS PDU manager 1835 is capable of, configured to, or operable to support a means for receiving, prior to transmitting the first RLC STATUS PDU, a second RLC STATUS PDU that includes feedback for the one or more RLC PDUs, where transmitting the first RLC STATUS PDU is based on transmission of the second RLC STATUS PDU failing. In some examples, reception of a subsequent RLC STATUS PDU is based on expiration of a timer.

Additionally, or alternatively, the communications manager 1820 may support wireless communications in accordance with examples as disclosed herein. In some examples, the PDU manager 1825 is capable of, configured to, or operable to support a means for transmitting one or more RLC PDUs associated with an RLC layer within a receive window. In some examples, the uplink grant manager 1830 is capable of, configured to, or operable to support a means for transmitting, subsequent to receiving the one or more RLC PDUs, a first uplink grant associated with the RLC layer, where the first uplink grant indicates a first set of resources. The STATUS PDU segment manager 1840 is capable of, configured to, or operable to support a means for receiving, based on the first set of resources, a first RLC STATUS PDU that includes feedback for a first RLC PDU within the receive window, where the first RLC STATUS PDU includes a first field indicating a SN of the first RLC PDU. In some examples, the PDU manager 1825 is capable of, configured to, or operable to support a means for transmitting, subsequent to transmitting the first RLC STATUS PDU, one or more additional RLC PDUs within the receive window. In some examples, the STATUS PDU segment manager 1840 is capable of, configured to, or operable to support a means for receiving, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

In some examples, receiving the first RLC STATUS PDU and the second RLC STATUS PDU is based on a size of the first set of resources indicated in the first uplink grant. In some examples, the first field indicates a NACK for the first RLC PDU. In some examples, the second field indicates a NACK for the second RLC PDU.

In some examples, the third field indicates an ACK for a third radio link STATUS PDU corresponding to a highest PDU SN of the received one or more additional RLC PDUs.

In some examples, the uplink grant manager 1830 is capable of, configured to, or operable to support a means for transmitting, subsequent to receiving the one or more additional RLC PDUs, a second uplink grant that indicates a second set of resources. In some examples, the STATUS PDU segment manager 1840 is capable of, configured to, or operable to support a means for receiving the second RLC STATUS PDU based on the second set of resources. In some examples, the first RLC STATUS PDU includes one or more SI fields and one or more SO fields to indicate a subset of the one or more RLC PDUs.

Additionally, or alternatively, the communications manager 1820 may support wireless communications in accordance with examples as disclosed herein. In some examples, the PDU manager 1825 is capable of, configured to, or operable to support a means for transmitting one or more RLC PDUs associated with an RLC layer within a receive window. In some examples, the uplink grant manager 1830 is capable of, configured to, or operable to support a means for transmitting an uplink grant associated with the RLC layer, where the uplink grant indicates a set of resources. The STATUS PDU offset manager 1845 is capable of, configured to, or operable to support a means for receiving, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU.

In some examples, receiving the first RLC STATUS PDU is based on a size of the set of resources indicated in the uplink grant. In some examples, the first field and the one or more offset fields indicate respective NACKs for the first RLC PDU and the respective RLC PDUs.

In some examples, the first RLC STATUS PDU includes a second field that indicates a quantity of bits of each of the one or more offset fields. In some examples, the quantity of bits is based on a size of the receive window and a type of the first RLC STATUS PDU.

In some examples, the first RLC STATUS PDU includes one or more SI fields and one or more SO fields to indicate a subset of the one or more RLC PDUs. In some examples, the first RLC STATUS PDU includes a control PDU type field, the control PDU type field indicating a type of the first RLC STATUS PDU.

Figure 19:
FIG. 19 shows a diagram of a system including a device that supports adaptations to an RLC STATUS PDU in accordance with one or more aspects of the present disclosure.

FIG. 19 shows a diagram of a system 1900 including a device 1905 that supports adaptations to STATUS PDUs in accordance with one or more aspects of the present disclosure. The device 1905 may be an example of or include the components of a device 1605, a device 1705, or a network entity 105 as described herein. The device 1905 may communicate with one or more network entities 105, one or more UEs 115, or any combination thereof, which may include communications over one or more wired interfaces, over one or more wireless interfaces, or any combination thereof. The device 1905 may include components that support outputting and obtaining communications, such as a communications manager 1920, a transceiver 1910, an antenna 1915, at least one memory 1925, code 1930, and at least one processor 1935. These components may be in electronic communication or otherwise coupled (e.g., operatively, communicatively, functionally, electronically, electrically) via one or more buses (e.g., a bus 1940).

The transceiver 1910 may support bi-directional communications via wired links, wireless links, or both as described herein. In some examples, the transceiver 1910 may include a wired transceiver and may communicate bi-directionally with another wired transceiver. Additionally, or alternatively, in some examples, the transceiver 1910 may include a wireless transceiver and may communicate bi-directionally with another wireless transceiver. In some examples, the device 1905 may include one or more antennas 1915, which may be capable of transmitting or receiving wireless transmissions (e.g., concurrently). The transceiver 1910 may also include a modem to modulate signals, to provide the modulated signals for transmission (e.g., by one or more antennas 1915, by a wired transmitter), to receive modulated signals (e.g., from one or more antennas 1915, from a wired receiver), and to demodulate signals. In some implementations, the transceiver 1910 may include one or more interfaces, such as one or more interfaces coupled with the one or more antennas 1915 that are configured to support various receiving or obtaining operations, or one or more interfaces coupled with the one or more antennas 1915 that are configured to support various transmitting or outputting operations, or a combination thereof. In some implementations, the transceiver 1910 may include or be configured for coupling with one or more processors or one or more memory components that are operable to perform or support operations based on received or obtained information or signals, or to generate information or other signals for transmission or other outputting, or any combination thereof. In some implementations, the transceiver 1910, or the transceiver 1910 and the one or more antennas 1915, or the transceiver 1910 and the one or more antennas 1915 and one or more processors or one or more memory components (e.g., the at least one processor 1935, the at least one memory 1925, or both), may be included in a chip or chip assembly that is installed in the device 1905. In some examples, the transceiver 1910 may be operable to support communications via one or more communications links (e.g., a communication link 125, a backhaul communication link 120, a midhaul communication link 162, a fronthaul communication link 168).

The at least one memory 1925 may include RAM, ROM, or any combination thereof. The at least one memory 1925 may store computer-readable, computer-executable code 1930 including instructions that, when executed by one or more of the at least one processor 1935, cause the device 1905 to perform various functions described herein. The code 1930 may be stored in a non-transitory computer-readable medium such as system memory or another type of memory. In some cases, the code 1930 may not be directly executable by one or more processors of the at least one processor 1935 but may cause a computer (e.g., when compiled and executed) to perform functions described herein. In some cases, the at least one memory 1925 may contain, among other things, a BIOS which may control basic hardware or software operation such as the interaction with peripheral components or devices. In some examples, the at least one processor 1935 may include multiple processors and the at least one memory 1925 may include multiple memories. One or more of the multiple processors may be coupled with one or more of the multiple memories which may, individually or collectively, be configured to perform various functions herein (for example, as part of a processing system).

The at least one processor 1935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1935 may be configured to operate a memory array using a memory controller. In some other cases, a memory controller may be integrated into one or more of the at least one processor 1935. The at least one processor 1935 may be configured to execute computer-readable instructions stored in a memory (e.g., one or more of the at least one memory 1925) to cause the device 1905 to perform various functions (e.g., functions or tasks supporting adaptations to STATUS PDUs. For example, the device 1905 or a component of the device 1905 may include at least one processor 1935 and at least one memory 1925 coupled with one or more of the at least one processor 1935, the at least one processor 1935 and the at least one memory 1925 configured to perform various functions described herein. The at least one processor 1935 may be an example of a cloud-computing platform (e.g., one or more physical nodes and supporting software such as operating systems, virtual machines, or container instances) that may host the functions (e.g., by executing code 1930) to perform the functions of the device 1905. The at least one processor 1935 may be any one or more suitable processors capable of executing scripts or instructions of one or more software programs stored in the device 1905 (such as within one or more of the at least one memory 1925). In some examples, the at least one processor 1935 may include multiple processors and the at least one memory 1925 may include multiple memories. One or more of the multiple processors may be coupled with one or more of the multiple memories, which may, individually or collectively, be configured to perform various functions herein. In some examples, the at least one processor 1935 may be a component of a processing system, which may refer to a system (such as a series) of machines, circuitry (including, for example, one or both of processor circuitry (which may include the at least one processor 1935) and memory circuitry (which may include the at least one memory 1925)), or components, that receives or obtains inputs and processes the inputs to produce, generate, or obtain a set of outputs. The processing system may be configured to perform one or more of the functions described herein. As such, the at least one processor 1935 or a processing system including the at least one processor 1935 may be configured to, configurable to, or operable to cause the device 1905 to perform one or more of the functions described herein. Further, as described herein, being "configured to," being "configurable to," and being "operable to" may be used interchangeably and may be associated with a capability, when executing code stored in the at least one memory 1925 or otherwise, to perform one or more of the functions described herein.

In some examples, a bus 1940 may support communications of (e.g., within) a protocol layer of a protocol stack. In some examples, a bus 1940 may support communications associated with a logical channel of a protocol stack (e.g., between protocol layers of a protocol stack), which may include communications performed within a component of the device 1905, or between different components of the device 1905 that may be co-located or located in different locations (e.g., where the device 1905 may refer to a system in which one or more of the communications manager 1920, the transceiver 1910, the at least one memory 1925, the code 1930, and the at least one processor 1935 may be located in one of the different components or divided between different components).

In some examples, the communications manager 1920 may manage aspects of communications with a core network 130 (e.g., via one or more wired or wireless backhaul links). For example, the communications manager 1920 may manage the transfer of data communications for client devices, such as one or more UEs 115. In some examples, the communications manager 1920 may manage communications with other network entities 105, and may include a controller or scheduler for controlling communications with UEs 115 in cooperation with other network entities 105. In some examples, the communications manager 1920 may support an X2 interface within an LTE/LTE-A wireless communications network technology to provide communication between network entities 105.

The communications manager 1920 may support wireless communications in accordance with examples as disclosed herein. For example, the communications manager 1920 is capable of, configured to, or operable to support a means for transmitting one or more RLC PDUs associated with an RLC layer within a receive window. The communications manager 1920 is capable of, configured to, or operable to support a means for transmitting an uplink grant associated with the RLC layer, where the uplink grant indicates a set of resources. The communications manager 1920 is capable of, configured to, or operable to support a means for receiving, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded.

Additionally, or alternatively, the communications manager 1920 may support wireless communications in accordance with examples as disclosed herein. For example, the communications manager 1920 is capable of, configured to, or operable to support a means for transmitting one or more RLC PDUs associated with an RLC layer within a receive window. The communications manager 1920 is capable of, configured to, or operable to support a means for transmitting, subsequent to receiving the one or more RLC PDUs, a first uplink grant associated with the RLC layer, where the first uplink grant indicates a first set of resources. The communications manager 1920 is capable of, configured to, or operable to support a means for receiving, based on the first set of resources, a first RLC STATUS PDU that includes feedback for a first RLC PDU within the receive window, where the first RLC STATUS PDU includes a first field indicating a SN of the first RLC PDU. The communications manager 1920 is capable of, configured to, or operable to support a means for transmitting, subsequent to transmitting the first RLC STATUS PDU, one or more additional RLC PDUs within the receive window. The communications manager 1920 is capable of, configured to, or operable to support a means for receiving, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

Additionally, or alternatively, the communications manager 1920 may support wireless communications in accordance with examples as disclosed herein. For example, the communications manager 1920 is capable of, configured to, or operable to support a means for transmitting one or more RLC PDUs associated with an RLC layer within a receive window. The communications manager 1920 is capable of, configured to, or operable to support a means for transmitting an uplink grant associated with the RLC layer, where the uplink grant indicates a set of resources. The communications manager 1920 is capable of, configured to, or operable to support a means for receiving, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU.

By including or configuring the communications manager 1920 in accordance with examples as described herein, the device 1905 may support techniques for adapting STATUS PDUs based on an uplink grant size, which may decrease latency, improve throughput and data rate, and decrease memory consumption.

In some examples, the communications manager 1920 may be configured to perform various operations (e.g., receiving, obtaining, monitoring, outputting, transmitting) using or otherwise in cooperation with the transceiver 1910, the one or more antennas 1915 (e.g., where applicable), or any combination thereof. Although the communications manager 1920 is illustrated as a separate component, in some examples, one or more functions described with reference to the communications manager 1920 may be supported by or performed by the transceiver 1910, one or more of the at least one processor 1935, one or more of the at least one memory 1925, the code 1930, or any combination thereof (for example, by a processing system including at least a portion of the at least one processor 1935, the at least one memory 1925, the code 1930, or any combination thereof). For example, the code 1930 may include instructions executable by one or more of the at least one processor 1935 to cause the device 1905 to perform various aspects of adaptations to STATUS PDUs as described herein, or the at least one processor 1935 and the at least one memory 1925 may be otherwise configured to, individually or collectively, perform or support such operations.

FIG. 20 shows a flowchart illustrating a method 2000 that supports adaptations to STATUS PDUs in accordance with one or more aspects of the present disclosure. The operations of the method 2000 may be implemented by a UE or its components as described herein. For example, the operations of the method 2000 may be performed by a UE 115 as described with reference to FIGS. 1 through 15. In some examples, a UE may execute a set of instructions to control the functional elements of the UE to perform the described functions. Additionally, or alternatively, the UE may perform aspects of the described functions using special-purpose hardware.

At 2005, the method may include receiving one or more RLC PDUs associated with an RLC layer within a receive window. The operations of 2005 may be performed in accordance with examples as disclosed herein. In some examples, aspects of the operations of 2005 may be performed by a PDU component 1425 as described with reference to FIG. 14.

At 2010, the method may include receiving an uplink grant associated with the RLC layer, where the uplink grant indicates a set of resources. The operations of 2010 may be performed in accordance with examples as disclosed herein. In some examples, aspects of the operations of 2010 may be performed by an uplink grant component 1430 as described with reference to FIG. 14.

At 2015, the method may include transmitting, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded. The operations of 2015 may be performed in accordance with examples as disclosed herein. In some examples, aspects of the operations of 2015 may be performed by an STATUS PDU component 1435 as described with reference to FIG. 14.

FIG. 21 shows a flowchart illustrating a method 2100 that supports adaptations to STATUS PDUs in accordance with one or more aspects of the present disclosure. The operations of the method 2100 may be implemented by a UE or its components as described herein. For example, the operations of the method 2100 may be performed by a UE 115 as described with reference to FIGS. 1 through 15. In some examples, a UE may execute a set of instructions to control the functional elements of the UE to perform the described functions. Additionally, or alternatively, the UE may perform aspects of the described functions using special-purpose hardware.

At 2105, the method may include receiving one or more RLC PDUs associated with an RLC layer within a receive window. The operations of 2105 may be performed in accordance with examples as disclosed herein. In some examples, aspects of the operations of 2105 may be performed by a PDU component 1425 as described with reference to FIG. 14.

At 2110, the method may include receiving, subsequent to receiving the one or more RLC PDUs, a first uplink grant associated with the RLC layer, where the first uplink grant indicates a first set of resources. The operations of 2110 may be performed in accordance with examples as disclosed herein. In some examples, aspects of the operations of 2110 may be performed by an uplink grant component 1430 as described with reference to FIG. 14.

At 2115, the method may include transmitting, based on the first set of resources, a first RLC STATUS PDU that includes feedback for a first RLC PDU within the receive window, where the first RLC STATUS PDU includes a first field indicating a SN of the first RLC PDU. The operations of 2115 may be performed in accordance with examples as disclosed herein. In some examples, aspects of the operations of 2115 may be performed by an STATUS PDU segment component 1440 as described with reference to FIG. 14.

At 2120, the method may include receiving, subsequent to transmitting the first RLC STATUS PDU, one or more additional RLC PDUs within the receive window. The operations of 2120 may be performed in accordance with examples as disclosed herein. In some examples, aspects of the operations of 2120 may be performed by a PDU component 1425 as described with reference to FIG. 14.

At 2125, the method may include transmitting, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs. The operations of 2125 may be performed in accordance with examples as disclosed herein. In some examples, aspects of the operations of 2125 may be performed by an STATUS PDU segment component 1440 as described with reference to FIG. 14.

FIG. 22 shows a flowchart illustrating a method 2200 that supports adaptations to STATUS PDUs in accordance with one or more aspects of the present disclosure. The operations of the method 2200 may be implemented by a UE or its components as described herein. For example, the operations of the method 2200 may be performed by a UE 115 as described with reference to FIGS. 1 through 15. In some examples, a UE may execute a set of instructions to control the functional elements of the UE to perform the described functions. Additionally, or alternatively, the UE may perform aspects of the described functions using special-purpose hardware.

At 2205, the method may include receiving one or more RLC PDUs associated with an RLC layer within a receive window. The operations of 2205 may be performed in accordance with examples as disclosed herein. In some examples, aspects of the operations of 2205 may be performed by a PDU component 1425 as described with reference to FIG. 14.

At 2210, the method may include receiving an uplink grant associated with the RLC layer, where the uplink grant indicates a set of resources. The operations of 2210 may be performed in accordance with examples as disclosed herein. In some examples, aspects of the operations of 2210 may be performed by an uplink grant component 1430 as described with reference to FIG. 14.

At 2215, the method may include transmitting, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU. The operations of 2215 may be performed in accordance with examples as disclosed herein. In some examples, aspects of the operations of 2215 may be performed by an STATUS PDU offset component 1445 as described with reference to FIG. 14.

FIG. 23 shows a flowchart illustrating a method 2300 that supports adaptations to STATUS PDUs in accordance with one or more aspects of the present disclosure. The operations of the method 2300 may be implemented by a network entity or its components as described herein. For example, the operations of the method 2300 may be performed by a network entity as described with reference to FIGS. 1 through 11 and 16 through 19. In some examples, a network entity may execute a set of instructions to control the functional elements of the network entity to perform the described functions. Additionally, or alternatively, the network entity may perform aspects of the described functions using special-purpose hardware.

At 2305, the method may include transmitting one or more RLC PDUs associated with an RLC layer within a receive window. The operations of 2305 may be performed in accordance with examples as disclosed herein. In some examples, aspects of the operations of 2305 may be performed by a PDU manager 1825 as described with reference to FIG. 18.

At 2310, the method may include transmitting an uplink grant associated with the RLC layer, where the uplink grant indicates a set of resources. The operations of 2310 may be performed in accordance with examples as disclosed herein. In some examples, aspects of the operations of 2310 may be performed by an uplink grant manager 1830 as described with reference to FIG. 18.

At 2315, the method may include receiving, based on the set of resources, a first RLC STATUS PDU according to a first type of STATUS PDU that includes a single field, where the single field of the first RLC STATUS PDU indicates a SN of a first RLC PDU within the receive window that is unsuccessfully decoded. The operations of 2315 may be performed in accordance with examples as disclosed herein.

In some examples, aspects of the operations of 2315 may be performed by an STATUS PDU manager 1835 as described with reference to FIG. 18.

FIG. 24 shows a flowchart illustrating a method 2400 that supports adaptations to STATUS PDUs in accordance with one or more aspects of the present disclosure. The operations of the method 2400 may be implemented by a network entity or its components as described herein. For example, the operations of the method 2400 may be performed by a network entity as described with reference to FIGS. 1 through 11 and 16 through 19. In some examples, a network entity may execute a set of instructions to control the functional elements of the network entity to perform the described functions. Additionally, or alternatively, the network entity may perform aspects of the described functions using special-purpose hardware.

At 2405, the method may include transmitting one or more RLC PDUs associated with an RLC layer within a receive window. The operations of 2405 may be performed in accordance with examples as disclosed herein. In some examples, aspects of the operations of 2405 may be performed by a PDU manager 1825 as described with reference to FIG. 18.

At 2410, the method may include transmitting, subsequent to receiving the one or more RLC PDUs, a first uplink grant associated with the RLC layer, where the first uplink grant indicates a first set of resources. The operations of 2410 may be performed in accordance with examples as disclosed herein. In some examples, aspects of the operations of 2410 may be performed by an uplink grant manager 1830 as described with reference to FIG. 18.

At 2415, the method may include receiving, based on the first set of resources, a first RLC STATUS PDU that includes feedback for a first RLC PDU within the receive window, where the first RLC STATUS PDU includes a first field indicating a SN of the first RLC PDU. The operations of 2415 may be performed in accordance with examples as disclosed herein. In some examples, aspects of the operations of 2415 may be performed by an STATUS PDU segment manager 1840 as described with reference to FIG. 18.

At 2420, the method may include transmitting, subsequent to transmitting the first RLC STATUS PDU, one or more additional RLC PDUs within the receive window. The operations of 2420 may be performed in accordance with examples as disclosed herein. In some examples, aspects of the operations of 2420 may be performed by a PDU manager 1825 as described with reference to FIG. 18.

At 2425, the method may include receiving, subsequent to receiving the one or more additional RLC PDUs, a second RLC STATUS PDU that includes feedback for a second RLC PDU within the receive window, where the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs. The operations of 2425 may be performed in accordance with examples as disclosed herein. In some examples, aspects of the operations of 2425 may be performed by an STATUS PDU segment manager 1840 as described with reference to FIG. 18.

FIG. 25 shows a flowchart illustrating a method 2500 that supports adaptations to STATUS PDUs in accordance with one or more aspects of the present disclosure. The operations of the method 2500 may be implemented by a network entity or its components as described herein. For example, the operations of the method 2500 may be performed by a network entity as described with reference to FIGS. 1 through 11 and 16 through 19. In some examples, a network entity may execute a set of instructions to control the functional elements of the network entity to perform the described functions. Additionally, or alternatively, the network entity may perform aspects of the described functions using special-purpose hardware.

At 2505, the method may include transmitting one or more RLC PDUs associated with an RLC layer within a receive window. The operations of 2505 may be performed in accordance with examples as disclosed herein. In some examples, aspects of the operations of 2505 may be performed by a PDU manager 1825 as described with reference to FIG. 18.

At 2510, the method may include transmitting an uplink grant associated with the RLC layer, where the uplink grant indicates a set of resources. The operations of 2510 may be performed in accordance with examples as disclosed herein. In some examples, aspects of the operations of 2510 may be performed by an uplink grant manager 1830 as described with reference to FIG. 18.

At 2515, the method may include receiving, based on the set of resources, a first RLC STATUS PDU that includes feedback for a first subset of RLC PDUs within the receive window, where the first RLC STATUS PDU includes a first field corresponding to a SN of a first RLC PDU and one or more offset fields that indicate respective offsets corresponding to SNs of respective RLC PDUs subsequent to the first RLC PDU. The operations of 2515 may be performed in accordance with examples as disclosed herein. In some examples, aspects of the operations of 2515 may be performed by an STATUS PDU offset manager 1845 as described with reference to FIG. 18.

The following provides an overview of aspects of the present disclosure:

Aspect 1: A method for wireless communications at a UE, comprising: receiving one or more RLC PDUs associated with an RLC layer within a receive window; receiving an uplink grant associated with the RLC layer, wherein the uplink grant indicates a set of resources; and transmitting, based at least in part on the set of resources, a first RLC STATUS PDU according to a first type of STATUS PDU that includes a single field, wherein the single field of the first RLC STATUS PDU indicates a SN of a first RLC PDU within the receive window that is unsuccessfully decoded.

Aspect 2: The method of aspect 1, wherein transmitting the first RLC STATUS PDU according to the first type of STATUS PDU is based at least in part on a size of the set of resources indicated in the uplink grant.

Aspect 3: The method of any of aspects 1 through 2, wherein the single field indicates a NACK for the first RLC STATUS PDU.

Aspect 4: The method of any of aspects 1 through 3, wherein a quantity of SNs between a start of the receive window and the SN of the first RLC PDU indicates that the UE successfully received one or more RLC PDUs prior to the first RLC PDU within the receive window.

Aspect 5: The method of any of aspects 1 through 4, wherein the first RLC STATUS PDU indicates a control PDU type field, the control PDU type field indicating the first type of STATUS PDU.

Aspect 6: The method of any of aspects 1 through 5, further comprising: receiving retransmissions of a subset of the one or more RLC PDUs within the receive window based at least in part on transmitting the first RLC STATUS PDU.

Aspect 7: The method of any of aspects 1 through 6, wherein receiving the uplink grant further comprises: receiving, via the uplink grant, an indication of two or more polling bits, wherein a value of the two or more polling bits indicates the first type of STATUS PDU; and transmitting the first RLC STATUS PDU based at least in part on the value of the two or more polling bits.

Aspect 8: The method of any of aspects 1 through 7, further comprising: transmitting, prior to transmitting the first RLC STATUS PDU, a second RLC STATUS PDU that includes feedback for the one or more RLC PDUs, wherein transmitting the first RLC STATUS PDU is based at least in part on transmission of the second RLC STATUS PDU failing.

Aspect 9: The method of any of aspects 1 through 8, further comprising: initiating a timer after transmitting the first RLC STATUS PDU, wherein transmission of a subsequent RLC STATUS PDU is based at least in part on expiration of the timer.

Aspect 10: A method for wireless communications at a UE, comprising: receiving one or more RLC PDUs associated with an RLC layer within a receive window; receiving, subsequent to receiving the one or more RLC PDUs, a first uplink grant associated with the RLC layer, wherein the first uplink grant indicates a first set of resources; transmitting, based at least in part on the first set of resources, a first RLC STATUS PDU that includes feedback for a first RLC PDU within the receive window, wherein the first RLC STATUS PDU includes a first field indicating a SN of the first RLC PDU; receiving, subsequent to transmitting the first RLC STATUS PDU, one or more additional RLC PDUs within the receive window; and transmitting, subsequent to receiving the one or more additional RLC PDUs, a second RLC STATUS PDU that includes feedback for a second RLC PDU within the receive window, wherein the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

Aspect 11: The method of aspect 10, wherein transmitting the first RLC STATUS PDU and the second RLC STATUS PDU is based at least in part on a size of the first set of resources indicated in the first uplink grant.

Aspect 12: The method of any of aspects 10 through 11, wherein the first field indicates a NACK for the first RLC PDU, and the second field indicates a NACK for the second RLC PDU.

Aspect 13: The method of any of aspects 10 through 12, wherein the third field indicates an ACK for a third radio link STATUS PDU corresponding to a highest PDU SN of the received one or more additional RLC PDUs.

Aspect 14: The method of any of aspects 10 through 13, further comprising: receiving, subsequent to receiving the one or more additional RLC PDUs, a second uplink grant that indicates a second set of resources; and transmitting the second RLC STATUS PDU based at least in part on the second set of resources.

Aspect 15: The method of any of aspects 10 through 14, wherein the first RLC STATUS PDU includes one or more SI fields and one or more SO fields to indicate a subset of the one or more RLC PDUs.

Aspect 16: A method for wireless communications at a UE, comprising: receiving one or more RLC PDUs associated with an RLC layer within a receive window; receiving an uplink grant associated with the RLC layer, wherein the uplink grant indicates a set of resources; and transmitting, based at least in part on the set of resources, a first RLC STATUS PDU that includes feedback for a first subset of RLC PDUs within the receive window, wherein the first RLC STATUS PDU includes a first field corresponding to a SN of a first RLC PDU and one or more offset fields that indicate respective offsets corresponding to SNs of respective RLC PDUs subsequent to the first RLC PDU.

Aspect 17: The method of aspect 16, wherein transmitting the first RLC STATUS PDU is based at least in part on a size of the set of resources indicated in the uplink grant.

Aspect 18: The method of any of aspects 16 through 17, wherein the first field and the one or more offset fields indicate respective NACKs for the first RLC PDU and the respective RLC PDUs.

Aspect 19: The method of any of aspects 16 through 18, wherein the first RLC STATUS PDU comprises a second field that indicates a quantity of bits of each of the one or more offset fields.

Aspect 20: The method of aspect 19, further comprising: determining the quantity of bits based at least in part on a size of the receive window and a type of the first RLC STATUS PDU.

Aspect 21: The method of any of aspects 16 through 20, wherein the first RLC STATUS PDU includes one or more SI fields and one or more SO fields to indicate a subset of the one or more RLC PDUs.

Aspect 22: The method of any of aspects 16 through 21, wherein the first RLC STATUS PDU comprises a control PDU type field, the control PDU type field indicating a type of the first RLC STATUS PDU.

Aspect 23: A method for wireless communications at a network entity, comprising: transmitting one or more RLC PDUs associated with an RLC layer within a receive window; transmitting an uplink grant associated with the RLC layer, wherein the uplink grant indicates a set of resources; and receiving, based at least in part on the set of resources, a first RLC STATUS PDU according to a first type of STATUS PDU that includes a single field, wherein the single field of the first RLC STATUS PDU indicates a SN of a first RLC PDU within the receive window that is unsuccessfully decoded.

Aspect 24: The method of aspect 23, wherein receiving the first RLC STATUS PDU according to the first type of STATUS PDU is based at least in part on a size of the set of resources indicated in the uplink grant.

Aspect 25: The method of any of aspects 23 through 24, wherein the single field indicates a NACK for the first RLC STATUS PDU.

Aspect 26: The method of any of aspects 23 through 25, wherein a quantity of SNs between a start of the receive window and the SN of the first RLC PDU indicates that a UE successfully received one or more RLC PDUs prior to the first RLC PDU within the receive window.

Aspect 27: The method of any of aspects 23 through 26, wherein the first RLC STATUS PDU indicates a control PDU type field, the control PDU type field indicating the first type of STATUS PDU.

Aspect 28: The method of any of aspects 23 through 27, further comprising: transmitting retransmissions of a subset of the one or more RLC PDUs within the receive window based at least in part on transmitting the first RLC STATUS PDU.

Aspect 29: The method of any of aspects 23 through 28, wherein transmitting the uplink grant further comprises: transmitting, via the uplink grant, an indication of two or more polling bits, wherein a value of the two or more polling bits indicates the first type of STATUS PDU; and receiving the first RLC STATUS PDU based at least in part on the value of the two or more polling bits.

Aspect 30: The method of any of aspects 23 through 29, further comprising: receiving, prior to transmitting the first RLC STATUS PDU, a second RLC STATUS PDU that includes feedback for the one or more RLC PDUs, wherein transmitting the first RLC STATUS PDU is based at least in part on transmission of the second RLC STATUS PDU failing.

Aspect 31: The method of any of aspects 23 through 30, wherein reception of a subsequent RLC STATUS PDU is based at least in part on expiration of a timer.

Aspect 32: A method for wireless communications at a network entity, comprising: transmitting one or more RLC PDUs associated with an RLC layer within a receive window; transmitting, subsequent to receiving the one or more RLC PDUs, a first uplink grant associated with the RLC layer, wherein the first uplink grant indicates a first set of resources; receiving, based at least in part on the first set of resources, a first RLC STATUS PDU that includes feedback for a first RLC PDU within the receive window, wherein the first RLC STATUS PDU includes a first field indicating a SN of the first RLC PDU; transmitting, subsequent to transmitting the first RLC STATUS PDU, one or more additional RLC PDUs within the receive window; and receiving, subsequent to receiving the one or more additional RLC PDUs, a second RLC STATUS PDU that includes feedback for a second RLC PDU within the receive window, wherein the second RLC STATUS PDU includes a second field corresponding to a SN of a second RLC PDU within the receive window and subsequent to the first RLC PDU, and includes a third field indicating a SN corresponding to a RLC PDU subsequent to the one or more additional RLC PDUs.

Aspect 33: The method of aspect 32, wherein receiving the first RLC STATUS PDU and the second RLC STATUS PDU is based at least in part on a size of the first set of resources indicated in the first uplink grant.

Aspect 34: The method of any of aspects 32 through 33, wherein the first field indicates a NACK for the first RLC PDU, and the second field indicates a NACK for the second RLC PDU.

Aspect 35: The method of any of aspects 32 through 34, wherein the third field indicates an ACK for a third radio link STATUS PDU corresponding to a highest PDU SN of the received one or more additional RLC PDUs.

Aspect 36: The method of any of aspects 32 through 35, further comprising: transmitting, subsequent to receiving the one or more additional RLC PDUs, a second uplink grant that indicates a second set of resources; and receiving the second RLC STATUS PDU based at least in part on the second set of resources.

Aspect 37: The method of any of aspects 32 through 36, wherein the first RLC STATUS PDU includes one or more SI fields and one or more SO fields to indicate a subset of the one or more RLC PDUs.

Aspect 38: A method for wireless communications at a network entity, comprising: transmitting one or more RLC PDUs associated with an RLC layer within a receive window; transmitting an uplink grant associated with the RLC layer, wherein the uplink grant indicates a set of resources; and receiving, based at least in part on the set of resources, a first RLC STATUS PDU that includes feedback for a first subset of RLC PDUs within the receive window, wherein the first RLC STATUS PDU includes a first field corresponding to a SN of a first RLC PDU and one or more offset fields that indicate respective offsets corresponding to SNs of respective RLC PDUs subsequent to the first RLC PDU.

Aspect 39: The method of aspect 38, wherein receiving the first RLC STATUS PDU is based at least in part on a size of the set of resources indicated in the uplink grant.

Aspect 40: The method of any of aspects 38 through 39, wherein the first field and the one or more offset fields indicate respective NACKs for the first RLC PDU and the respective RLC PDUs.

Aspect 41: The method of any of aspects 38 through 40, wherein the first RLC STATUS PDU comprises a second field that indicates a quantity of bits of each of the one or more offset fields.

Aspect 42: The method of aspect 41, wherein the quantity of bits is based at least in part on a size of the receive window and a type of the first RLC STATUS PDU.

Aspect 43: The method of any of aspects 38 through 42, wherein the first RLC STATUS PDU includes one or more SI fields and one or more SO fields to indicate a subset of the one or more RLC PDUs.

Aspect 44: The method of any of aspects 38 through 43, wherein the first RLC STATUS PDU comprises a control PDU type field, the control PDU type field indicating a type of the first RLC STATUS PDU.

Aspect 45: An apparatus for wireless communications at a UE, comprising one or more memories, and one or more processors coupled with the one or more memories and configured to cause the UE to perform a method of any of aspects 1 through 9.

Aspect 46: An apparatus for wireless communications at a UE, comprising at least one means for performing a method of any of aspects 1 through 9.

Aspect 47: A non-transitory computer-readable medium storing code for wireless communications at a UE, the code comprising instructions executable by one or more processors to cause the UE to perform a method of any of aspects 1 through 9.

Aspect 48: An apparatus for wireless communications at a UE, comprising one or more memories, and one or more processors coupled with the one or more memories and configured to cause the UE to perform a method of any of aspects 10 through 15.

Aspect 49: An apparatus for wireless communications at a UE, comprising at least one means for performing a method of any of aspects 10 through 15.

Aspect 50: A non-transitory computer-readable medium storing code for wireless communications at a UE, the code comprising instructions executable by one or more processors to cause the UE to perform a method of any of aspects 10 through 15.

Aspect 51: An apparatus for wireless communications at a UE, comprising one or more memories, and one or more processors coupled with the one or more memories and configured to cause the UE to perform a method of any of aspects 16 through 22.

Aspect 52: An apparatus for wireless communications at a UE, comprising at least one means for performing a method of any of aspects 16 through 22.

Aspect 53: A non-transitory computer-readable medium storing code for wireless communications at a UE, the code comprising instructions executable by one or more processors to cause the UE to perform a method of any of aspects 16 through 22.

Aspect 54: An apparatus for wireless communications at a network entity, comprising one or more memories, and one or more processors coupled with the one or more memories and configured to cause the network entity to perform a method of any of aspects 23 through 31.

Aspect 55: An apparatus for wireless communications at a network entity, comprising at least one means for performing a method of any of aspects 23 through 31.

Aspect 56: A non-transitory computer-readable medium storing code for wireless communications at a network entity, the code comprising instructions executable by one or more processors to cause the network entity to perform a method of any of aspects 23 through 31.

Aspect 57 An apparatus for wireless communications at a network entity, comprising one or more memories, and one or more processors coupled with the one or more memories and configured to cause the network entity to perform a method of any of aspects 32 through 37.

Aspect 58: An apparatus for wireless communications at a network entity, comprising at least one means for performing a method of any of aspects 32 through 37.

Aspect 59: A non-transitory computer-readable medium storing code for wireless communications at a network entity, the code comprising instructions executable by one or more processors to cause the network entity to perform a method of any of aspects 32 through 37.

Aspect 60: An apparatus for wireless communications at a network entity, comprising one or more memories, and one or more processors coupled with the one or more memories and configured to cause the network entity to perform a method of any of aspects 38 through 44.

Aspect 61: An apparatus for wireless communications at a network entity, comprising at least one means for performing a method of any of aspects 38 through 44.

Aspect 62: A non-transitory computer-readable medium storing code for wireless communications at a network entity, the code comprising instructions executable by one or more processors to cause the network entity to perform a method of any of aspects 38 through 44.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
one or more memories; and
one or more processors coupled with the one or more memories and configured to cause the UE to:
receive one or more radio link control protocol data units associated with a radio link control layer within a receive window;
receive, subsequent to reception of the one or more radio link control protocol data units, a first uplink grant associated with the radio link control layer, wherein the first uplink grant indicates a first set of resources;
transmit, based at least in part on the first set of resources, a first radio link control status protocol data unit that includes feedback for a first radio link control protocol data unit within the receive window, wherein the first radio link control status protocol data unit includes a first field that indicates a sequence number of the first radio link control protocol data unit;
receive, subsequent to transmission of the first radio link control status protocol data unit, one or more additional radio link control protocol data units within the receive window; and
transmit, subsequent to reception of the one or more additional radio link control protocol data units, a second radio link control status protocol data unit that includes feedback for a second radio link control protocol data unit within the receive window, wherein the second radio link control status protocol data unit includes a second field corresponding to a sequence number of the second radio link control protocol data unit within the receive window and subsequent to the first radio link control protocol data unit, and includes a third field that indicates a sequence number corresponding to a radio link control protocol data unit subsequent to the one or more additional radio link control protocol data units.

2. The apparatus of claim 1, wherein the transmission of the first radio link control status protocol data unit and transmission of the second radio link control status protocol data unit are based at least in part on a size of the first set of resources indicated in the first uplink grant.

3. The apparatus of claim 1, wherein the first field indicates a negative acknowledgment for the first radio link control protocol data unit, and the second field indicates a negative acknowledgment for the second radio link control protocol data unit.

4. The apparatus of claim 1, wherein the third field indicates an acknowledgment for a third radio link status protocol data unit corresponding to a highest protocol data unit sequence number of the received one or more additional radio link control protocol data units.

5. The apparatus of claim 1, wherein the one or more processors are configured to cause the UE to:

receive, subsequent to reception of the one or more additional radio link control protocol data units, a second uplink grant that indicates a second set of resources; and
transmit the second radio link control status protocol data unit based at least in part on the second set of resources.

6. The apparatus of claim 1, wherein the first radio link control status protocol data unit includes one or more segmentation information fields and one or more segment offset fields to indicate a subset of the one or more radio link control protocol data units.

7. A method for wireless communication at a user equipment (UE), comprising:
receiving one or more radio link control protocol data units associated with a radio link control layer within a receive window;
receiving, subsequent to reception of the one or more radio link control protocol data units, a first uplink grant associated with the radio link control layer, wherein the first uplink grant indicates a first set of resources;
transmitting, based at least in part on the first set of resources, a first radio link control status protocol data unit that includes feedback for a first radio link control protocol data unit within the receive window, wherein the first radio link control status protocol data unit includes a first field that indicates a sequence number of the first radio link control protocol data unit;
receiving, subsequent to transmission of the first radio link control status protocol data unit, one or more additional radio link control protocol data units within the receive window; and
transmitting, subsequent to reception of the one or more additional radio link control protocol data units, a second radio link control status protocol data unit that includes feedback for a second radio link control protocol data unit within the receive window, wherein the second radio link control status protocol data unit includes a second field corresponding to a sequence number of the second radio link control protocol data unit within the receive window and subsequent to the first radio link control protocol data unit, and includes a third field that indicates a sequence number corresponding to a radio link control protocol data unit subsequent to the one or more additional radio link control protocol data units.

8. The method of claim 7, wherein the transmission of the first radio link control status protocol data unit and transmission of the second radio link control status protocol data unit are based at least in part on a size of the first set of resources indicated in the first uplink grant.

9. The method of claim 7, wherein the first field indicates a negative acknowledgment for the first radio link control protocol data unit, and the second field indicates a negative acknowledgment for the second radio link control protocol data unit.

10. The method of claim 7, wherein the third field indicates an acknowledgment for a third radio link status protocol data unit corresponding to a highest radio link control status protocol data unit includes a second field corresponding to a sequence number of a second radio link control protocol data unit within the receive window and subsequent to the first radio link control protocol data unit, and includes a third field that indicates a sequence number corresponding to a radio link control protocol data unit subsequent to the one or more additional radio link control protocol data units.

11. The method of claim 7, further comprising:

receiving, subsequent to reception of the one or more additional radio link control protocol data units, a second uplink grant that indicates a second set of resources; and transmitting the second radio link control status protocol data unit based at least in part on the second set of resources.

12. The method of claim 7, wherein the first radio link control status protocol data unit includes one or more segmentation information fields and one or more segment offset fields to indicate a subset of the one or more radio link control protocol data units.

13. A non-transitory computer-readable medium storing code for wireless communication at a user equipment (UE), the code comprising instructions executable by one or more processors to:

receive one or more radio link control protocol data units associated with a radio link control layer within a receive window;

receive, subsequent to reception of the one or more radio link control protocol data units, a first uplink grant associated with the radio link control layer, wherein the first uplink grant indicates a first set of resources;

transmit, based at least in part on the first set of resources, a first radio link control status protocol data unit that includes feedback for a first radio link control protocol data unit within the receive window, wherein the first radio link control status protocol data unit includes a first field that indicates a sequence number of the first radio link control protocol data unit;

receive, subsequent to transmission of the first radio link control status protocol data unit, one or more additional radio link control protocol data units within the receive window; and transmit, subsequent to reception of the one or more additional radio link control protocol data units, a second radio link control status protocol data unit that includes feedback for a second radio link control protocol data unit within the receive window, wherein the second receiving, subsequent to reception of the one or more radio link control protocol data units, a first uplink grant associated with the radio link control layer, wherein the first uplink grant indicates a first set of resources;

transmitting, based at least in part on the first set of resources, a first radio link control status protocol data unit that includes feedback for a first radio link control protocol data unit within the receive window, wherein the first radio link control status protocol data unit includes a first field that indicates a sequence number of the first radio link control protocol data unit;

receiving, subsequent to transmission of the first radio link control status protocol data unit, one or more additional radio link control protocol data units within the receive window; and transmitting, subsequent to reception of the one or more additional radio link control protocol data units, a second radio link control status protocol data unit that includes feedback for a second radio link control protocol data unit within the receive window, wherein the second radio link control status protocol data unit includes a second field corresponding to a sequence number of the second radio link control protocol data unit within the receive window and subsequent to the first radio link control protocol data unit, and includes a third field that indicates a sequence number corresponding to a radio link control protocol data unit subsequent to the one or more additional radio link control protocol data units.

14. The non-transitory computer-readable medium of claim 13, wherein the transmission of the first radio link control status protocol data unit and transmission of the second radio link control status protocol data unit are based at least in part on a size of the first set of resources indicated in the first uplink grant.

15. The non-transitory computer-readable medium of claim 13, wherein the first field indicates a negative acknowledgment for the first radio link control protocol data unit, and the second field indicates a negative acknowledgment for the second radio link control protocol data unit.

16. The non-transitory computer-readable medium of claim 13, wherein the third field indicates an acknowledgment for a third radio link status protocol data unit corresponding to a highest protocol data unit sequence number of the received one or more additional radio link control protocol data units.

17. The non-transitory computer-readable medium of claim 13, wherein the one or more processors are configured to cause the UE to:

receive, subsequent to reception of the one or more additional radio link control protocol data units, a second uplink grant that indicates a second set of resources; and transmit the second radio link control status protocol data unit based at least in part on the second set of resources.

18. The non-transitory computer-readable medium of claim 13, wherein the first radio link control status protocol data unit includes one or more segmentation information fields and one or more segment offset fields to indicate a subset of the one or more radio link control protocol data units.

19. An apparatus for wireless communication at a user equipment (UE), comprising:

means for receiving one or more radio link control protocol data units associated with a radio link control layer within a receive window;

means for receiving, subsequent to reception of the one or more radio link control protocol data units, a first uplink grant associated with the radio link control layer, wherein the first uplink grant indicates a first set of resources;

means for transmitting, based at least in part on the first set of resources, a first radio link control status protocol data unit that includes feedback for a first radio link control protocol data unit within the receive window, wherein the first radio link control status protocol data unit includes a first field that indicates a sequence number of the first radio link control protocol data unit;

means for receiving, subsequent to transmission of the first radio link control status protocol data unit, one or more additional radio link control protocol data units within the receive window; and means for transmitting, subsequent to reception of the one or more additional radio link control protocol data units, a second radio link control status protocol data unit that includes feedback for a second radio link control protocol data unit within the receive window, wherein the second radio link control status protocol data unit includes a second field corresponding to a sequence number of the second radio link control protocol data unit within the receive window and subsequent to the first radio link control protocol data unit, and includes a third field that indicates a sequence number corresponding to a radio link control protocol data unit subsequent to the one or more additional radio link control protocol data units.

20. The apparatus of claim 19, wherein the transmission of the first radio link control status protocol data unit and transmission of the second radio link control status protocol data unit are based at least in part on a size of the first set of resources indicated in the first uplink grant.

21. The apparatus of claim 19, wherein the first field indicates a negative acknowledgment for the first radio link control protocol data unit, and the second field indicates a negative acknowledgment for the second radio link control protocol data unit.

22. The apparatus of claim 19, wherein the third field indicates an acknowledgment for a third radio link status protocol data unit corresponding to a highest protocol data unit sequence number of the received one or more additional radio link control protocol data units.

23. The apparatus of claim 19, further comprising:

means for receiving, subsequent to reception of the one or more additional radio link control protocol data units, a second uplink grant that indicates a second set of resources; and means for transmitting the second radio link control status protocol data unit based at least in part on the second set of resources.

24. The apparatus of claim 19, wherein the first radio link control status protocol data unit includes one or more segmentation information fields and one or more segment offset fields to indicate a subset of the one or more radio link control protocol data units.

\* \* \* \* \*